United States Patent [19]
Bennett et al.

[11] Patent Number: 5,826,085
[45] Date of Patent: *Oct. 20, 1998

[54] OBJECT ORIENTED COMPUTER INTERFACE SUPPORTING INTERACTIVE NETWORKED APPLICATIONS

[75] Inventors: Curtis Bennett, Houston, Tex.; Dan Berkery, Minnetonka, Minn.; Shanmugam Chinnasamy, San Mateo, Calif.; Jay Daugherty; John C. Hughes, both of Arlington, Va.; Rob Lippmann, Falls Church, Va.; Niranjan Nagar; Ronald K. Park, both of San Mateo, Calif.; Ankur Sharma, Belmont, Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 501,272

[22] Filed: Jul. 12, 1995

[51] Int. Cl.$^6$ .......................................................... G06F 9/40
[52] U.S. Cl. .............................................................. 395/683
[58] Field of Search ..................................... 395/683, 614, 395/680, 200.57, 200.58

[56] References Cited

U.S. PATENT DOCUMENTS

| | | | |
|---|---|---|---|
| 5,027,269 | 6/1991 | Grant et al. | 395/680 |
| 5,050,074 | 9/1991 | Marca | 395/608 |
| 5,457,797 | 10/1995 | Butterworth et al. | 395/682 |
| 5,592,626 | 1/1997 | Papadimmitriou et al. | 395/200.09 |

OTHER PUBLICATIONS

Orfali et al., "Client/Server Programming with CORBA Objects", OS/2 Magazine, p.(8), Sep. 1994.

Bunker, Ted, "The Multimedia Infotainment I–Way", LAN Magazine, p.(9), Oct. 1994.

Orfali, Robert, Dan Harkey, Jeri Edwards, "Essential Client/Server Survival Guide", Van Nostrand Reinhold, pp. 348–366, 1994.

*Primary Examiner*—Alvin E. Oberley
*Assistant Examiner*—St. John Courtenay, III
*Attorney, Agent, or Firm*—Blakely, Sokoloff, Taylor & Zafman LLP

[57] ABSTRACT

An object oriented interactive application interface for facilitating application program development in a networked computer system providing on-line services is disclosed. The present invention is an Interactive Application Object module (IAO), comprising a client side portion and a server side portion, that facilitates the development of client applications for interaction with a server across a network. The IAO comprises a set of software objects that include interfaces and methods for implementing a client on-line service application at a high abstraction layer. The IAO provides high level objects for use by a client application for handling a large set of interactive system and business functions. On the client device, the IAO insulates the client application from the implementation details of a particular low level network interface. On the server side, the IAO integrates the a media server functionality and a services module with a conventional robust relational database and a conventional text server for persistent storage and retrieval of user system and business information. The application interface of the present invention comprises, 1) a client application interface for receiving requests from a client application, 2) a network interface for sending and receiving messages related to the client application requests via the network, 3) a database interface for storing and querying information related to the client application requests, and 4) an on-line service interface for interacting with a particular network accessible service having a specific service protocol, the service having resources necessary to respond to the client application requests.

5 Claims, 26 Drawing Sheets

INTERACTIVE APPLICATION OBJECTS — 310

| BUSINESS OBJECTS | SESSION OBJECTS | SYSTEM EVENT OBJECTS |
|---|---|---|
| Content<br>ContentManager<br>ContentProvider<br>ContentProviderManager<br>DeliveryItem<br>DeliveryItemManager<br>DescriptorSet<br>DescriptorSetManager<br>DescriptorValue<br>DescriptorValueManager<br>FeatureSet<br>FeatureSetManager<br>FeatureValue<br>FeatureValueManager<br>LogicalContent<br>LogicalContentManager<br>Order<br>OrderItem<br>OrderItemManager<br>OrderManager<br>PriceList<br>PriceListManager<br>Product<br>ProductCategory<br>ProductCategoryManager<br>ProductItem<br>ProductItemManager<br>ProductManager<br>Stream<br>StreamManager | Account<br>AccountManagement<br>AccountStatistics<br>Address<br>ClientDevice<br>Client DeviceManagement<br>Consumer<br>Control<br>Coordinator<br>EventChannel<br>EventChannelFactory<br>LogEvent<br>NamingContext<br>OrderFactory<br>OrderItemFactory<br>PaymentDevice<br>Preference<br>RecoveryCoordinator<br>Resource<br>ResourceFactory<br>Restriction<br>Service<br>ServiceAgent<br>ServiceAgentManagement<br>ServiceAgentStatistics<br>ServiceManagement<br>ServiceStatistics<br>Session<br>SessionManagement<br>SessionStatistics<br>Supplier<br>Terminator<br>TransactionFactory<br>TransactionalObject<br>User<br>UserManagement<br>UserStatistics | MktEvent<br>MktEventControl<br>MktEventType<br>MktEventTypeManager<br>OrderEvent<br>ProductEvent<br>ServerEvents<br>ServiceEvent<br>SessionEvent<br>StreamEvent<br>SysEventControl<br>SystemEventType<br>SystemEventTypeManager |
| 312 | 314 | 316 |

FIG. 3

PRODUCT ITEMS

| PRICE LISTS | PRODUCT ITEM 1 | PRODUCT ITEM 2 | PRODUCT ITEM 3 | PRODUCT ITEM 4 | PRODUCT ITEM 5 | |
|---|---|---|---|---|---|---|
| PRICE LIST A | | | | | | ... |
| PRICE LIST B | | | PRODUCT ITEM 1 AT PRICE B | | | |
| PRICE LIST C | | | | PRODUCT ITEM 4 AT PRICE C | | |
| PRICE LIST D | | PRODUCT ITEM 2 AT PRICE D | | | | |
| ⋮ | | | | | | |

FIG. 12

RESTRICTION TARGETS

| RESTRICTION OBJECTS | USER | USER GROUP | ACCOUNT | ACCOUNT GROUP |
|---|---|---|---|---|
| PRODUCT | B100<br>T0600: 2300 | | B200 | |
| PRODUCT GROUP (BY DESCRIPTOR VALUE) | | R | | |
| SERVICE | B500<br>T0800: 1700 | | B1000 | |
| SERVICE GROUP (BY SERVICE CATEGOR) | | A | | |

B = BUDGET RESTRICTION
T = TIME RESTRICTION
A = ACCESS RESTRICTION
R = READ ONLY RESTRICTION

FIG. 19

OBJECT ORIENTED COMPUTER INTERFACE SUPPORTING INTERACTIVE NETWORKED APPLICATIONS

FIELD OF THE INVENTION

The present invention relates to the field of networked computer systems. Specifically, the present invention relates to object oriented interfaces for facilitating application program development in a networked computer system.

REFERENCE TO RELATED PATENT APPLICATIONS

The following co-pending patent applications are related:

U.S. patent application entitled, "Media Server", invented by Andrew Laursen, Jeffrey Olkin, Mark A. Porter, Farzad Nazem, William Bailey, and Mark Moore, with Ser. No. 08/343,762 and filed on Nov. 21, 1994.

U.S. patent application entitled, "Transferring Binary Large Objects (BLOBS) in a Network Environment", invented by Jeffrey C. Olkin and Mark A. Porter, with Ser. No. 08/343,092 and filed on Nov. 18, 1994.

U.S. patent application entitled, "A Reliable Connectionless Network Protocol", invented by Jeffrey C. Olkin, with Ser. No. 08/343,761 and filed on Nov. 18, 1994.

DESCRIPTION OF RELATED ART

Currently, most data accessed on large servers is structured data stored in traditional databases. Networks are local area network (LAN) based and clients range from simple terminals to powerful workstations. The user is corporate and the application developer is typically an MIS professional.

With the introduction of broad band communications to the home and better than 100-to-1 data compression techniques, a new form of network-based computing is emerging. Structured data is still important; but, the bulk of data being consumed in the home environment is unstructured: audio, video, news feeds, facsimile, some graphics, etc. The predominant user or client becomes the home consumer. The predominant client device becomes the television set. The application developer becomes the facilitator for enabling the home user to access this unstructured data in an uncomplicated and consistent manner.

Simple, affordable access to this unstructured information over a computer network is both an enormous business opportunity and a powerful vehicle for people to change the way they live and work. Whether in the realm of home shopping, on-line news, video on demand, interactive education or other applications, consumer access to on-line services will make obsolete much of what we know about storing, retrieving, and processing information.

Providing information and services to on-line consumers over a computer network on a large scale presents many challenges. Application programs must be written to support a home user's access to a desired on-line service. Servers must be provided to handle the service requests coming from the home user application programs. One problem is that the large number of home users causes widely diverse needs for application program support. Some home users may need video on demand services, others may need home shopping or on-line news services. Each of these and other possible on-line services will vary between geographical locations. Some services may be regulated differently in some locations. Most services will not be consistent in the manner in which product orders are taken or delivered. It is presently very difficult to design a server system and a corresponding client application interface that can support this wide diversity in an on-line service environment. The problem is further compounded by the high cost of having to modify the server system each time a new service comes on-line or changes its client interface.

Thus, a better means and method for facilitating application program development in a networked computer system providing on-line services is needed.

SUMMARY OF THE INVENTION

The present invention is a better means and method for facilitating application program development in a networked computer system providing on-line services. The present invention is an Interactive Application Object module (IAO), comprising a client side portion and a server side portion, that facilitates the development of client applications for interaction with a server across a network. The IAO comprises a set of software objects, written in accordance with conventional object oriented design and coding techniques, that include interfaces and methods for implementing a client on-line service application at a higher abstraction layer than previously possible. As will be described in more detail below, the IAO provides high level objects for use by a client application for handling a large set of interactive system and business functions. On the client device, the IAO insulates the client application from the implementation details of a particular low level network interface. On the server side, the IAO integrates the a media server functionality, described in the above referenced patent applications, and a services module with a conventional robust relational database and a conventional text server for persistent storage and retrieval of user system and business information.

The present invention is an object oriented interactive application interface operating in a networked computer system having a client device coupled to a server over a network. The client device includes a client application executing therein. The application interface of the present invention comprises, 1) a client application interface for receiving requests from the client application, 2) a network interface for sending and receiving messages related to the client application requests via the network, 3) a database interface for storing and querying information related to the client application requests, and 4) an on-line service interface for interacting with a particular network accessible service having a specific service protocol, the service having resources necessary to respond to the client application requests.

The features and advantages of the present invention will be apparent from the accompanying drawings and from the detailed description of the present invention as set forth below.

BRIEF DESCRIPTION OF THE DRAWINGS

FIG. 3 illustrates the objects included in the interactive application objects module of the preferred embodiment.

FIG. 12 illustrates the association between product items and price lists.

FIG. 19 illustrates the object restriction structure of the preferred embodiment.

DETAILED DESCRIPTION OF THE PREFERRED EMBODIMENT

The present invention is a better means and method for facilitating application program development in a networked computer system providing on-line services. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
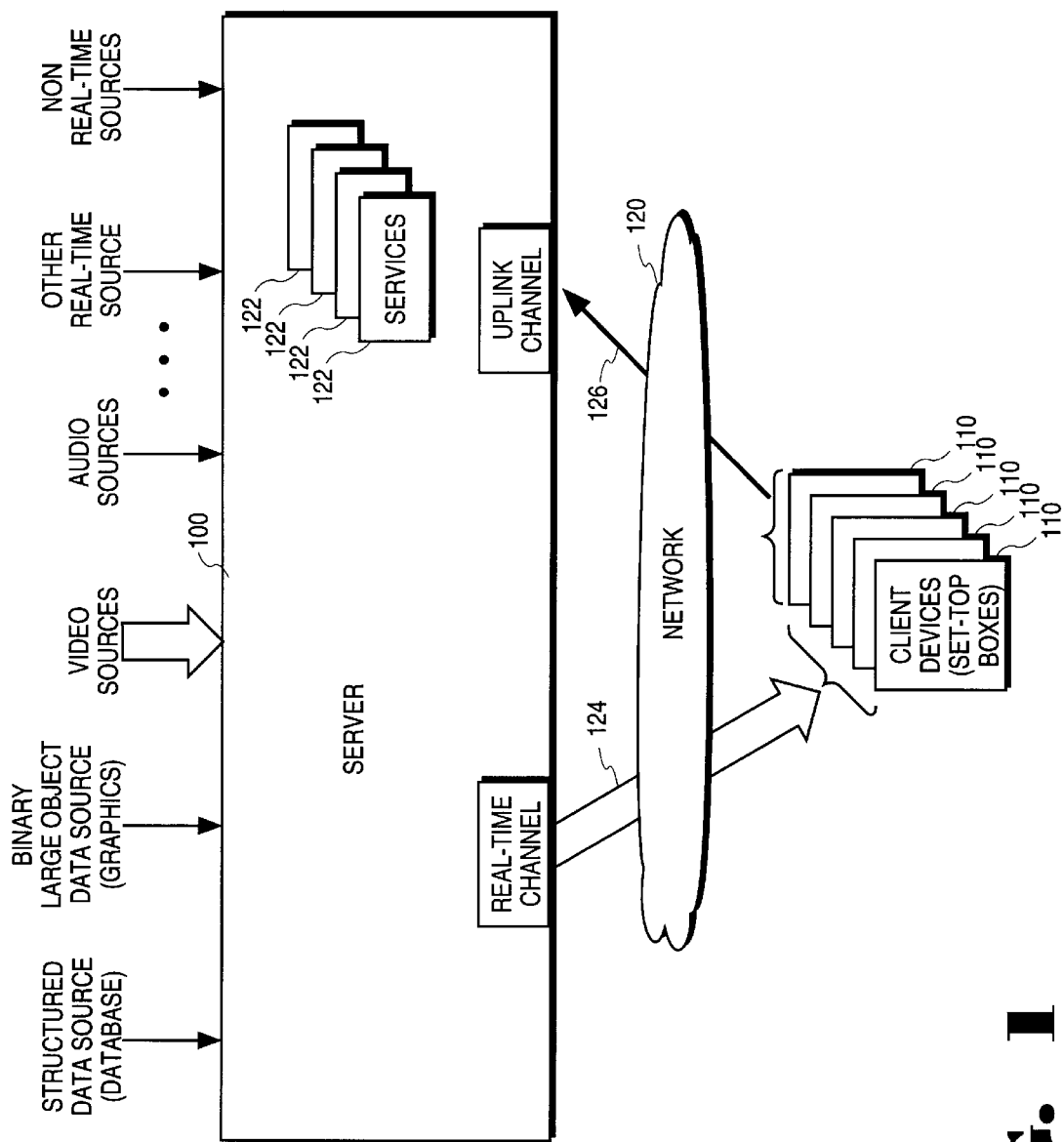
FIG. 1 illustrates the system hardware architecture of the present invention.

The basic architectural hardware components of the consumer-based interactive network architecture of the present invention is illustrated in FIG. 1. The server 100 consists of any number of computers networked in any conventional fashion. The network 120 connecting clients 110 and servers 100 is asymmetric in the preferred embodiment, with high bandwidth available in the downstream direction 124. In alternative embodiments, symmetrical networks with high bandwidth data transfer capability in both directions can be used with the present invention. Client devices 110 are conventional and well known systems generally built for interactive TV, but useful for other purposes as well. These client devices are generically denoted set-top boxes. Other classes of client devices (personal computers, personal digital assistants, video phones, etc.) are used with consumer-based networks also. The present invention supports these devices as well.

Referring again to FIG. 1, the hardware architecture of the present invention assumes, in general, that data is stored and managed on the server 100 and the client device 110 provides a view onto that data. Generally, the view is through some paradigm such as a digital mail, personal digital assistant, or electronic newspaper. The user navigates locally on the client device 110 and data is requested from the server 100 as necessary. This provides a very clean split between the client side of the application and the server side.

Server applications (services) 122 are "data based" and developed with the same tools used to build corporate databases (i.e. data modeling tools, schema editors, etc.). These services are built in a scalable manner.

Client Devices

Referring again to FIG. 1, the client device or set-top box 110 of the preferred embodiment is a device that combines the functionality of current analog cable converter boxes (tuning and descrambling) with the functionality of computers (navigation, interaction and display). The current generation of conventional set-top boxes have four major components: a network interface, an MPEG (Motion Picture Experts Group) decoder, graphics overlay, and a presentation engine. In an alternative embodiment, a set-top box without video capability may also be used. For example, the present invention can also be deployed in a network such as the Internet, World Wide Web, Integrated Services Digital Network (ISDN), local area network (LAN), or other on-line network system.

The network interface provides both downstream and upstream interfaces over one or more physical connections.

The decoder converts MPEG encoded data into audio and video. In addition, the MPEG subsystem may demultiplex application and control data from an MPEG transport stream.

The graphics overlay provides at least one graphics plane, bitmap operations, and optional chromakey mixing, a well known technique.

The presentation engine consists of a CPU, at least two megabytes of memory, and a real-time operating system. The client portion of an application program runs in this subsystem of the client device 110. In the preferred embodiment, the client application is controlled through the use of a user interface device such as a keyboard and mouse or a simple remote control device with buttons or a joystick.

The Server

The Server 100 comprises a computer system having various hardware interfaces for communicating with network 120, various interfaces for sources of data including a structured data source (such as a database), a binary large object (BLOB) data source, various real-time data sources such as a video source and/or an audio source, and other real-time or non-real-time information sources in the preferred embodiment. The Server 100 includes one or more processors (not shown) for executing software instructions and a memory (not shown) for storage of the executable software and related data. The Server 100 also supports a plurality of services 122. These services include a software implementation of a variety of on-line interactive services including video on demand (VOD), retail sales or home shopping services, information exchange services, interactive news, interactive games, interactive educational or research services, and a broad range of other services suitable for implementation in a networked computer system. One implementation of a Media Server is described in the above referenced patent applications, which are assigned to the same assignee as the present application.

The Interactive Application Object Model of the Present Invention

One problem with the prior art client/server architectures is the need to write dedicated application software for each different type of service supported by a particular server and used by a particular client. In fact, even services within the same class of service, such as home shopping, must be implemented in very different ways. For example, a home shopping application program supporting a shoe store cannot be used to support a video store. The manner in which product inventory is viewed, orders are taken, and product delivery is accomplished is altogether different for most services. As a result, the application interface for individual services will be different. It is extremely expensive and time consuming to design and develop specialized service applications for each different on-line service. Therefore, a technique is needed for extrapolating the common portions of the application interface from the specialized portions.

Further, an adaptable architecture is needed for enabling application developers to directly use previously developed application software, which can be augmented with specialized interfaces and functionality.

The present invention provides an architecture in which application development for on-line services can be significantly simplified using an interactive application object model.

Figure 2:
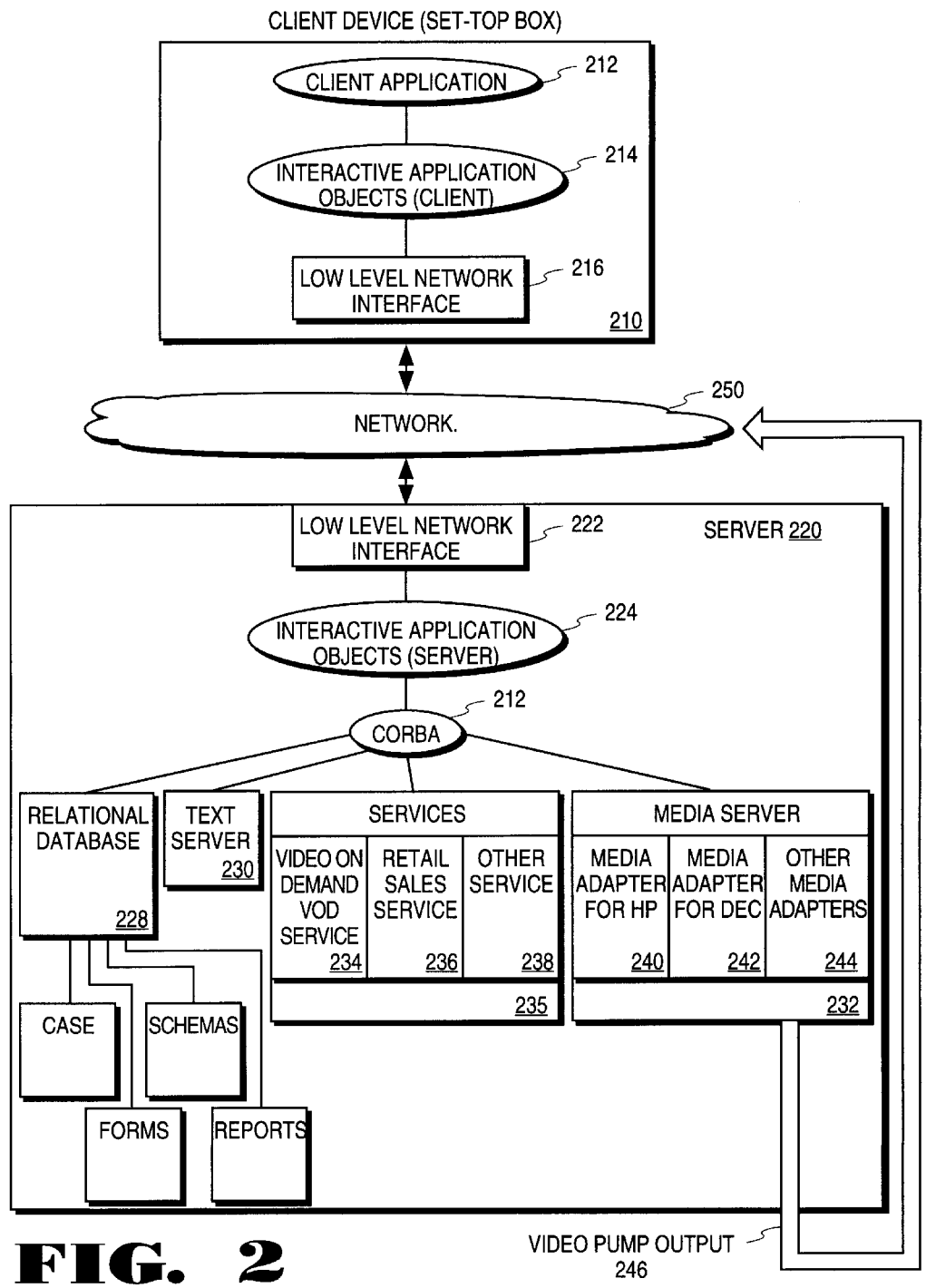
FIG. 2 illustrates the software architecture of the present invention.

Referring now to FIG. 2, the software architecture of the present invention is illustrated. The present invention is an Interactive Application Object module (IAO), comprising a client side portion 214 and a server side portion 224, that facilitates the development of client applications 212 for interaction with a server 220 across network 250. The IAO comprises a set of software objects, written in accordance with conventional object oriented design and coding techniques, that include interfaces and methods for implementing a client on-line service application at a higher abstraction layer than previously possible. As will be described in more detail below, the IAO provides high level objects for use by a client application 212 for handling a large set of interactive system and business functions. On the client device 210, the IAO insulates the client application 212 from the implementation details of a particular low level network interface 216.

On the server side, the IAO integrates the media server 232 functionality, described in the above referenced patent applications, and a services module 235 with a conventional robust relational database 228 and a conventional text server 230 for persistent storage and retrieval of user system and business information. In the preferred embodiment, the database 228, the services module 235, and the media server 232 are integrated through a conventional Common Object Request Broker Architecture (CORBA) 226. The CORBA 226 provides mechanisms by which objects transparently make requests and receive responses. CORBA 226 provides a generic interoperability environment with which applications on different machines in heterogeneous distributed environments or multiple object systems are seamlessly interconnected. Unlike the present invention, CORBA 226 does not anticipate the use of an object structure in support of an on-line service application. An alternative embodiment of the present invention integrates database 228 with services module 235 and media server 232 without the use of CORBA 226. Because the IAO 224 insulates the client application 212 from the implementation details of the server 220, the actual implementation of server 220 is transparent to the user using client device 210.

The present invention provides the scaleable, high-performance multimedia objects and services that application developers need to build sophisticated, portable, interactive multimedia applications for supporting interactive on-line services. These services are illustrated by example in FIG. 2 within service module 235. In this example, a video on demand (VOD) service 234 and a retail sales service 236 are shown. Many other types of services can be built using the objects within the IAO 224. The Interactive Application Objects provide an extensible, distributed layer of objects and services to manage the storage, retrieval and playing of movies, music, photographs, and text articles, as well as a foundation for the critical customer tracking and billing applications required to deliver these commercial services, in real time, over a networked computer system.

The Interactive Application Object (IAO) module provides a complete, robust execution environment for large-scale interactive TV applications such as video-on-demand, retail-on-demand, interactive training, and similar applications. The IAO also provides an execution environment for network systems such as the Internet, World Wide Web, Integrated Services Digital Network (ISDN), local area network (LAN), or other on-line network system. Base objects, classes, methods, and interfaces are provided in all critical areas, including multimedia content management, user management, stream management, product pricing, ordering, etc. These sophisticated foundation objects, combined with a rich set of execution services, allow application programmers to focus on high-level, high-value aspects of the application instead of having to re-invent base objects and methods from scratch.

All objects and classes are fully extensible, so users can subclass or add new objects and classes as necessary to build a targeted system. Full inheritance from the base services guarantees that systems can be rapidly prototyped, customized, extended, and deployed with a minimum of effort.

The Interactive Application Objects of the present invention provide a true plug-and-play architecture which allows both transparent object distribution across virtually all popular platforms and transparent operation of most popular video server platforms. For the first time, system architects have the freedom to use a variety of system components, at all levels, without regard to the differences between them. Interactive Application Objects makes no assumptions about specific operating system service, process, or thread models, and provides automatic conversion between different data representations during transmission between platforms, so applications don't have to consider differences in word sizes, bit and byte orderings, native number formats, etc.

Applications built with Interactive Application Objects can be automatically scaleable from small uniprocessors to SMP clusters, MPP systems, and distributed systems, without code changes. As system loads change, the Interactive Application Objects distributed server execution framework automatically tunes the system by increasing or decreasing the number of servers available to service requests, thereby automatically shifting system resources to the areas where they are needed based on usage.

The Interactive Application Objects execution environment is fully distributed, allowing objects to reside anywhere in a network of heterogeneous computer systems. A CORBA-compliant Object Request Broker (ORB) 226 in the preferred embodiment provides automatic location and execution of all services, objects and methods, without any special programming on the part of the developer, so components can be transparently moved around the network without code changes. Object persistence is provided by mapping all objects into the relational database 228, allowing the persistence store to transparently span multiple disparate systems. The ORB also provides guaranteed delivery and ordering of messages, even on broad band networks which do not provide their own reliability layer, allowing sophisticated, real-time multimedia applications to be built without any special network programming, thereby increasing reliability and decreasing time-to-market.

Transparent object location and activation allows applications programmers to build complete systems without any knowledge of the physical network topology. Network managers can transparently move or upgrade components at any time without affecting system availability. In the event of a failure, object messages will automatically be rerouted to a functioning server without any manual intervention.

Referring now to FIG. 3, a detailed breakdown of the objects included in IAO 310 is illustrated. In general, the objects supported by the IAO 310 include business objects 312, session objects 314, and system event objects 316. It will be apparent to those of ordinary skill in the art that other groupings of the objects in the IAO 310 are possible. A detailed interface specification for each of the objects listed in FIG. 3 is included herewith as Appendix A.

The following portions of this disclosure describe the functional interaction of these IAO objects in a typical series of transactions performed between a user of client device 210 and the server 220 in a typical on-line service application. First, the user will power up or cold start initialize the client device 210. In response to this initialization event, the client application 212 will make a series of requests to the IAO portion 214 on the client side. The IAO 214 will, in turn, make related requests and invoke necessary IAO object methods of the IAO portion 224 on the server side. The IAO 224 will use IAO objects and the database 228 and media server 232 resources of the server 220 to perform the requested action. A response to the request will be routed back to the user through IAO portion 224, IAO portion 214, and client application 212. The flowcharts of FIGS. 4–9 illustrate the processing logic implemented by the present invention for accomplishing these initialization tasks.

Figure 13:
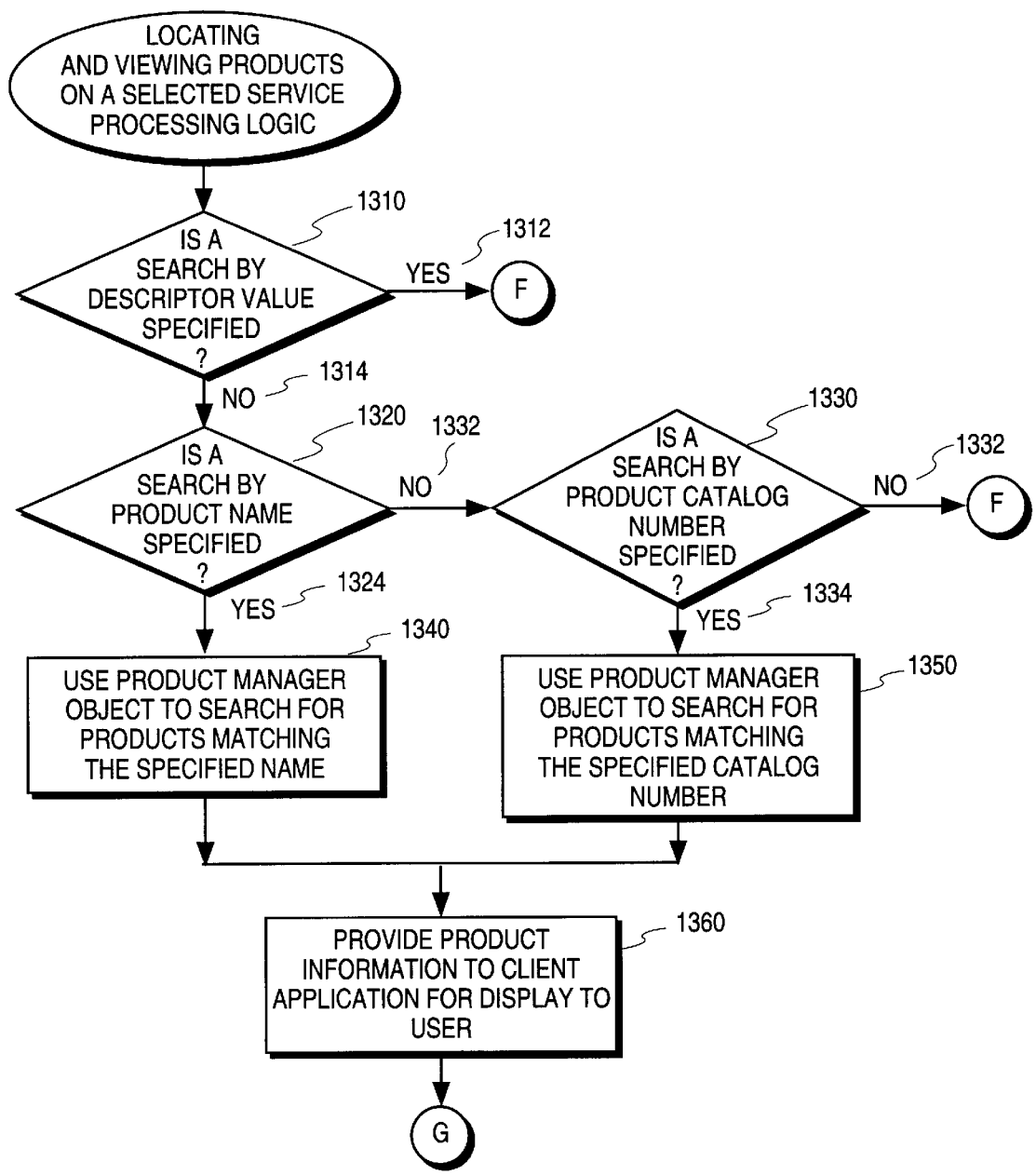
FIGS. 13–15 are flow diagrams illustrating the processing performed for locating and viewing products of a specified service.
Figure 14:
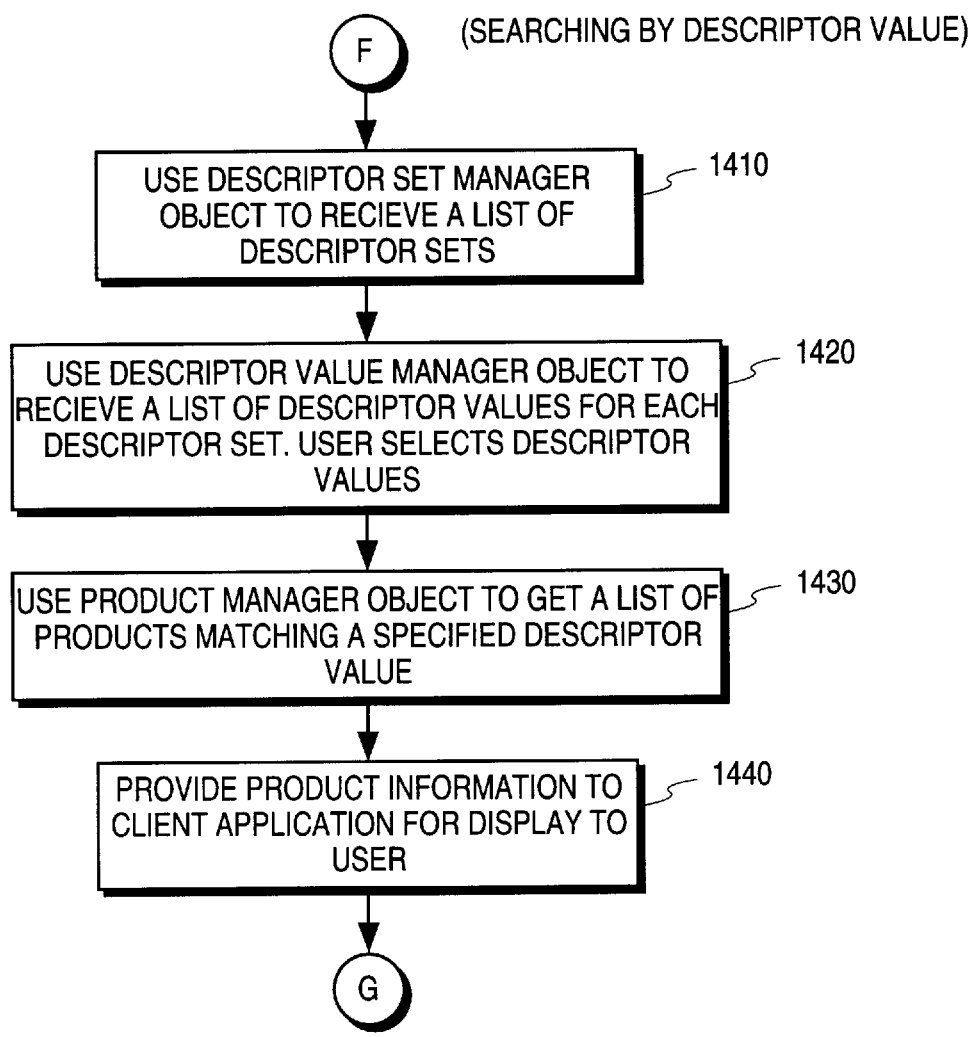
Figure 15:
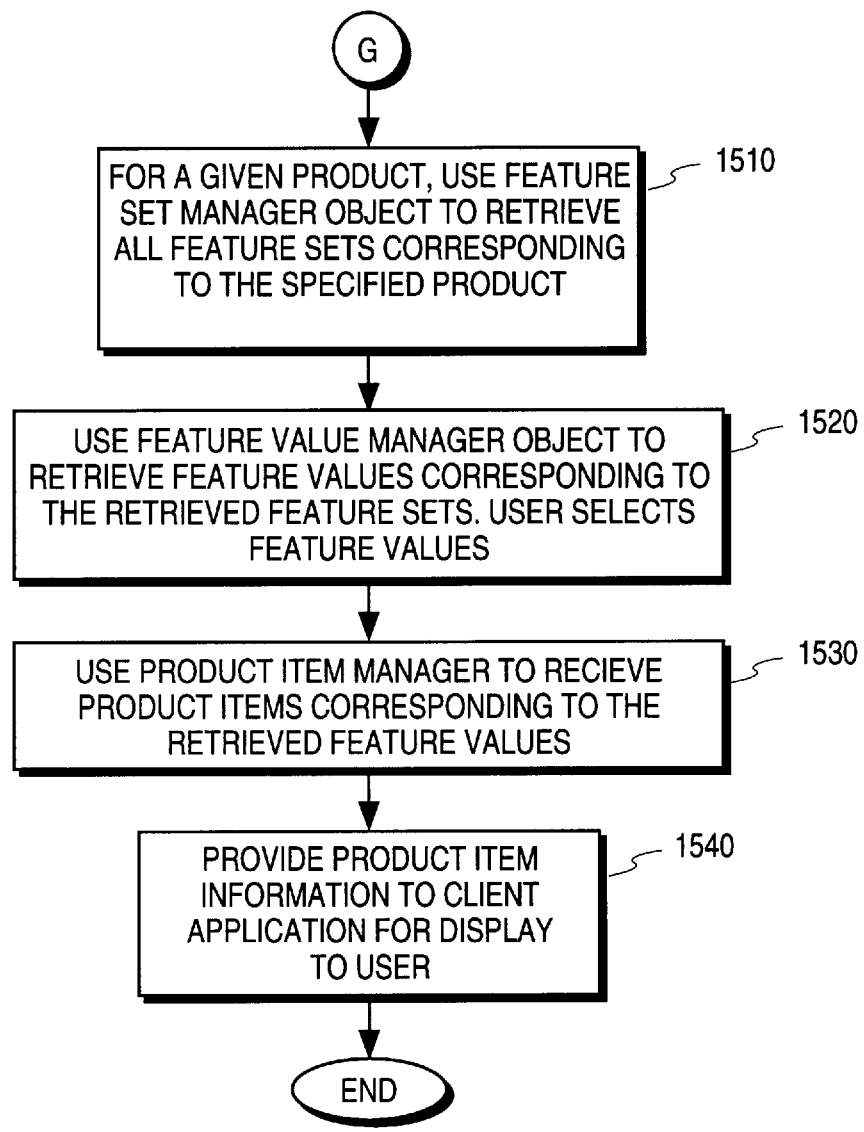
Figure 16:
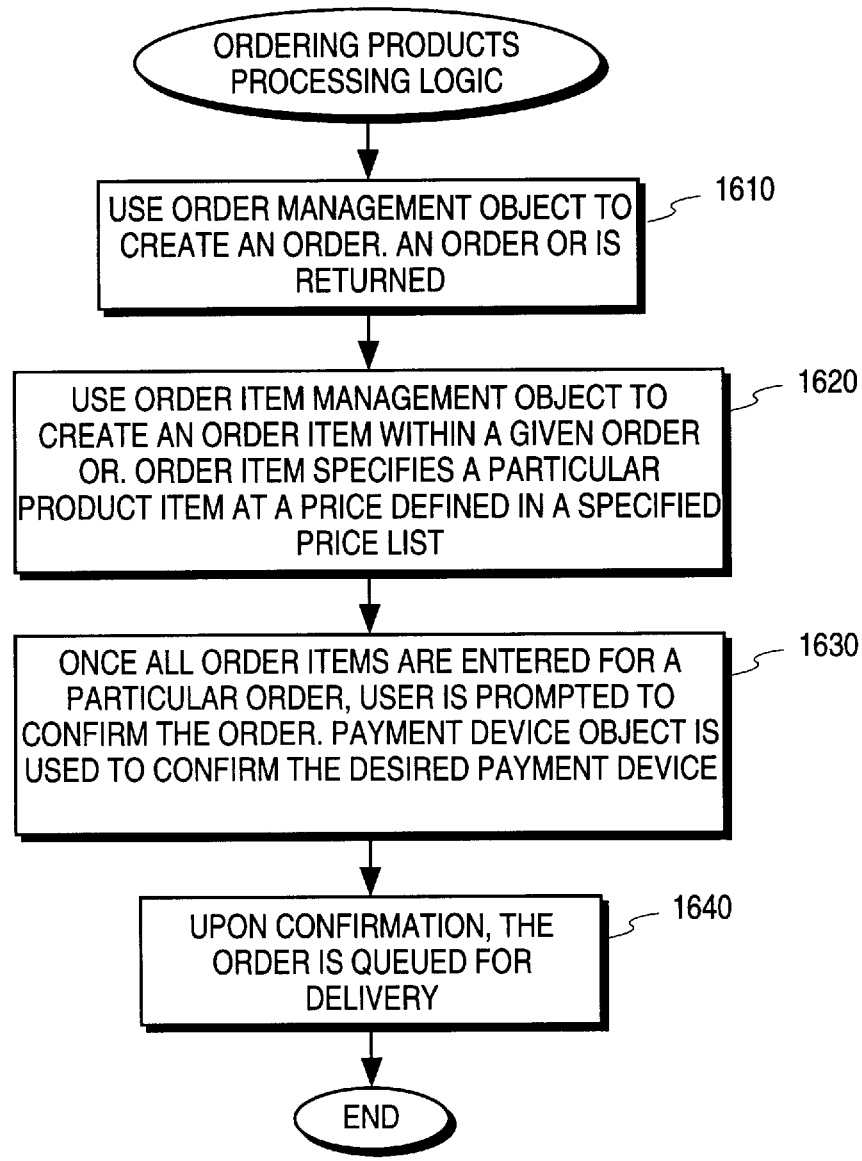
FIG. 16 is a flow diagram illustrating the processing performed for ordering products from a specified service.
Figure 17:
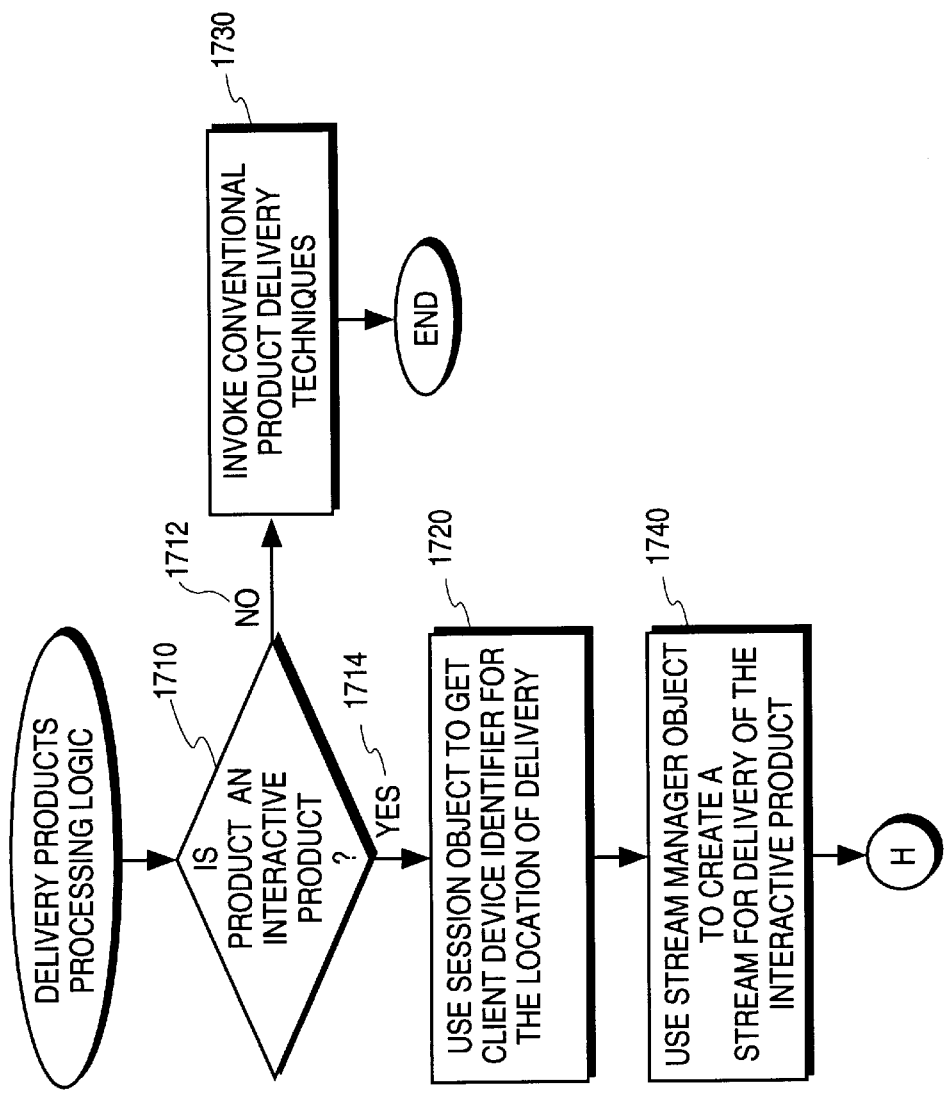
FIGS. 17–18 are flow diagrams illustrating the processing performed for delivering products.
Figure 18:
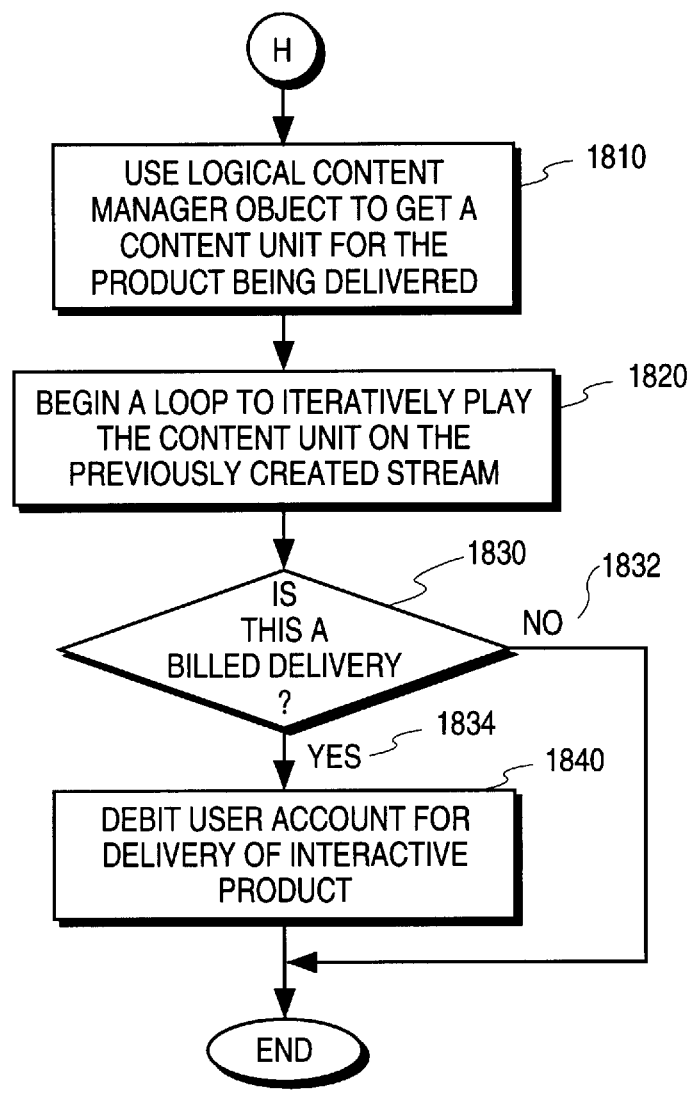

Once the client device is initialized, an on-line service is selected and entered. FIG. 10 illustrates the processing steps performed for this task. Products available through the selected service are located and viewed using the processing logic of the present invention as illustrated by FIGS. 13–15. The present invention includes structures and methods for ordering products as illustrated in FIG. 16. FIGS. 17–18 illustrate the processing logic of the present invention for delivering ordered products. These and other features of the present invention will be described in detail below in relation to FIGS. 4–18.

Figure 4:
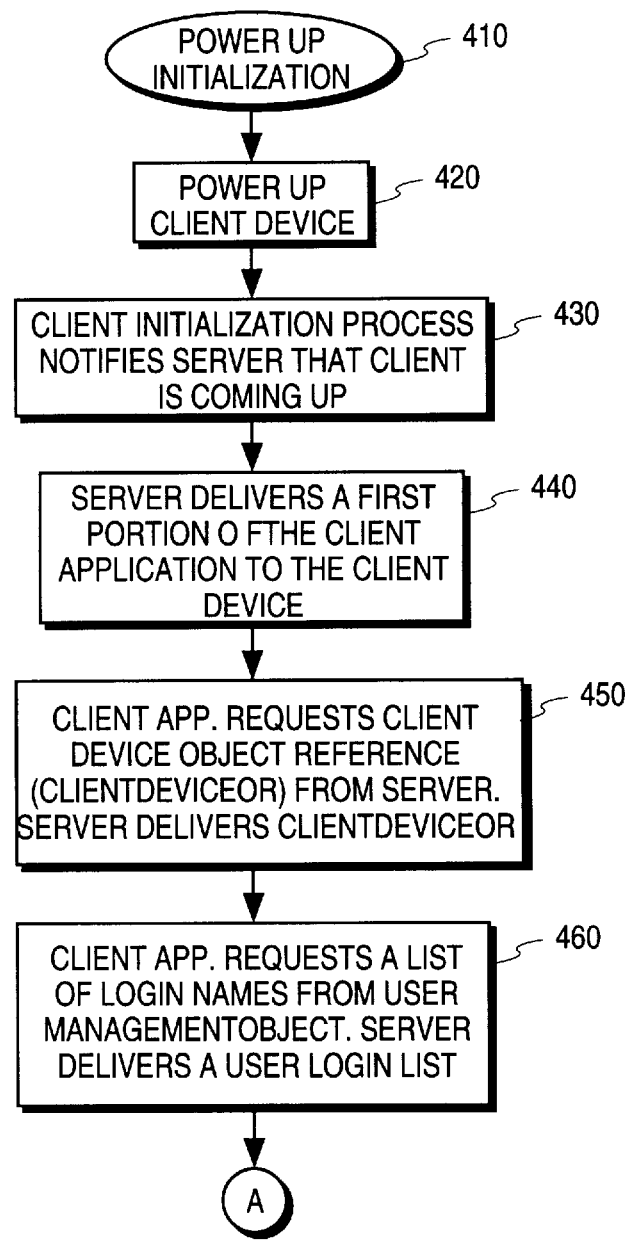
FIGS. 4–9 are flow diagrams illustrating the processing performed for initializing the client device.

Referring now to FIG. 4, the processing steps performed by the present invention for initializing the client device 210 are illustrated starting at bubble 410. Once the client device 210 is powered up or a cold start operation is triggered (block 420), an initialization process in the client device 210 sends a message to the server 220 to notify the server 220 that the client device 210 is on line. The client device 220 initialization event is registered with a connection service object of media server 232 (block 430). The server 220 delivers a first portion of the client application 212 to the client device 210 in block 440. In the preferred embodiment, this first portion is the first logical card of the client application 212. As well known to those of ordinary skill in the art, this logical card is an information packet comprising executable code and related data for presenting an informational screen display to the user of the client device 210. The client application 212 makes a request for a client device object reference (OR) through the Client Device Object of IAO 214. The Client Device Object requests a client device OR from the connection service of server 220 and returns the client device OR to the client application 212 (block 450). Next, the client application 212 requests a list of login names from the User Management Object of client IAO 214. The User Management Object requests the server 220 and the server IAO 224 for a list of login names. The IAO 224 accesses database 228 and queries the database for a list of login names corresponding to the user of client application 212. The server IAO 224 transfers the list of login names back to the client application 212 through the User Management Object. The processing logic continues at the bubble A illustrated in FIG. 5.

Figure 5:
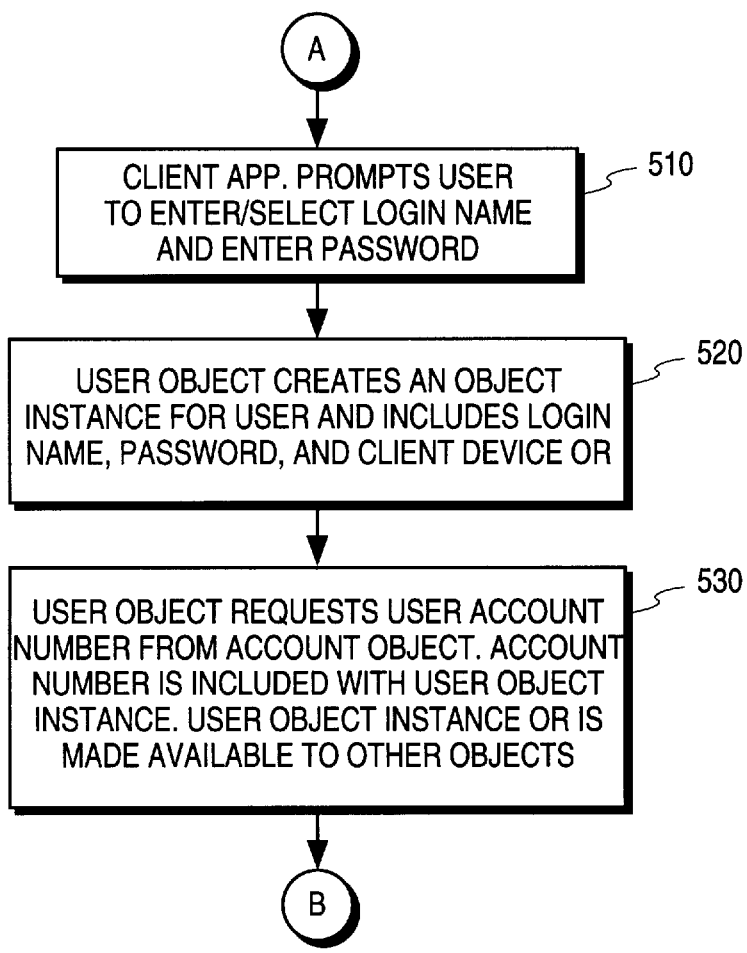

Referring to FIG. 5, the processing logic for initializing the client device 210 continues at bubble A. Having received a list of login names, the client application 212 prompts the user to enter or select a desired login name. A password prompt is also delivered to the user (block 510). The client application 212 transfers the specified login name and password to the User Object of IAO 214. The User Object creates a user object instance for the user and initializes the user object instance with the specified login name, the password, and the previously obtained client device OR for this user (block 520). The User Object of IAO 214 also requests the user account number from the Account Object of IAO 214. The Account Object accesses database 228 to retrieve the account information. The account information is included with the user object instance. The object reference (OR) corresponding to the user object instance is made available to other objects (block 530). Processing for the initialization of the client device 210 continues at the bubble B in FIG. 6.

Figure 6:
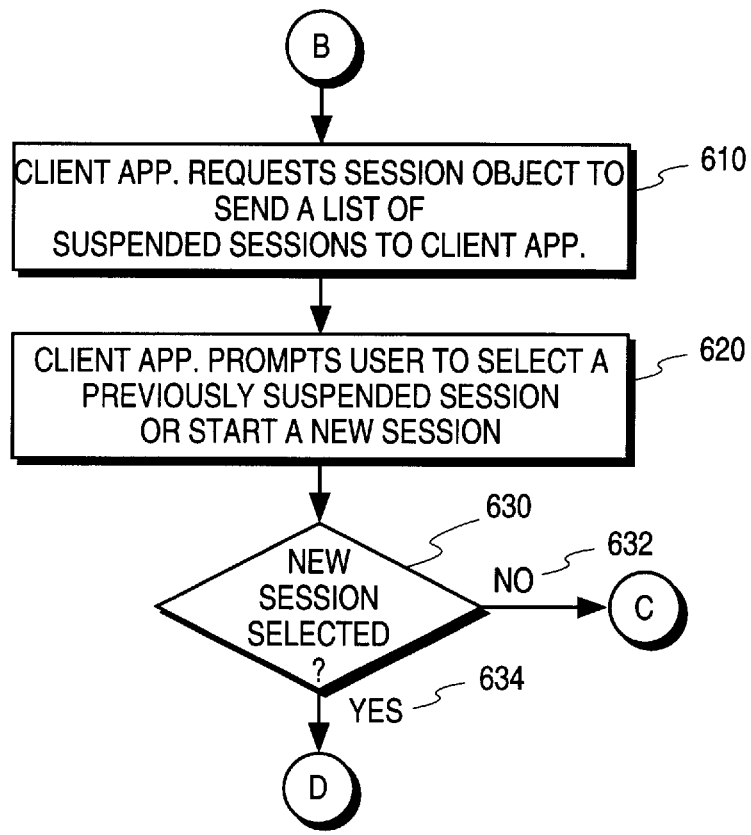

Referring now to FIG. 6, initialization processing continues at the bubble B. Having initialized the user's object instance, the client application 212 must now create a session for the user. A session is a logical set of client/server transactions occurring between the time a user logs into the server 220 and the time the user logs off or is disconnected from the server 220. Sessions can be suspended upon client disconnection and later resumed when a client/server connection is re-established. The current state of a session is therefore kept in persistent storage in database 228 so that the session can be resumed later if a disconnection should occur. The Session Object of IAO 214 handles session requests from client application 212. In block 610, the client application 212 requests from the Session Object a list of suspended sessions corresponding to the logged in user. The IAO 214 accesses the database 228 through server IAO 224. The list of suspended sessions stored in the database 228 on server 220 is retrieved and delivered to the client application 212 in block 610. The client application 212 then prompts the user to select a previously suspended session or start a new session (block 620). If the user selects a new session (path 634), processing for the new session continues at the bubble D illustrated in FIG. 9. If the user desires to resume a previously suspended session (path 632), processing performed for resuming the session continues at the bubble C illustrated in FIG. 7.

Figure 7:
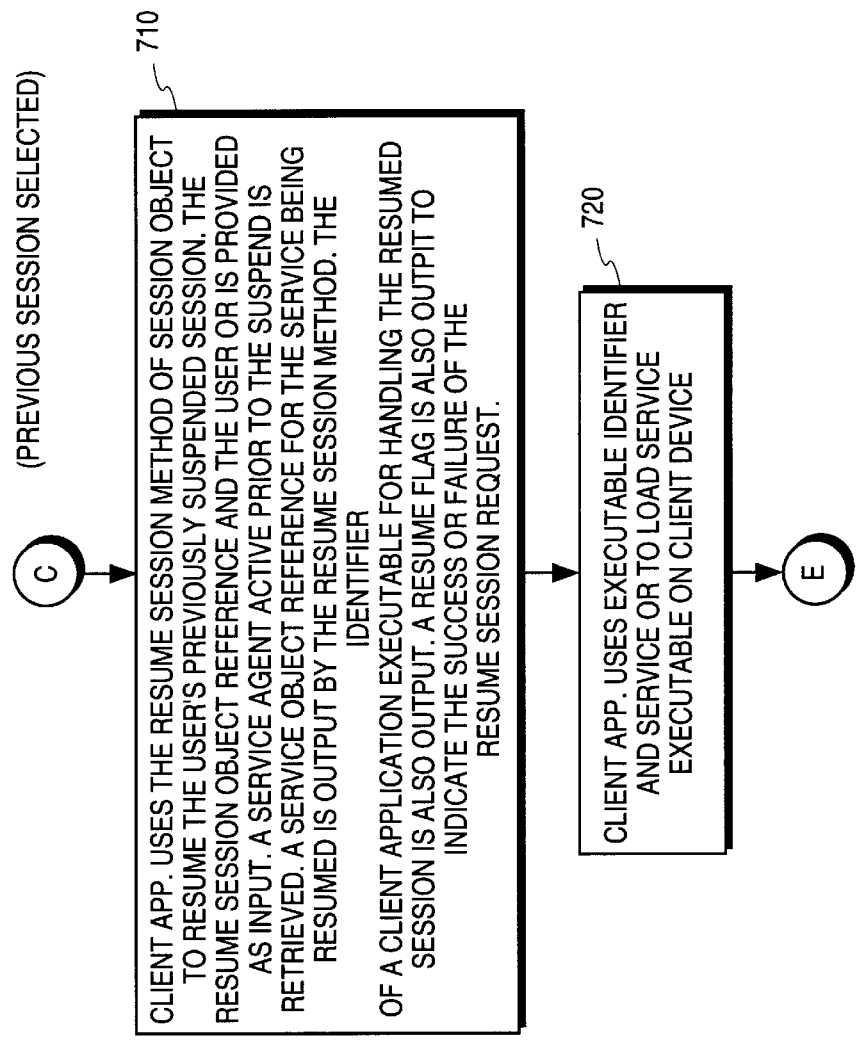

Referring to FIG. 7, processing for resuming a session continues at the bubble C. The Session Object includes a ResumeSession method. This single method, callable by the client application 212, includes processing logic for resuming a previously suspended session, given a session object instance OR of the session being resumed and the user OR of the user initiating the resume operation. The ResumeSession method is invoked in processing block 710.

The ResumeSession method uses the Service Agent Management Object to retrieve a service agent that was active prior to the suspend. A service agent is used to establish a virtual link between a service and a user. The ResumeSession method outputs a service OR that identifies the service being resumed. The ResumeSession method also outputs an identifier of a client application executable responsible for handling the resumed session. Finally, the ResumeSession method signals the success or failure of the resume session operation by appropriately setting a resume flag.

In processing block 720, the client application 212 uses the client application executable and the service OR provided by the ResumeSession method to load a service executable on the client device 210. This service executable will handle the user interaction with the selected service, once the service executable is started by the client application 212. Processing for resuming a session continues at the bubble E illustrated in FIG. 8.

Figure 8:
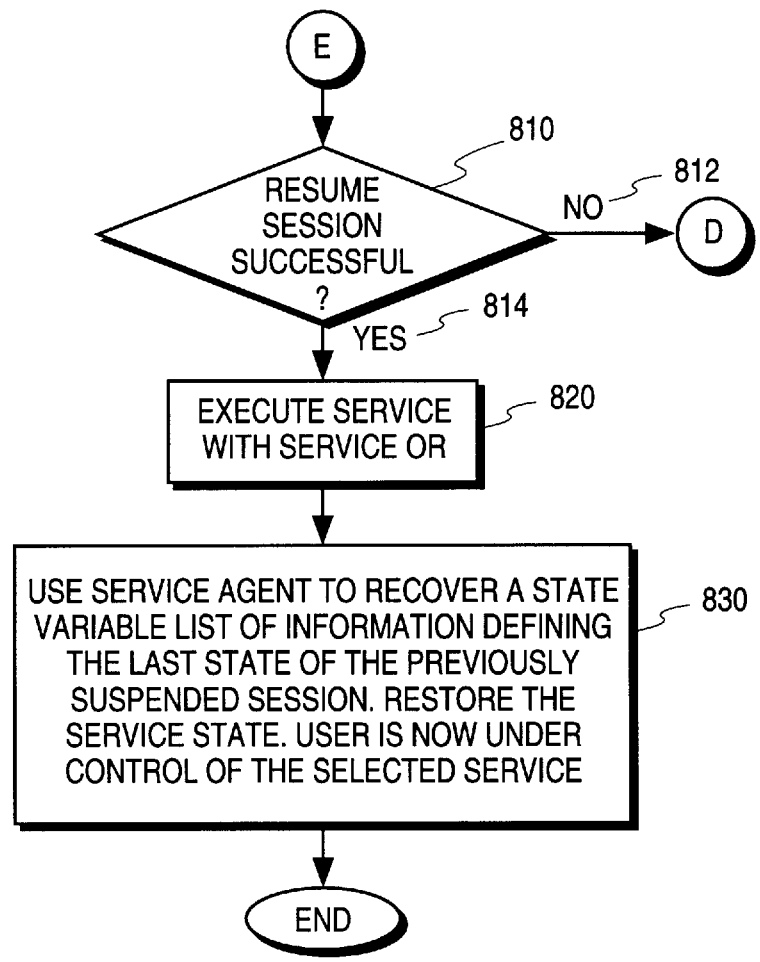

Referring now to FIG. 8, processing for resuming a session continues at the bubble E. If the resume flag set by the ResumeSession method indicates a successful resumption of the service thus far (path 814), the service identified by the service OR is executed in block 820 by the client application 212 using the client application executable. The service agent associated with this session is activated to obtain a state variable list from persistent storage (block 830). The state variable list defines the last state of the previously suspended service. This state information is used to restore the state of the current session to the same state as existed in the suspended session. The state information retrieved from the state variable list is used to restore the service to the resumed state. The user is now under control of the selected service. If the resume flag is false (path 812), a new service is started as illustrated starting at the bubble D illustrated in FIG. 9. Processing for resuming a session is complete.

Figure 9:
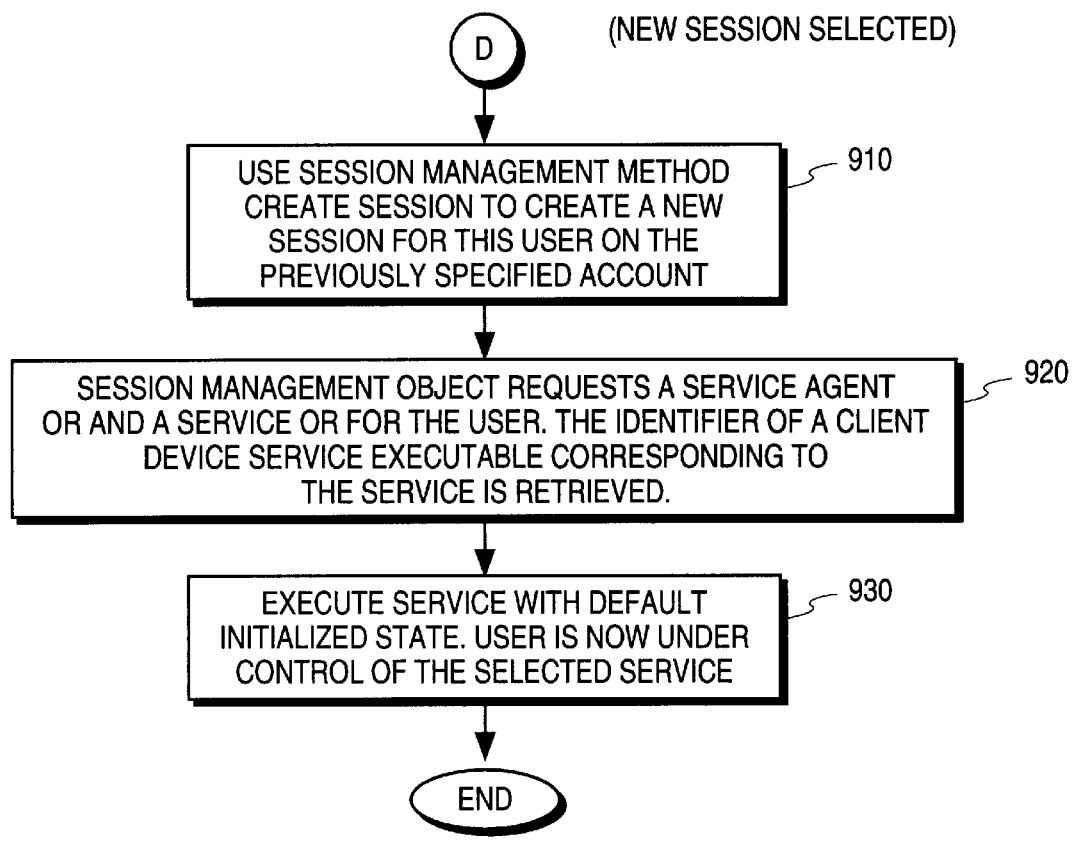
Figure 10:
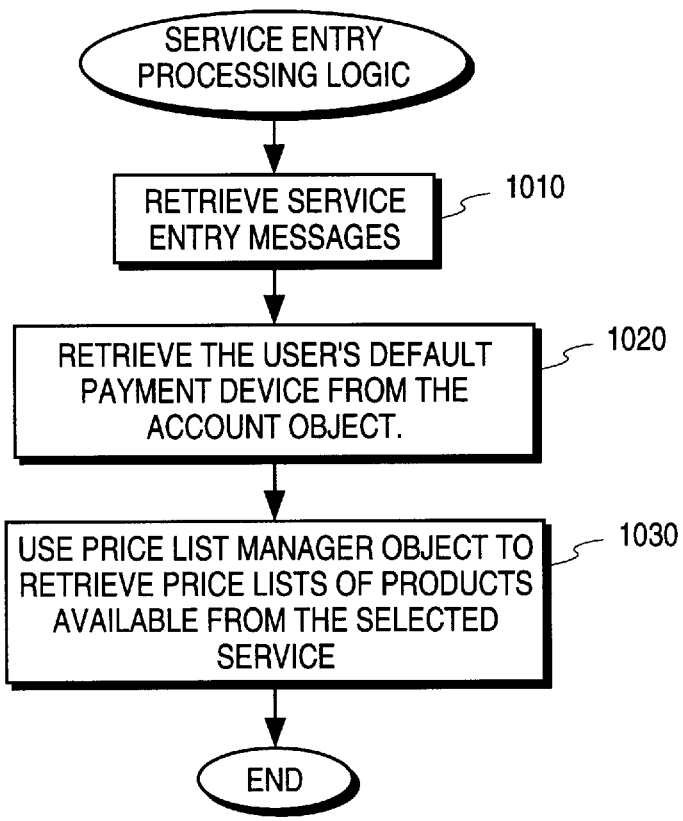
FIG. 10 is a flow diagram illustrating the processing performed for entering an on-line service.

Referring now to FIG. 9, processing logic for starting a new session is illustrated starting at the bubble D. In FIG. 6 at decision block 630, a test was performed to determine if a new session had been selected by the user. If so (path 634), the logic starting at the bubble D is executed. At block 910 in FIG. 9, a CreateSession method of the Session Management Object is used to create a new session for this user on the previously specified account. The Session Management Object requests a service agent object instance identified by a service agent OR through the Service Agent Management Object for the new session. A service object instance identified by a service OR is also retrieved by the Session Management Object. The identifier of a client application executable corresponding to the service is retrieved (block 920). The service identified by the service OR is executed in block 930 by the client application 212 using the client application executable. Default state information is used to initialize the service to an initial start-up state. The user is now under control of the selected service. Processing for starting a new session is complete.

Referring to FIG. 10, the processing logic of the preferred embodiment for entering an on-line service is illustrated. First, upon initial entry to the service, such as in response to the logic executed in block 930, a list of service entry messages is retrieved in block 1010. This list of messages is a service specific set of messages to be displayed to a user upon initial entry to a service. In block 1020, the Account Object is used to retrieve a default payment device previously configured for the user. The default payment device is the identifier of an account or credit card number from which charges for the current session are to be deducted. In the preferred embodiment, a user must select a payment device during the ordering process. In processing block 1030, the Price List Manager Object is used to retrieve a price list of products available from the selected service.

In the present invention, a plurality of price lists are maintained for each product of an on-line service. Such a price list structure is illustrated in FIG. 12. Each product of a service is associated with one or more price lists. Each user of a service is associated with one and only one price list. In this manner, a product pricing structure can be different for different users. The price list for this particular user is retrieved in block 1030. At this point, the user is now ready to locate, order, and take delivery of products available from the service to which the client application is connected.

Figure 11:
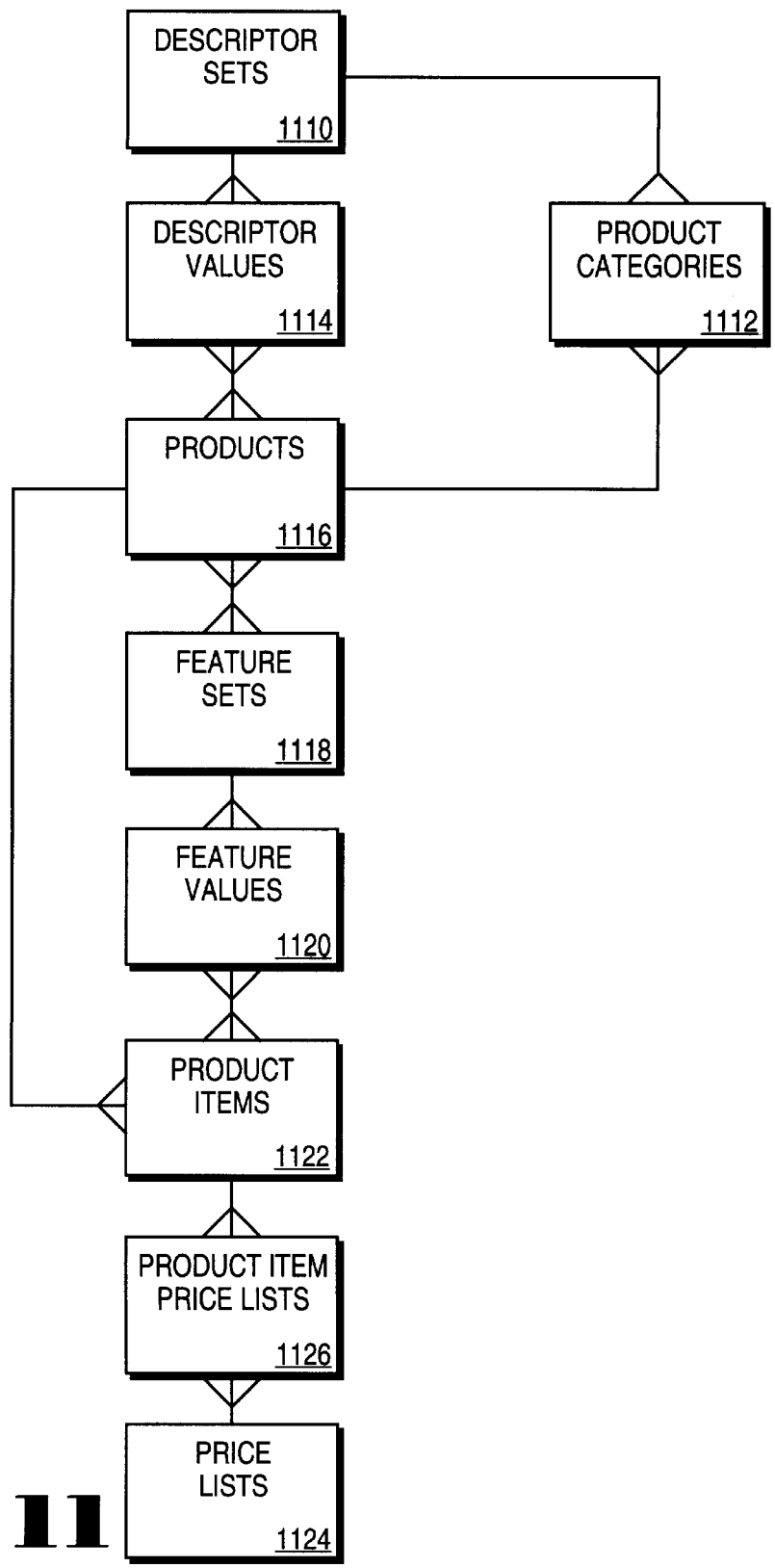
FIG. 11 illustrates the product characteristic hierarchy implemented in the present invention.

Referring now to FIG. 11, an entity relationship diagram (ERD) illustrates the structuring of product characteristics used in the preferred embodiment of the present invention. These characteristics are used to query and specifically identify particular product items which are available for delivery from an on-line service. These product characteristics are described herein in relation to several key terms which are defined below. Examples are provided to help explain the distinction between the key terms.

The first important key term is the descriptor set 1110. A descriptor set is a broad classification of products by a particular characteristic. For example, a shoe store may offer their stock as classified under the descriptor sets: casual shoes, dress shoes, or athletic shoes. Products of a service are associated with a descriptor set 1110. As a further narrowing of the product characteristics, the second key term, descriptor values 1114, defines the product classifications within each descriptor set. For example, the descriptor set of casual shoes may be further classified into the descriptor values of loafers, sandals, and moccasins. Each of the other descriptor sets have different descriptor values. As shown by the line connecting blocks 1110 and 1114 in FIG. 11, one descriptor set 1110 may have many descriptor values 1114 associated therewith; however, only one descriptor set is associated with each descriptor value 1114.

As shown in FIG. 11, the next key term in the product characteristic hierarchy of the present invention is the product identifier 1116. Within each descriptor value classification, individual product identifiers represent the particular products that can be obtained by the user. For example, within the descriptor value classification of loafer, a particular brand and style of loafer A is available. Other brands and styles of loafer B, C, and D may also be available. The product classification 1116 is represented in a typical shoe store by the brand samples displayed in the store window. Products 1116 are associated with descriptor values 1114 in a many to many relationship as shown by the lines connecting boxes 1114 and 1116 in FIG. 11.

Each product 1116 is made up of product items 1122. The product items 1122 each may be associated with multiple feature values 1120. Each of the feature values 1120 will belong to different feature sets 1118. Feature sets 1118 define particular attributes of products. For example, products items may be offered in various colors and sizes. Color and size are feature sets 1118 for products 1116. A feature set 118 may be related to many product items 1122. Individual product items 1122 are associated with particular feature values 1120 in a many to many relationship. For example, a size 10, color brown, loafer A uniquely defines a product item which may be ordered and purchased. Each product item may be associated with many product item price lists 1126 as described herein in connection with FIG. 12. A price list 1124 may be associated with many product item price lists 1126.

A product category 1112 is also provided in the preferred embodiment. The product category 1112 provides a way for various products or descriptor sets to be grouped in some logical way.

The key terms in the product characteristic hierarchy of the present invention as illustrated in FIG. 11 are implemented in the present invention as a set of database tables interconnected in the manner illustrated in FIG. 11. As such, the structure of the hierarchy illustrated in FIG. 11 represents the database schema used in the preset invention. The details of this schema are set forth in the relational database schema specification included herewith as Appendix B.

Having described the key terms and schema used in the present invention, a description of the processing logic of the present invention for using this structure continues with FIG. 13.

Referring now to FIG. 13, the processing logic for locating and viewing products on a selected service is described.

Previously, the user had been connected with a service and the service had been initiated (see FIG. 10 and the related discussion). Next, the user is allowed to specify a search for products of interest by specifying a search by descriptor values, a search by product name, or a search by product catalog number. It will be apparent to those of ordinary skill in the art that the architecture of the present invention enables product searching in a myriad of different ways. The three forms of searching described herein are merely representative examples of the searching capabilities of the present invention.

If a search by descriptor value is specified by the user (path 1312), processing continues at the bubble labeled F illustrated in FIG. 14. If a search by product name is specified (path 1324), the Product Manager Object searches product records on database 228 for products matching the specified name (block 1340). If matches are found, the matching product information is provided to the client application for display to the user (block 1360). If a search by product catalog number is specified (path 1334), the Product Manager Object searches product records on database 228 for products matching the specified catalog number (block 1350). If matches are found, the matching product information is provided to the client application for display to the user (block 1360). Processing for locating and viewing products continues at the bubble G illustrated in FIG. 15.

Referring now to FIG. 14, processing steps for searching products by descriptor value are illustrated starting at bubble F. First, a Descriptor Set Manager Object of client IAO 214 and server IAO 224 retrieves a list of descriptor sets as specified by an application developer (block 1410). Next, the Descriptor Value Manager Object is used to retrieve a list of descriptor values corresponding to the previously retrieved list of descriptor sets. The user then selects appropriate descriptor values (block 1420). The Product Manager Object is used to get a list of products matching the previously selected descriptor values (block 1430). Finally, the product information for the list of matching products is provided to the client application 212 in processing block 1440. Processing for locating and viewing products continues at the bubble G illustrated in FIG. 15.

Referring now to FIG. 15, the processing logic for locating and viewing products continues at the bubble G. For a specified product, the Feature Set Manager Object is used to retrieve all feature sets corresponding to the specified product (block 1510). The Feature Value Manager Object is used to retrieve feature values corresponding to the retrieved feature sets in block 1520. The user then selects appropriate feature values. The Product Item Manager Object is used to retrieve product items corresponding to the retrieved feature values in block 1530. Finally, the product item information corresponding to the retrieved product items is provided to the client application for display to the user in block 1540. Processing logic for locating and viewing products terminates at the End bubble in FIG. 15. The steps performed in the preferred embodiment for ordering a product are described next.

Referring now to FIG. 16, the steps performed in the preferred embodiment for ordering a product are described. First, the Order Management Object is used to create an order object instance with an object reference (OR) in block 1610. The Order Item Management Object is then used to create an order item within a specified order object as specified by the object OR (block 1620). The order item identifies a particular product item at a price specified in a particular price list. The user can repeatedly add order items to an existing order object until the user specifies completion of the order. Upon completion, the user is prompted for confirmation of the order (block 1630). The Payment Device Object is used to confirm the desired payment device (block 1630). When the user confirms the order, the order is queued for delivery in block 1640. Product delivery processing logic is described next.

Referring now to FIG. 17, the processing logic for delivering a product order is illustrated. If the product to be delivered is not an interactive product such as a video or audio stream, a conventional product delivery technique is used to effect delivery of the ordered product (block 1730). Product delivery processing then terminates at the End bubble shown in FIG. 17.

If the product to be delivered is an interactive product such as a video or audio stream, the Session Object is used in block 1720 to get a client device identifier for the location of delivery of the interactive product. The Stream Manager Object is used to create a stream for delivery of the interactive product (block 1740). Processing continues at the bubble H illustrated in FIG. 18.

Referring to FIG. 18, processing logic for delivering an interactive product continues at the bubble H. The Logical Content Manager Object is used to get a list of content units for the interactive product being delivered (block 1810). In the preferred embodiment, interactive products, such as a video movie, are comprised of a single ordered content unit. Each content unit contains a sequence of content of the interactive product. It is convenient to partition interactive products into content units; because, a single content unit can be used to address a sequence of content.

In block 1820, the interactive product is delivered to the user by iteratively playing the content unit in the appropriate order on the previously created stream. If the product delivery is a billed delivery (path 1834), the user account is debited for the delivery of the interactive product (block 1840). Otherwise, the user is not billed for the delivery (path 1832). Processing for the delivery of products using the present invention then terminates at the End bubble shown in FIG. 18.

Restrictions

The preferred embodiment of the present invention includes a capability for restricting access to objects by users, user groups, accounts, and account groups. Referring now to FIG. 19, the relationship between these various levels of restriction is illustrated in a table form. The restriction structure in the preferred embodiment includes a set of restriction objects, a set of restriction targets, and a set of restriction types. In FIG. 19, the four restriction objects of the preferred embodiment are shown on the left margin as rows: 1) product, 2) product group or descriptor value, 3) service, and 4) service group or service category. These restriction objects define the system resources being protected by the specified restriction. The four restriction targets of the preferred embodiment are shown in FIG. 19 on the upper margin as columns: 1) User, 2) User group, 3) Account, and 4) Account Group. These restriction targets define characteristics of the objects from which access requests originate. In the preferred embodiment, these characteristics include the user name, the user group, the account number, and the account group of the accessing object. The four restriction types of the preferred embodiment are shown in FIG. 19 at the lower margin as a restriction type represented by a code or letters: B, T, A, and R. Letter B represents a budget restriction. Letter T represents a time restriction, Letter A represents an access restriction. Letter R represents a Read only access restriction. It will be apparent to those of ordinary skill in the art that other restriction objects, other restriction targets, and other restriction types may be equivalently be included in the restriction structure of the present invention.

FIG. 19 shows the interrelationship of the restriction objects and the restriction targets as an object/target matrix. Any one of the restriction types can be enabled for a corresponding restriction object/restriction target pair by entering the corresponding code/letter of the restriction type in the appropriate cell of the object/target matrix at the intersection of the appropriate restriction object/restriction target pair. For example, the cell at the intersection of the Product row and the User column shown in FIG. 19 specifies that the user can access the product only if the access costs less than 100 cost units (x dollars) and the access is made between the hours of 6 am and 11 pm. Similarly, other restriction codes in other cells of the matrix indicate other restrictions. The absence of a restriction letter in a cell indicates that no restriction of that type applies to the corresponding restriction object/restriction target pair, and thus access is allowed. The restriction structure illustrated in FIG. 19 is readily implemented in database tables. The detailed definition of these tables is included in Appendix B attached hereto. These data structures are used by the restriction processing logic of the preferred embodiment as illustrated in FIGS. 20–25 as described below.

Figure 20:
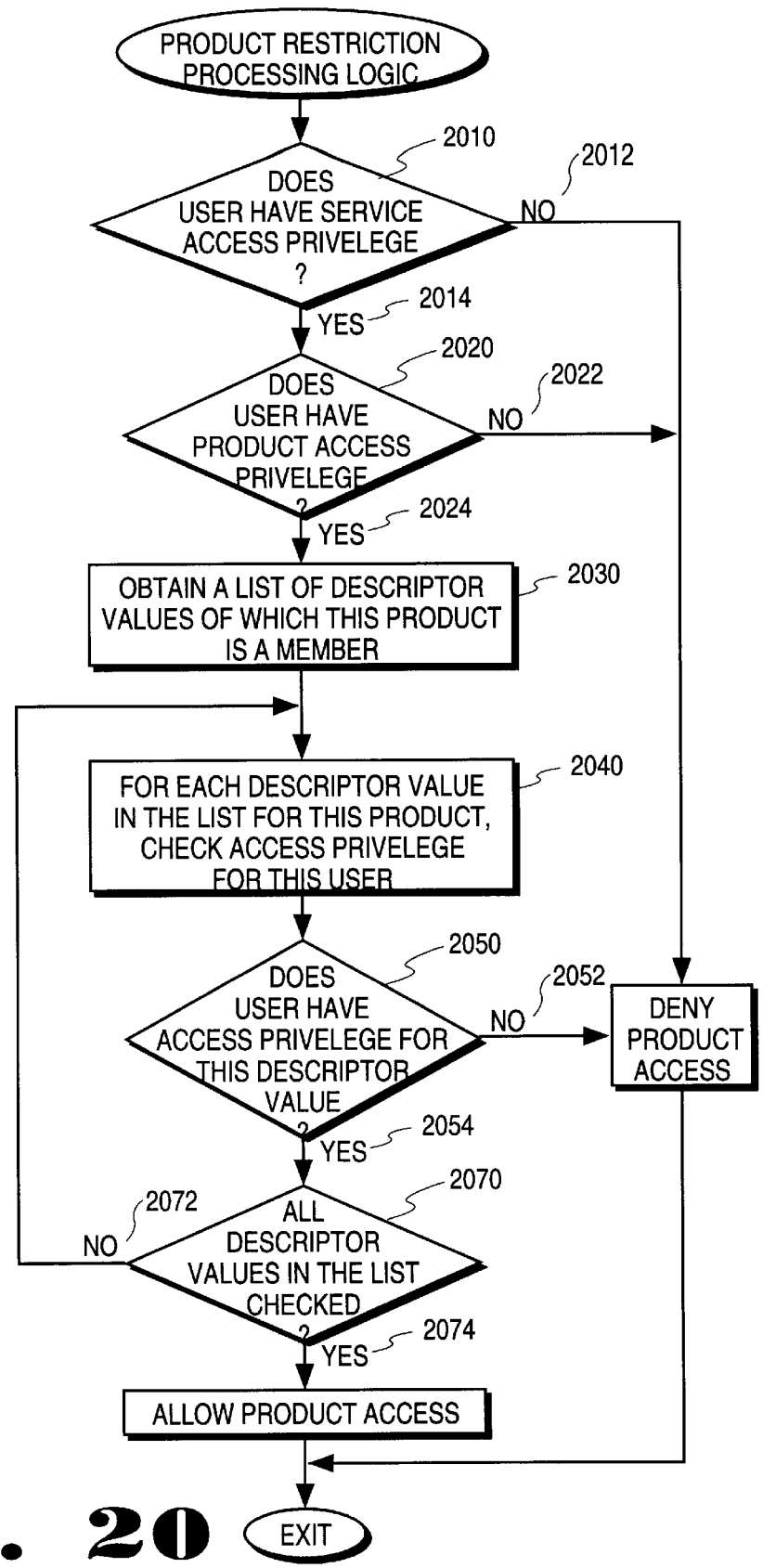
FIGS. 20–25 are flow diagrams illustrating the processing performed for restricting objects.
Figure 21:
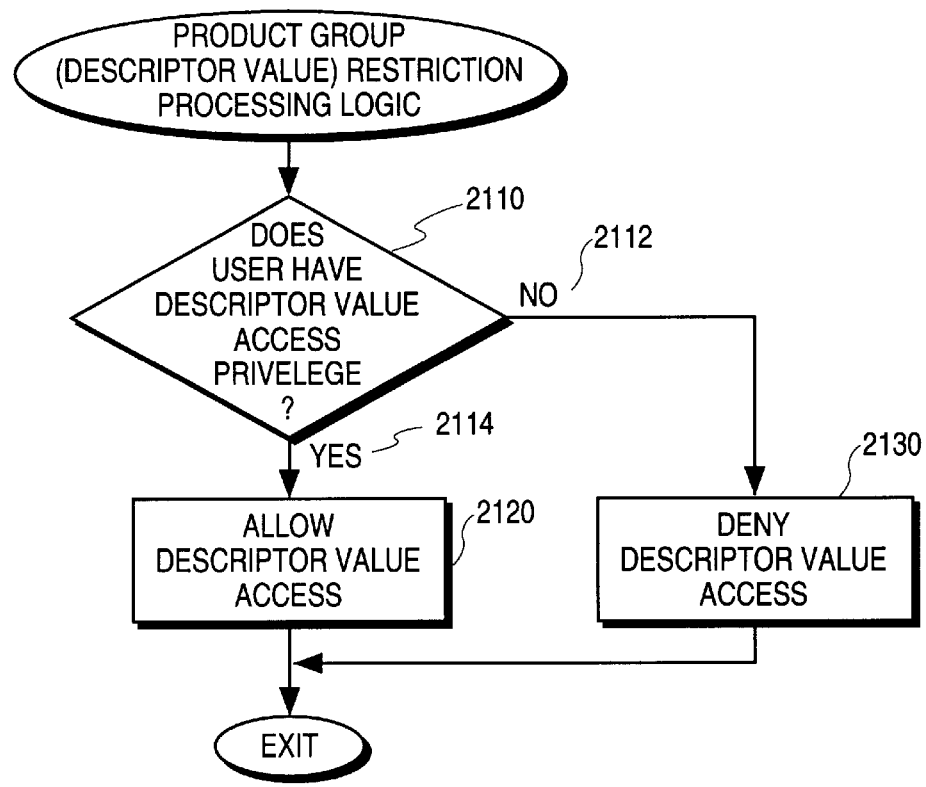
Figure 22:
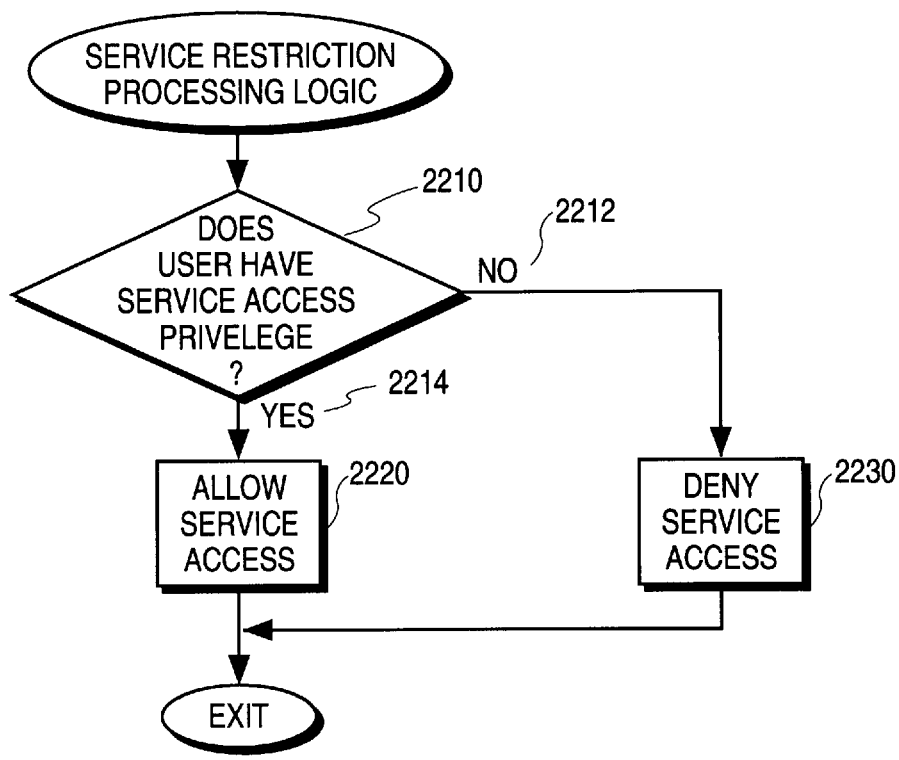
Figure 23:
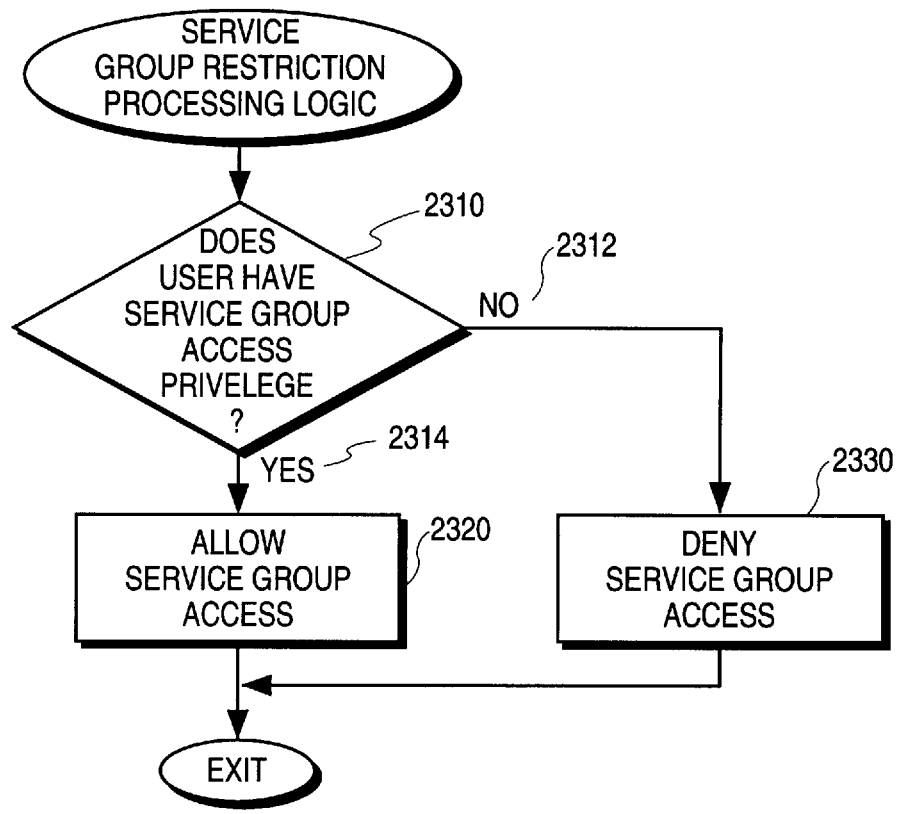
Figure 24:
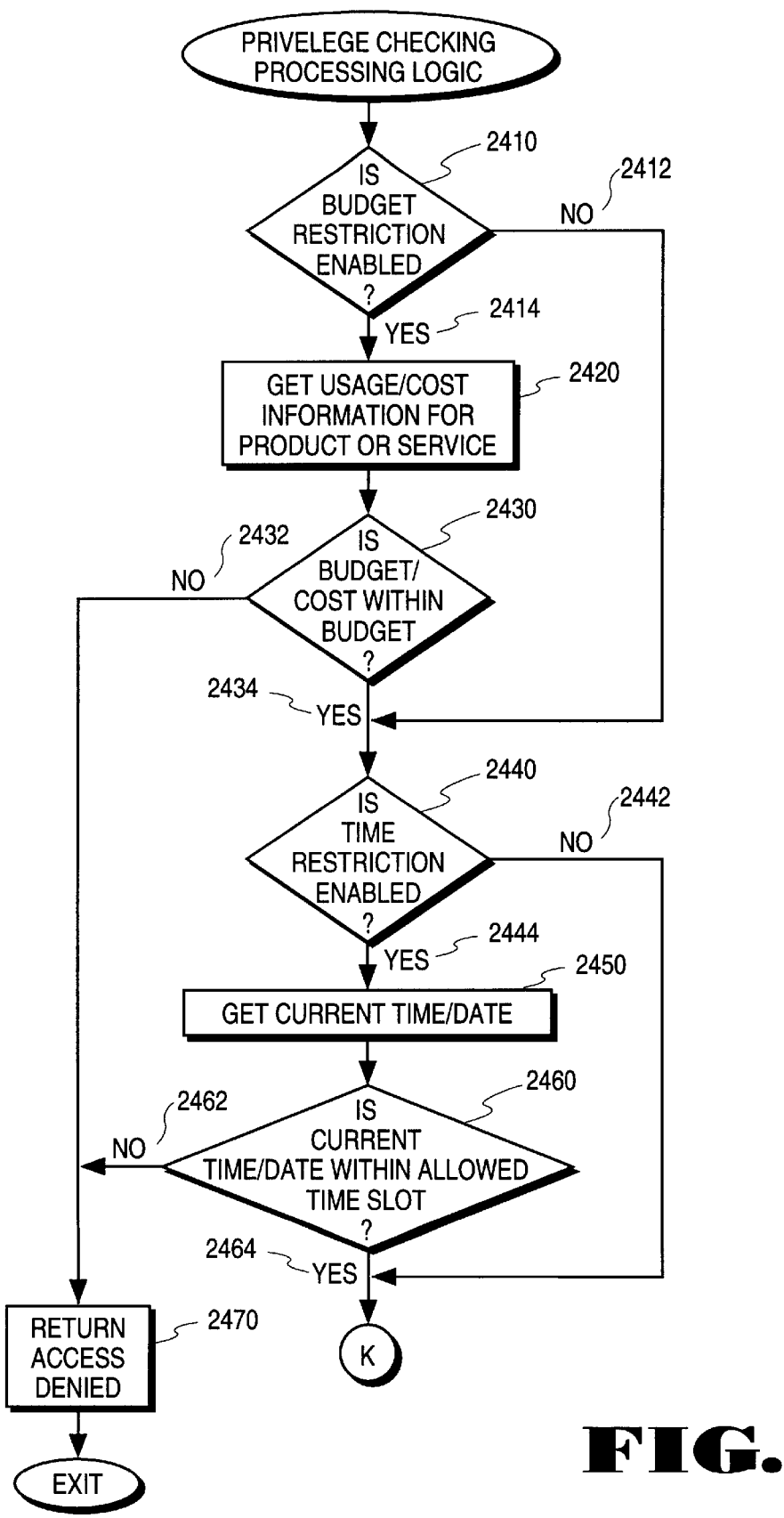
Figure 25:
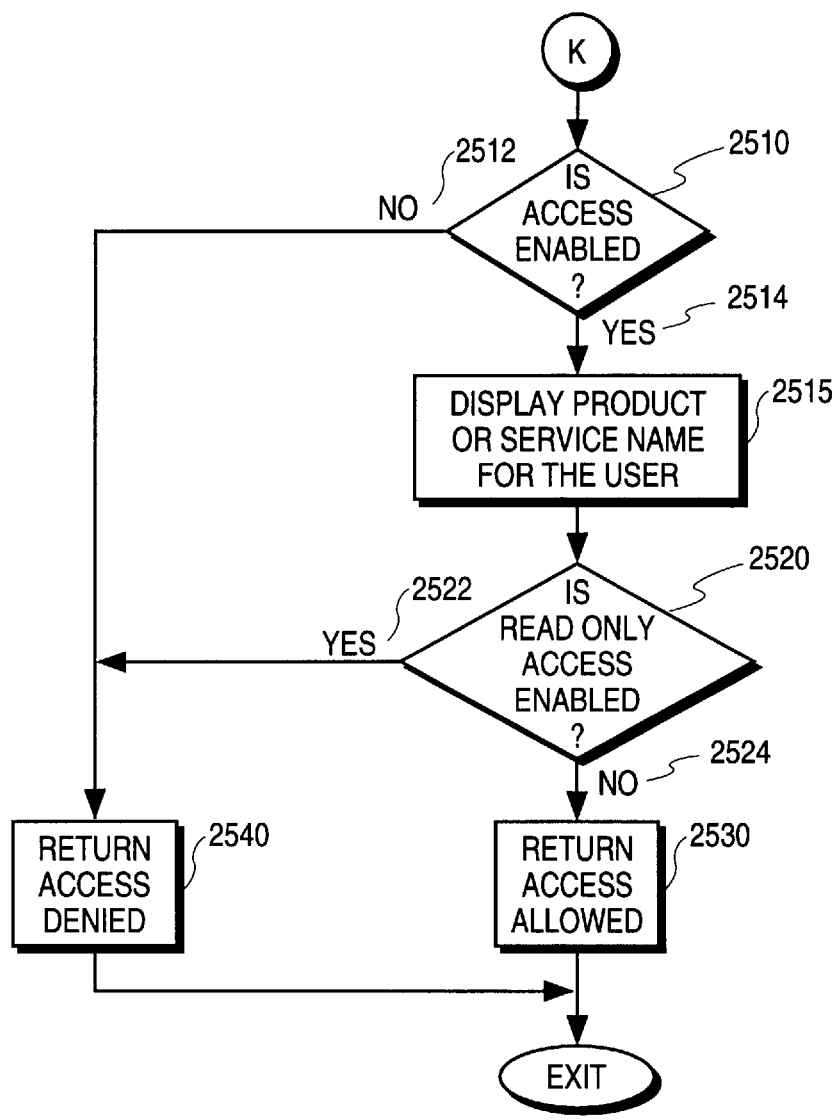

Referring now to FIGS. 20–25, the restriction processing logic of the present invention is illustrated. A separate figure illustrates the processing flow for each of the four restriction objects supported in the preferred embodiment. FIG. 20 illustrates the processing performed for handling a product object restriction. FIG. 21 illustrates the processing performed for handling a product group restriction. Product groups are implemented in the preferred embodiment as descriptor values as described earlier in this document. FIG. 22 illustrates the processing performed for handling a service object restriction. FIG. 23 illustrates the processing performed for handling a service group object restriction. FIGS. 24 and 25 illustrate the detailed processing performed for handling the various restriction types.

Referring now to FIG. 20, the product restriction processing logic of the present invention is illustrated. Product restrictions are the most difficult form of restriction in the preferred embodiment; because, the service and descriptor value restriction levels must also be checked for the appropriate privilege level. A user object reference (OR) and a product OR is provided as input to the product restriction logic. First, a test is performed to determine if the input user has access to the service with which the input product is associated (decision block 2010). If not, path 2012 is taken and the product access is denied in block 2060. If so, path 2014 is taken and a test is performed to determine if the user has product access privilege to the input product (decision block 2020). The steps performed for making this determination are described in more detail in connection with FIGS. 24–25. If the user does not have product access privilege (path 2022), product access is denied in block 2060. If the user does have product access privilege (path 2024), a list of descriptor values associated with the input product is generated in block 2030. For each of the descriptor values in the list, a test (block 2050) is performed to determine if the user has access privilege to the descriptor value. If the user does not have privilege to any of the descriptor values associated with the input product, product access is denied in block 2060. Otherwise, access to the product by the input user is allowed in block 2080 and processing is complete.

Referring now to FIG. 21, the processing logic for testing product group (descriptor value) restrictions is illustrated. The user OR and the product group or descriptor value OR is provided as input to this logic. In decision block 2110, a test is performed to determine if the input user has access privilege to the input descriptor value. If not, path 2112 is taken and product group/descriptor value access is denied in block 2130. If so, path 2114 is taken and product group/descriptor value access is allowed in block 2120. Control returns through the exit bubble shown in FIG. 21.

Referring now to FIG. 22, the processing logic for testing service restrictions is illustrated. The user OR and the service OR is provided as input to this logic. In decision block 2210, a test is performed to determine if the input user has access privilege to the input service. If not, path 2212 is taken and service access is denied in block 2230. If so, path 2214 is taken and service access is allowed in block 2220. Control returns through the exit bubble shown in FIG. 22.

Referring now to FIG. 23, the processing logic for testing service group restrictions is illustrated. The user OR and the service group OR is provided as input to this logic. In decision block 2310, a test is performed to determine if the input user has access privilege to the input service group. If not, path 2312 is taken and service group access is denied in block 2330. If so, path 2314 is taken and service group access is allowed in block 2320. Control returns through the exit bubble shown in FIG. 23.

Referring now to FIGS. 23 and 24, the logic for checking each of the various restriction types is illustrated. In the preferred embodiment, four restriction types are supported: budget, time, access, and read only access. The processing logic in FIGS. 24 and 25 tests the applicability of the restrictions for each of these four types. It will be apparent to those of ordinary skill in the art that other types of restrictions can be similarly tested using the disclosed structure.

Referring to FIG. 24, a test is performed in decision block 2410 to determine if a budget restriction is enabled. This test accesses the information stored in the database tables described above in connection with FIG. 19. If no budget restriction is enabled (path 2412), control passes to the test for the next restriction type. If there is a budget restriction (path 2420), the usage or cost information for the input product or service is retrieved. If the service or product access would not exceed the specified budget, path 2434 is taken to the logic for testing the next restriction type. Otherwise, the access is denied through block 2470.

The processing for the time restriction starts at decision block 2440 in FIG. 24. If there is a time restriction enabled (path 2444), the current date/time is retrieved in block 2450. If the product or service access is being made within a specified time range, path 2464 is taken to the logic for testing the next restriction type starting at bubble K shown in FIG. 25. Otherwise, the access is denied through block 2470.

Referring now to FIG. 25, logic for testing the next restriction type is shown starting at bubble K. If the access restriction type is enabled (or NO_ACCESS is disabled), path 2514 is taken to block 2515. Otherwise, the access is denied through block 2540. If the read only access restriction type is enabled, path 2522 is taken to where access is denied through block 2540. Otherwise, the access allowed indication is returned at block 2530. Processing for restrictions in the preferred embodiment is then complete.

The access (or NO_ACCESS) restriction is a type of restriction that prevents product or service data from being sent to the client device application. Restrictions from products and services are either NO_ACCESS or READ_ONLY in the preferred embodiment. NO_ACCESS restrictions prevent the product or service name from being sent to the client device. The READ_ONLY restriction allows the product or service name to be sent to the client device. In either case, the product or service is either restricted or not restricted. However, a READ_ONLY restriction allows a user to see an option even if the option is restricted from use.

The restriction processing logic described above is performed whenever a request is made by a user for a list of objects, when objects such as products are ordered, or when objects such as products are delivered. Depending upon the operation being performed and the level of object protection required, the client application can invoke the restriction processing logic of the present invention to control access to supported objects. Another portion of the client application can provide menus and prompts for allowing an authorized user or system administrator to initialize or create restriction information, which is stored into the database tables represented in FIG. 19. At the time of creating restriction information, the user OR of the creator is recorded in the database.

Event Handling

Figure 26:
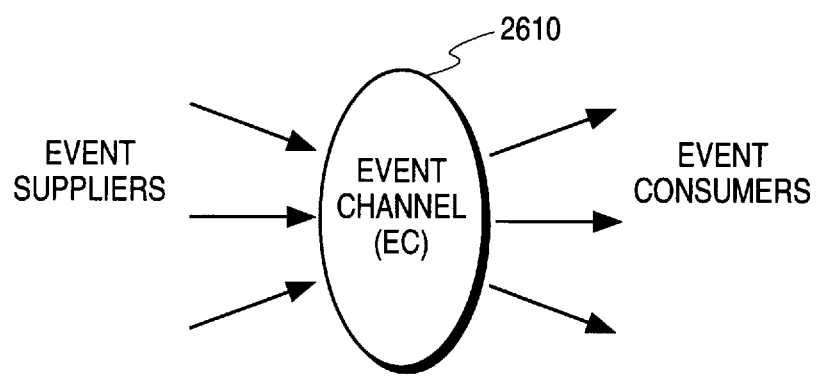
FIG. 26 illustrates the event handler of the preferred embodiment.

The present invention includes a capability for triggering events and for dispatching one or more event consumers in response to a particular triggered event. The client application is written to include explicit calls to an event object of the present invention. These calls are the event suppliers represented in FIG. 26. The Event Channel 2610 of the event object receives these calls from various sources, such as from CORBA 226. In response, the Event Channel 2610 activates one or more event consumers previously registered for a particular event. In the preferred embodiment, this is implemented as a process or task registration performed at initialization time or sometime prior to the occurance of the event of interest. Once registered, the event consumer task waits suspended until the occurance of the event of interest. When this occurs, the event consumer task or tasks corresponding to the event that occurred are activated. In this manner, system or business events can be monitored and appropriate action can be immediately taken when an event of interest occurs.

This event handling capability is particularly useful in an object oriented client/server system. In such a system, an event can be defined as any access to a particular object. In fact, even an access of a particular type, such as create, read, modify, or delete can be used to trigger a particular event. In this way, the useage of objects by users can be closely monitored. This monitoring capability is particularly useful for gathering marketing information for a client server system. Billing or advertising functions can be driven by this event monitoring information.

Thus, a better means and method for facilitating application program development in a networked computer system providing on-line services is disclosed. These specific arrangements and methods described herein are merely illustrative of the principles of this invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

Appendix A

Interactive Application Object Interface Specification

Contents

| Chapter 1 | Business Objects ................................................................. 1 |
|---|---|
| | Content ................................................................................ 3 |
| | ContentManager ................................................................ 5 |
| | ContentProvider ................................................................. 7 |
| | ContentProviderManager ................................................. 8 |
| | DeliveryItem ...................................................................... 9 |
| | DeliveryItemManager ..................................................... 10 |
| | DescriptorSet .................................................................... 11 |
| | DescriptorSetManager ..................................................... 12 |
| | DescriptorValue ............................................................... 13 |
| | DescriptorValueManager ................................................ 14 |
| | FeatureSet ......................................................................... 15 |
| | FeatureSetManager .......................................................... 16 |
| | FeatureValue ..................................................................... 17 |
| | FeatureValueManager ..................................................... 18 |
| | LogicalContent ................................................................. 19 |
| | LogicalContentManager ................................................. 21 |
| | Order .................................................................................. 22 |
| | OrderItem ......................................................................... 24 |
| | OrderItemManager ......................................................... 25 |
| | OrderManager .................................................................. 26 |
| | PriceList ............................................................................. 28 |
| | PriceListManager ............................................................. 29 |
| | Product .............................................................................. 30 |
| | ProductCategory .............................................................. 34 |
| | ProductCategoryManager .............................................. 36 |
| | ProductItem ...................................................................... 37 |
| | ProductItemManager ...................................................... 39 |
| | ProductManager ............................................................... 40 |
| | Stream ................................................................................ 42 |
| | StreamManager ................................................................ 43 |
| Chapter 2 | Session Objects ................................................................. 1 |
| | Account .............................................................................. 3 |
| | AccountManagement ....................................................... 8 |
| | AccountStatistics .............................................................. 9 |
| | Address .............................................................................. 12 |
| | ClientDevice ..................................................................... 13 |

Copyright © 1995, Oracle Corporation

| | | |
|---|---|---|
| | ClientDeviceManagement | 15 |
| | Consumer | 16 |
| | Control | 17 |
| | Coordinator | 18 |
| | EventChannel | 21 |
| | EventChannelFactory | 23 |
| | LogEvent | 24 |
| | NamingContext | 25 |
| | OrderFactory | 27 |
| | OrderItemFactory | 28 |
| | PaymentDevice | 29 |
| | Preference | 30 |
| | RecoveryCoordinator | 32 |
| | Resource | 33 |
| | ResourceFactory | 34 |
| | Restriction | 35 |
| | Service | 37 |
| | ServiceAgent | 40 |
| | ServiceAgentManagement | 42 |
| | ServiceAgentStatistics | 43 |
| | ServiceManagement | 45 |
| | ServiceStatistics | 46 |
| | Session | 49 |
| | SessionManagement | 52 |
| | SessionStatistics | 54 |
| | Supplier | 55 |
| | Terminator | 56 |
| | TransactionFactory | 57 |
| | TransactionalObject | 58 |
| | User | 59 |
| | UserManagement | 62 |
| | UserStatistics | 63 |
| Chapter 3 | System Event Objects | 1 |
| | MktEvent | 3 |
| | MktEventControl | 4 |
| | MktEventType | 5 |
| | MktEventTypeManager | 7 |
| | OrderEvent | 9 |
| | ProductEvent | 10 |
| | ServerEvents | 11 |
| | ServiceEvent | 12 |
| | SessionEvent | 14 |
| | StreamEvent | 15 |
| | SysEventControl | 16 |
| | SystemEventType | 18 |
| | SystemEventTypeManager | 19 |

CHAPTER 1

Business Objects

Business objects provide the framework to:

- View product attributes and features
- Preview a product
- View prices
- Order a product Each object is presented with a short description of what the object does and an example for the less obvious cases. The object members are also presented, separated into two member types, attributes and methods.

The objects covered in this chapter are:

| Object | Description | Page |
|---|---|---|
| Content | Represents physical content | 1-3 |
| ContentManager | Manages multiple Content objects | 1-5 |
| ContentProvider | Represents organizations that provide content | 1-7 |
| ContentProviderManager | Manages multiple ContentProvider objects | 1-8 |
| DeliveryItem | Represents a single delivery item | 1-9 |
| DeliveryItemManager | Manages multiple DeliveryItem objects | 1-10 |
| DescriptorSet | Groups a number of descriptor values | 1-11 |
| DescriptorSetManager | Manages multiple DescriptorSet objects | 1-12 |
| DescriptorValue | Represents a single descriptive attribute | 1-13 |

Table 1-1 Business Objects Listing

Copyright © 1995, Oracle Corporation

| Object | Description | Page |
|---|---|---|
| DescriptorValueManager | Manages multiple DescriptorValue objects | 1-14 |
| FeatureSet | Groups a number of feature values | 1-15 |
| FeatureSetManager | Manages multiple FeatureSet objects | 1-16 |
| FeatureValue | Represents a specific feature of a product | 1-17 |
| FeatureValueManager | Manages multiple FeatureValue objects | 1-18 |
| LogicalContent | Represents a content unit, composed of one or more pieces of content, meaningful to the user | 1-19 |
| LogicalContentManager | Manages multiple LogicalContent objects | 1-21 |
| Order | Contains a number of order items comprising a single order | 1-22 |
| OrderItem | Defines a product item to be included in an order | 1-24 |
| OrderItemManager | Manages multiple OrderItem objects | 1-25 |
| OrderManager | Manages multiple Order objects | 1-26 |
| PriceList | Collection of prices for products and product items in a particular service | 1-28 |
| PriceListManager | Manages multiple PriceList objects | 1-29 |
| Product | Offering sold via the set-top box | 1-30 |
| ProductCategory | Groups products into exclusive categories | 1-34 |
| ProductCategoryManager | Manages multiple ProductCategory objects | 1-36 |
| ProductItem | Represents a purchasable offering | 1-37 |
| ProductItemManager | Manages multiple ProductItem objects | 1-39 |
| ProductManager | Manages multiple ProductManager objects | 1-40 |
| Stream | Represents a real-time delivery of logical content | 1-42 |
| StreamManager | Manages multiple Stream objects | 1-43 |

Table 1-1 Business Objects Listing

Content

The Content object represents a piece of physical content on the system.

*Example:* The MPEG-encoded file of the movie Die Hard is represented to the system as a Content object.

Attributes

The Content object contains the attributes shown in Table 1-2:

| Attribute | Type | Description |
| --- | --- | --- |
| contentprovider | ContentProvider | Identifies the organization that created and owns the content. |
| description | string | Describes the content. |
| encodingformat | string | Identifies the content's encoding format. |
| filelength | long | Indicates the length of the content file. |
| filename | string | Names the content file. |
| name | string | Contains the content's name. Each name must be unique. |
| runlength | long | Indicates normal playback time for the content. |
| type | string | Identifies the type of content. |

Table 1-2 Content Attributes

Methods

You can use these methods to manage the Content object:

| Function | Description |
| --- | --- |
| createContent | Creates a content object. |
| destroyContent | Destroys the content object. |

Table 1-3 Content Methods createContent

Creates a content object.

```
Content createContent(in long type, in string name,
                in string description,
                in string filename,
                in long filelength,
                in long runlength,
```

```
                              in string encodingformat,
                              in ContentProvider contentprovider)
``` destroyContent

Destroys the content object.

```
boolean destroyContent()
```

ContentManager

The ContentManager object manages a list of content objects.

Attributes

ContentManager has no attributes.

Methods

You can use these methods to manage the ContentManager object:

| Function | Description |
| --- | --- |
| getContentByName | Returns the content object named name. |
| listContent | Lists the content objects held by the content manager. |
| listContentByCP | Lists the content objects held by the content manager provided by the content provider contentprovider. |
| listContentByEF | Lists the content objects held by the content manager encoded using the format in encodingformat. |
| listContentByFilename | Lists the content objects held by the content manager contained in the file filename. |
| listContentByType | Lists the content objects held by the content manager matching type. |
| listContentForLogicalContent | Lists the content objects held by the content manager that belong to the logical content object lcontent. |

Table 1-4 ContentManager Methods getContentByName

Returns the content object named name.

```
Content getContentByName(in string name)
``` listContent

Lists the content objects held by the content manager.

```
ContentList listContent()
``` listContentByCP

Lists the content objects held by the content manager provided by the content provider contentprovider.

```
ContentList listContentByCP(in ContentProvider contentprovider)
```

Business Objects 1-5 listContentByEF

Lists the content objects held by the content manager encoded using the format in encodingformat.

`ContentList listContentByEF(in string encodingformat)` listContentByFilename

Lists the content objects held by the content manager contained in the file filename.

`ContentList listContentByFilename(in string filename)` listContentByType

Lists the content objects held by the content manager matching type.

`ContentList listContentByType(in long type)` listContentForLogicalContent

Lists the content objects held by the content manager that belong to the logical content object lcontent.

`ContentList listContentForLogicalContent(in LogicalContent lcontent)`

ContentProvider

The ContentProvider object represents an organization, such as a movie studio, publishing house, retail marketer, and so on, that provides content for the system. Content objects use ContentProvider objects to identify the source of the content.

Attributes

The ContentProvider object contains the attributes shown in Table 1-5:

| Attribute | Type | Description |
|---|---|---|
| name | string | Contains the content provider's name. Each name must be unique. |

Table 1-5 ContentProvider Attributes

Methods

You can use these methods to manage the ContentProvider object:

| Function | Description |
|---|---|
| createContentProvider | Creates a content provider object. |
| destroyContentProvider | Destroys the content provider object. |

Table 1-6 ContentProvider Methods createContentProvider

Creates a content provider object.

```
ContentProvider createContentProvider(in string name)
``` destroyContentProvider

Destroys the content provider object.

```
boolean destroyContentProvider()
```

ContentProviderManager

The ContentProviderManager object manages lists of content provider objects.

Attributes

ContentProviderManager has no attributes.

Methods

You can use these methods to manage the ContentProviderManager object:

| Function | Description |
| --- | --- |
| getContentProviderByName | Returns a content provider object by name |
| listContentProviders | Lists the content provider objects in the content provider manager. |

Table 1-7 ContentProviderManager Methods getContentProviderByName

Returns the content provider object named name.

```
ContentProvider getContentProviderByName(in string name)
``` listContentProviders

Lists the content provider objects held by the content provider manager.

```
ContentProviderList listContentProviders()
```

DeliveryItem

The DeliveryItem object records that a product item was delivered to a user. The delivery item always corresponds to an order item created for an account.

Attributes

The DeliveryItem object contains the attributes shown in Table 1-8:

| Attribute | Type | Description |
|---|---|---|
| creationdatetime | readonly string | Contains the delivery item's creation date and time. |
| orderitem | readonly OrderItem | Order item with which this delivery item is associated. |

Table 1-8 DeliveryItem Attributes

Methods

You can use these methods to manage the DeliveryItem object:

| Function | Description |
|---|---|
| createDeliveryItem | Creates a delivery item object. |
| destroyDeliveryItem | Destroys the delivery item object. |

Table 1-9 DeliveryItem Methods createDeliveryItem

Creates a delivery item object.

```
DeliveryItem createDeliveryItem(in OrderItem orderitem)
``` destroyDeliveryItem

Destroys the delivery item object.

```
boolean destroyDeliveryItem()
```

DeliveryItemManager

The DeliveryItemManager object manages lists of delivery item objects.

Attributes

DeliveryItemManager has no attributes.

Methods

You can use these methods to manage the DeliveryItemManager object:

| Function | Description |
| --- | --- |
| listDeliveryItems | Lists the delivery item objects held by the delivery item manager. |
| listDeliveryItemsForOI | Lists the delivery item objects held by the delivery item manager that belong to a particular order item. |

Table 1-10 DeliveryItemManager Methods listDeliveryItems

Lists the delivery item objects held by the delivery item manager.

```
DeliveryItemList listDeliveryItems()
``` listDeliveryItemsForOI

Lists the delivery item objects held by the delivery item manager that belong to the order item orderitem.

```
DeliveryItemList listDeliveryItemsForOI(in OrderItem orderitem)
```

DescriptorSet

The DescriptorSet object groups descriptor values into a conceptual group. A descriptor set can be thought of as an enumerated listing.

*Example:* The DescriptorSet object genre groups the descriptor values western, drama, action, comedy, and horror.

Attributes

The DescriptorSet object contains the attributes shown in Table 1-11:

| Attribute | Type | Description |
| --- | --- | --- |
| description | string | Describes the descriptor set. |
| label | string | Identifies the descriptor set shown to the client device user. This does not have to be a unique identifier. |
| name | string | Contains the descriptor set's name. Each name must be unique. |

Table 1-11 DescriptorSet Attributes

Methods

You can use these methods to manage the DescriptorSet object:

| Function | Description |
| --- | --- |
| createDescriptorSet | Creates a descriptor set object. |
| destroyDescriptorSet | Destroys the descriptor set object. |
| listDescriptorValues | Lists the descriptor values that belong to this descriptor set. |

Table 1-12 DescriptorSet Methods createDescriptorSet

Creates a descriptor set object.

```
DescriptorSet createDescriptorSet(in string name,
                                  in string label,
                                  in string description)
``` destroyDescriptorSet

Destroys the descriptor set object.

```
void destroyDescriptorSet()
``` listDescriptorValues

Lists the descriptor values that belong to this descriptor set.

```
DescriptorValueList listDescriptorValues()
```

DescriptorSetManager

The DescriptorSetManager object manages lists of descriptor set objects.

Attributes

DescriptorSetManager has no attributes.

Methods

You can use these methods to manage the DescriptorSetManager object:

| Function | Description |
| --- | --- |
| getDescriptorSetUsingName | Returns a descriptor set object by name. |
| listDescriptorSets | Lists the descriptor set objects held by the descriptor set manager. |
| listDescriptorSetsByLabel | Returns a descriptor set object by label. |

Table 1-13 DescriptorSetManager Methods getDescriptorSetUsingName

Returns the descriptor set object named name.

```
DescriptorSet getDescriptorSetUsingName(in string name)
``` listDescriptorSets

Lists the descriptor set objects held by the descriptor set manager.

```
DescriptorSetList listDescriptorSets()
``` listDescriptorSetsByLabel

Returns the descriptor set object labeled label.

```
DescriptorSetList listDescriptorSetsByLabel(in string label)
```

DescriptorValue

The DescriptorValue object categorizes products for search purposes. You can think of descriptor values as being similar to an enumerated value.

*Example:* "Raising Arizona" would be categorized by the descriptor value comedy.

Attributes

The DescriptorValue object contains the attributes shown in Table 1-14:

| Attribute | Type | Description |
|---|---|---|
| description | readonly string | Describes the descriptor value. |
| descset | readonly DescriptorSet | Identifies the descriptor set with which this descriptor value is associated. |
| value | readonly string | Identifies the descriptor value. |

Table 1-14 DescriptorValue Attributes

Methods

You can use these methods to manage the DescriptorValue object:

| Function | Description |
|---|---|
| createDescriptorValue | Creates a descriptor value object. |
| destroyDescriptorValue | Destroys the descriptor value object. |

Table 1-15 DescriptorValue Methods createDescriptorValue

Creates a descriptor value object.

```
DescriptorValue createDescriptorValue(in string value,
                                      in string description,
                                      in DescriptorSet descset)
``` destroyDescriptorValue

Destroys the descriptor value object.

```
void destroyDescriptorValue()
```

DescriptorValueManager

The DescriptorValueManager object manages lists of descriptor value objects.

Attributes

DescriptorValueManager has no attributes.

Methods

You can use these methods to manage the DescriptorValueManager object:

| Function | Description |
|---|---|
| listDescriptorValues | Lists the descriptor value objects held by the descriptor value manager. |
| listDescriptorValuesInDS | Returns the descriptor set objects contained in a particular descriptor set. |
| listDescriptorValuesUsingValue | Returns a descriptor set object with a particular value. |

Table 1-16 DescriptorValueManager Methods listDescriptorValues

Lists the descriptor value objects held by the descriptor value manager.

```
DescriptorValueList listDescriptorValues()
``` listDescriptorValuesInDS

Returns the descriptor set objects contained in the descriptor set dset.

```
DescriptorValueList listDescriptorValuesInDS(in DescriptorSet dset)
``` listDescriptorValuesUsingValue

Returns the descriptor set object with the value value.

```
DescriptorValueList listDescriptorValuesUsingValue(in string dvalue)
```

FeatureSet

The FeatureSet object groups feature values into categories.

*Example:* The feature set color categorizes the feature values red, green, black, and blue.

Attributes

The FeatureSet object contains the attributes shown in Table 1-17:

| Attribute | Type | Description |
|---|---|---|
| description | string | Describes the feature set. |
| label | string | Identifies the feature set shown to the client device user. This does not have to be a unique identifier. |
| name | string | Contains the feature set's name. Each name must be unique. |

Table 1-17 FeatureSet Attributes

Methods

You can use these methods to manage the FeatureSet object:

| Function | Description |
|---|---|
| createFeatureSet | Creates a feature set object. |
| destroyFeatureSet | Destroys the feature set object. |
| listFeatureValues | Lists the feature values in a feature set. |

Table 1-18 FeatureSet Methods createFeatureSet

Creates a feature set object.

```
FeatureSet createFeatureSet(in string name,
                            in string description,
                            in FeatureValueList fvlist)
``` destroyFeatureSet

Destroys the feature set object.

```
boolean destroyFeatureSet(in FeatureSet featset)
``` listFeatureValues

Lists the feature values in a feature set.

```
FeatureValueList listFeatureValues()
```

FeatureSetManager

The FeatureSetManager object manages lists of feature set objects.

Attributes

FeatureSetManager has no attributes.

Methods

You can use these methods to manage the FeatureSetManager object:

| Function | Description |
| --- | --- |
| getFeatureSetByName | Returns a feature set with a particular name. |
| listFeatureSets | Lists the feature set objects held by the feature set manager. |
| listFeatureSetsByLabel | Returns a feature set with a particular label. |

Table 1-19 FeatureSetManager Methods getFeatureSetByName

Returns the feature set named name.

```
FeatureSet getFeatureSetByName(in string name)
``` listFeatureSets

Lists the feature set objects held by the feature set manager.

```
FeatureSetList listFeatureSets()
``` listFeatureSetsByLabel

Returns the feature set object labeled label.

```
FeatureSetList listFeatureSetsByLabel(in string label)
```

FeatureValue

The FeatureValue object is a specific feature which is used to identify one product item from a list of items associated to a product. Feature values are usually grouped into feature sets.

*Example:* A product associated with the color feature set could be distinguished by the feature value blue.

Attributes

The FeatureValue object contains the attributes shown in Table 1-20:

| Attribute | Type | Description |
| --- | --- | --- |
| description | readonly string | Describes the feature value. |
| featureset | readonly FeatureSet | Feature set with which this feature is associated. |
| value | readonly string | Identifies the feature value. |

Table 1-20 FeatureValue Attributes

Methods

You can use these methods to manage the FeatureValue object:

| Function | Description |
| --- | --- |
| createFeatureValue | Creates a feature value object. |
| destroyFeatureValue | Destroys the feature value object. |

Table 1-21 FeatureValue Methods createFeatureValue

Creates a feature value object.

```
FeatureValue createFeatureValue(in string value,
                                in string description,
                                in FeatureSet featset);
``` destroyFeatureValue

Destroys the feature value object.

```
boolean destroyFeatureValue()
```

FeatureValueManager

The FeatureValueManager object manages lists of feature value objects.

Attributes

FeatureValueManager has no attributes.

Methods

You can use these methods to manage the FeatureValueManager object:

| Function | Description |
| --- | --- |
| listFeatureValues | Lists the feature value objects held by the feature value manager. |
| listFeatureValuesByValue | Returns a feature value with a particular value. |
| listFeatureValuesInFeatureSet | Returns the feature value objects contained in a particular feature set. |

Table 1-22 FeatureValueManager Methods listFeatureValues

Lists the feature value objects held by the feature value manager.

```
FeatureValueList listFeatureValues()
``` listFeatureValuesByValue

Returns the feature value with the value value.

```
FeatureValueList listFeatureValuesByValue(in string value)
``` listFeatureValuesInFeatureSet

Returns the feature value objects contained in the feature set fset.

```
FeatureValueList listFeatureValuesInFeatureSet(in FeatureSet fset)
```

LogicalContent

The LogicalContent object represents a unit of content that is meaningful to the user. A unit of logical content is composed of one or more content objects or subsets of content objects. Each content object within the logical content is identified by its position in sequence.

*Example:* The logical content representing a movie preview might be composed of a number of pieces of content, including:

- A blurb in position 1, which might be a single content object
- A clip from the movie in position 2, which would be a subset of the actual movie content object
- Reviews of the movie in positions 3 and 4, which might be in a single content object or composed of references to other content objects

Attributes

The LogicalContent object contains the attributes shown in Table 1-23:

| Attribute | Type | Description |
| --- | --- | --- |
| description | string | Describes the logical content. |
| name | string | Contains the logical content's name. Each name must be unique. |
| usageType | readonly string | Identifies the use for the logical content, such as auxiliary content, advertisement content, product content, and so on. |

Table 1-23 LogicalContent Attributes

Methods

You can use these methods to manage the LogicalContent object:

| Function | Description |
| --- | --- |
| addContent | Adds a content object |
| createLogicalContent | Creates a logical content object. |
| destroyLogicalContent | Destroys the logical content object. |
| getContentInfoByPosition | Returns the content object at the given position |
| getContentList | Gets the content objects that make up the logical content object. |
| removeContent | Removes content from the logical content object. |
| updateContent | Updates the content object at the given position. |

Table 1-24 LogicalContent Methods addContent

> Adds a content object to the the logical content object.
>
> ```
> boolean addContent(in long position,
>                    in long startpos,
>                    in long stoppos,
>                    in boolean ffflag,
>                    in boolean rewflag,
>                    in boolean pauseflag)
> ``` createLogicalContent

> Creates a logical content object.
>
> ```
> LogicalContent createLogicalContent(in string usagetype,
>                                     in string description,
>                                     in string name)
> ``` destroyLogicalContent

> Destroys the logical content object.
>
> ```
> boolean destroyLogicalContent()
> ``` getContentInfoByPosition

> Returns the content object at the given position in the logical content object.
>
> ```
> Content getContentInfoByPosition(in long position,
>                                  out long startpos,
>                                  out long stoppos,
>                                  out boolean ffflag,
>                                  out boolean rewflag,
>                                  out boolean pauseflag)
> ``` getContentList

> Gets the content objects that make up the logical content object.
>
> ```
> ContentList getContentList()
> ``` removeContent

> Removes a content object from the logical content object.
>
> ```
> boolean removeContent(in long position)
> ``` updateContent

> Updates the content object at the given position within the logical content. Use this function to set the starting position and stopping position (in seconds from the beginning) used within the content object. The parameters passed for the boolean flags determine whether the particular content can be fast-forwarded, rewound, or paused.
>
> ```
> boolean updateContent(in long position,
>                       in long startpos,
>                       in long stoppos,
>                       in boolean ffflag,
>                       in boolean rewflag,
>                       in boolean pauseflag)
> ```

1-20

LogicalContentManager

The LogicalContentManager object manages lists of logical content objects.

Attributes

LogicalContentManager has no attributes.

Methods

You can use these methods to manage the LogicalContentManager object:

| Function | Description |
| --- | --- |
| getLogicalContentByNameandUT | Lists the logical content objects with a particular name and usage type. |
| listLogicalContent | Lists the logical content objects held by the logical content manager. |
| listLogicalContentByName | Lists the logical content objects with a particular name. |
| listLogicalContentByUsageType | Lists the logical content objects with a particular usage type. |

Table 1-25 LogicalContentManager Methods getLogicalContentByNameandUT

Lists the logical content objects held by the logical content manager named name and with the usage type usagetype.

```
LogicalContent getLogicalContentByNameandUT(in string name,
                                            in string usagetype)
``` listLogicalContent

Lists the logical content objects held by the logical content manager.

```
LogicalContentList listLogicalContent()
``` listLogicalContentByName

Lists the logical content objects held by the logical content manager named name.[1]

```
LogicalContentList listLogicalContentByName(in string name)
``` listLogicalContentByUsageType

Lists the logical content objects held by the logical content manager with the usage type usagetype.

```
LogicalContentList listLogicalContentByUsageType(in string usagetype)
```

Business Objects                                                                 1-21

Order

An Order contains a number of order items, with these items comprising a single order. This lets the consumer order a number of products but make only a single purchase. This can also be used as a marketing mechanism, where a certain order has a different price than a similar but different order.

*Example:* A content provider might provide a deal so that if a customer purchases three Humphrey Bogart movies, he or she receives a special bargain price. This bargain price may not be provided for an order of three Bela Lugosi movies.

Attributes

The Order object contains the attributes shown in Table 1-26:

| Attribute | Type | Description |
|---|---|---|
|  |  |  |
| status | string | A provider-defined status for the order. |

Table 1-26 Order Attributes

Methods

You can use these methods to manage the Order object:

| Function | Description |
|---|---|
| cancelOrder | Cancels the order. |
| confirmOrder | Confirms the order. |
| createOrder | Creates an order object. |
| destroyOrder | Destroys the order object. |
| listOrderItems | Lists the order item objects in the order object. |

Table 1-27 Order Methods cancelOrder

Cancels the order.

```
boolean cancelOrder(in string reason)
``` confirmOrder

Confirms the order.

```
long confirmOrder(in Session session, in AccountPaymentDevice acctpaydev)
```

1-22 createOrder
: Creates an order object.

```
Order createOrder(in Session session,
                 in User user,
                 in Service service)
``` destroyOrder
: Destroys the order object.

```
boolean destroyOrder(in Order order)
``` listOrderItems
: Lists the order item objects in the order object.

```
OrderItemList listOrderItems()
```

OrderItem

The OrderItem object defines a specific product item to be included in an order.

Attributes

-

- The OrderItem object contains the attributes shown in Table 1-28:

| Attribute | Type | Description |
|---|---|---|
| amount | readonly float | Full price for all order items (price x quantity) |
| price | readonly float | The price for the product item ordered through this order item. |
| productitem | readonly ProductItem | List of the product items that make up this order item. |
| quantity | readonly long | The number of units of a given product item in an order item. |

Table 1-28 OrderItem Attributes

Methods

You can use these methods to manage the OrderItem object:

| Function | Description |
|---|---|
| createOrderItem | Creates an order item object. |
| destroyOrderItem | Destroys the order item. |

Table 1-29 OrderItem Methods createOrderItem

Creates an order item object.

```
OrderItem createOrderItem(in ProductItem productitem,
                          in long quantity,
                          in PriceList pricelist,
                          in Order order)
``` destroyOrderItem

Destroys the order item.

```
boolean destroyOrderItem(in Order order)
```

OrderItemManager

The OrderItemManager object manages lists of order item objects.

Attributes

- OrderItemManager has no attributes.

Methods

You can use these methods to manage the OrderItemManager object:

| Function | Description |
| --- | --- |
| listOrderItems | Lists the order item objects held by the order item manager. |
| listOrderItemsInOrder | Lists the order item objects held by the order item manager that are contained in a particular order. |

Table 1-30 OrderItemManager Methods listOrderItems

Lists the order item objects held by the order item manager.

```
OrderItemList listOrderItems()
``` listOrderItemsInOrder

Lists the order item objects held by the order item manager that are contained in the order object order.

```
OrderItemList listOrderItemsInOrder(in Order order)
```

OrderManager

The OrderManager object manages lists of order objects.

Attributes

OrderManager has no attributes.

Methods

You can use these methods to manage the OrderManager object:

| Function | Description |
| --- | --- |
| listCancelledOrders | Lists the cancelled order objects held by the order manager. |
| listCancelledOrdersForAccount | Lists the cancelled orders for a particular account held by the order manager. |
| listCancelledOrdersForUser | Lists the cancelled orders for a particular user held by the order manager. |
| listConfirmedOrders | Lists the confirmed orders held by the order manager. |
| listConfirmedOrdersForAccount | Lists the confirmed orders for a particular account held by the order manager. |
| listConfirmedOrdersForUser | Lists the confirmed orders for a particular user held by the order manager. |
| listOrders | Lists the order objects held by the order manager. |
| listOrdersForAccount | Lists the orders for a particular account held by the order manager. |
| listOrdersForUser | Lists the orders for a particular user held by the order manager. |

Table 1-31 OrderManager Methods listCancelledOrders

Lists the order objects held by the order manager that have been cancelled.

```
OrderList listCancelledOrders()
``` listCancelledOrdersForAccount

Lists the order objects held by the order manager that have been cancelled for the account account.

```
OrderList listCancelledOrdersForAccount(in Account account)
``` listCancelledOrdersForUser

Lists the order objects held by the order manager that have been cancelled for the user user.

```
OrderList listCancelledOrdersForUser(in User user)
``` listConfirmedOrders

Lists the order objects held by the order manager that have been confirmed.

```
OrderList listConfirmedOrders()
``` listConfirmedOrdersForAccount

Lists the order objects held by the order manager that have been confirmed for the account account.

```
OrderList listConfirmedOrdersForAccount(in Account account)
``` listConfirmedOrdersForUser

Lists the order objects held by the order manager that have been confirmed for the user user.

```
OrderList listConfirmedOrdersForUser(in User user)
``` listOrders

Lists the order objects held by the order manager.

```
OrderList listOrders()
``` listOrdersForAccount

Lists the order objects held by the order manager for the account account.

```
OrderList listOrdersForAccount(in Account account)
``` listOrdersForUser

Lists the order objects held by the order manager for the user user.

```
OrderList listOrdersForUser(in User user)
```

PriceList

The PriceList object is a collection of prices for products and product items in a particular service.

Attributes

The PriceList object contains the attributes shown in Table 1-32:

| Attribute | Type | Description |
|---|---|---|
| description | string | Describes the price list. |
| name | string | Contains the price list's name. Each name must be unique. |
| service | readonly Service | Service with which the price list is associated. |

Table 1-32 PriceList Attributes

Methods

You can use these methods to manage the PriceList object:

| Function | Description |
|---|---|
| addAccountToPriceList | Adds an account to the price list. |
| createPriceList | Creates a new price list object. |
| destroyPriceList | Destroys the price list object. |

Table 1-33 PriceList Methods addAccountToPriceList

Adds the account object account to the price list.

```
void addAccountToPriceList(in Account account)
``` createPriceList

Creates a new price list object.

```
PriceList createPriceList(in Service service,
                         in string name,
                         in string description)
``` destroyPriceList

Destroys the price list object.

```
void destroyPriceList(in PriceList pricelist)
```

1-28

PriceListManager

The PriceListManager object manages lists of price lists.

Attributes

PriceListManager has no attributes.

Methods

You can use these methods to manage the PriceListManager object:

| Function | Description |
| --- | --- |
| getPriceList | Gets the applicable price list for a particular account from a service. |
| listPriceLists | Lists the price lists for all available services |
| listPriceListsForService | Lists the price lists for a service. |
| listPriceListsForAccount | Lists the price lists for an account. |

Table 1-34 PriceListManager Methods getPriceList

Gets the applicable price list for account from the service service.

```
PriceList getPriceList(in Service service, in Account account)
``` listPriceLists

Lists the price lists for all available services. Use the numrows parameter to specify how many items you want to list for this call. Use the position parameter to indicate at what point in the price list you want to start. position is incremented by numrows. This lets you get the list of prices in chunks to prevent blowing up memory in client devices.

```
PriceListList listPriceLists(in short numrows, inout short position)
``` listPriceListsForService

Lists the price lists for the service service. The listPriceLists function describes the numrows and position parameters.

```
PriceListList listPriceListsForService(in Service service,
                                       in short numrows,
                                       inout short position);
``` listPriceListsForAccount

Lists the price lists for the account account. The listPriceLists function describes the numrows and position parameters.

```
PriceList listPriceListsForAccount(in Account account,
                                   in short numrows,
                                   inout short position);
```

Product

The Product object is an offering sold via the set-top box.

The consumer cannot actually purchase a product represented by a Product object. Instead the product has one or more purchasable *product items* associated with it. To purchase the product, the user must specify the product's features before a single product item is identifiable.

*Example:* The product could be a Bullock & Jones pinpoint oxford shirt. To purchase the product, the consumer must first specify the appropriate features. In this case, these features would be the size and color of the shirt. The product item could then be the Bullock & Jones pinpoint oxford shirt, color blue and size 16/33.

Attributes

The Product object contains the attributes shown in Table 1-35:

| Attribute | Type | Description |
| --- | --- | --- |
| catalognumber | long | Identifies the product using a service-specific number. |
| description | string | Describes the product. |
| label | string | Identifies the product to the client device user. This does not have to be a unique identifier. |
| name | string | Contains the product's name. Each name must be unique. |
| pCategory | readonly ProductCategory | Product category containing this product. |
| producttype | string | Categorizes the product as being either interactive or non-interactive. |

Table 1-35 Product Attributes

Methods

You can use these methods to manage the Product object:

| Function | Description |
| --- | --- |
| addAssociatedProduct | Adds a product to the list of associated services. |
| addAuxiliaryContent | Adds logical content to the list of auxiliary content. |

Table 1-36 Product Methods

| Function | Description |
| --- | --- |
| addDescriptorValueToProduct | Adds a descriptor value to the product's descriptor set. |
| addFeatureSetToProduct | Adds a feature set to the product's list of features. |
| addServiceToProduct | Adds a new service to the product. |
| createProduct | Creates a product object. |
| destroyProduct | Destroys the product object. |
| dropAssociatedProduct | Removes an associated product from the list of associated products. |
| dropAuxiliaryContent | Removes logical content from the list of auxiliary content. |
| dropDescriptorValueFromProduct | Removes a descriptor value from the product's descriptor set. |
| dropFeatureSetFromProduct | Removes a feature set from the product's list of features. |
| dropServiceFromProduct | Removes a service from the the product. |
| getPrice | Gets the price for the product from a price list based on the current account. |
| listAssociatedProduct | Lists the associated products for this product object. |
| listAuxiliaryContent | Lists the auxiliary content for this product object. |
| listAuxiliaryContentByUsageType | Lists auxiliary content with a particular usage type for this product object. |
| listDescriptorValues | Lists this product's descriptor values |
| listFeatureSets | Lists the feature sets for this product. |
| listProductItemsInProduct | Lists the product items for this product. |
| listServices | Lists the services for this product. |
| setPrice | Sets a price for this product in a price list. |

Table 1-36 Product Methods addAssociatedProduct

Adds the associated product product to the object's list of associated services.

```
boolean addAssociatedProduct(in Product product)
``` addAuxiliaryContent

Adds a logical content object to the object's list of auxiliary content. Auxiliary includes such things as previews, informational collateral, and so on.

```
boolean addAuxiliaryContent(in LogicalContent lcontent)
``` addDescriptorValueToProduct

Adds a descriptor value to the product's descriptor set.

```
boolean addDescriptorValueToProduct(in DescriptorValue descval)
``` addFeatureSetToProduct

Adds a feature set to the product's list of features.

```
boolean addFeatureSetToProduct(in FeatureSet featset)
``` addServiceToProduct

Adds a new service to the product.

```
boolean addServiceToProduct(in Service service)
``` createProduct

Creates a product object.

```
Product createProduct(in ProductType prodtype,
                      in string name,
                      in string shortname,
                      in string description,
                      in long catnumber)
``` destroyProduct

Destroys the product object.

```
boolean destroyProduct(in Product product)
``` dropAssociatedProduct

Removes an associated product from the object's list of associated products.

```
boolean dropAssociatedProduct(in Product product)
``` dropAuxiliaryContent

Removes the logical content object lcontent from the object's list of auxiliary content.

```
boolean dropAuxiliaryContent(in LogicalContent lcontent)
``` dropDescriptorValueFromProduct

Removes a descriptor value from the product's descriptor set.

```
boolean dropDescriptorValueFromProduct(in DescriptorValue descval)
``` dropFeatureSetFromProduct

Removes a feature set from the product's list of features.

```
boolean dropFeatureSetFromProduct(in FeatureSet featset)
``` dropServiceFromProduct

Removes a service from the the product.

```
boolean dropServiceFromProduct(in Service service)
``` getPrice

Gets the correct price for the product from the price list plist based on the current account.

```
float getPrice(in PriceList plist)
``` listAssociatedProduct

Lists the associated products for this product object.

```
ProductList listAssociatedProduct()
``` listAuxiliaryContent

Lists the auxiliary content for this product object.

```
LContentList listAuxiliaryContent()
``` listAuxiliaryContentByUsageType

Lists the auxiliary content for this product object that has the usage type usage-type.

```
LContentList listAuxiliaryContentByUsageType(in string usagetype)
``` listDescriptorValues

Lists the descriptor values for this product.

```
DescriptorValueList listDescriptorValues()
``` listFeatureSets

Lists the feature sets for this product.

```
FeatureSetList listFeatureSets()
``` listProductItemsInProduct

Lists the product items contained in this product.

```
boolean listProductItemsInProduct(out ProductItemList productitems)
``` listServices

Lists the services contained in this product.

```
ServiceList listServices()
``` setPrice

Sets a price for this product and put in the price list plist.

```
boolean setPrice(in PriceList plist, in float price)
```

ProductCategory

The ProductCategory object groups products into mutually exclusive categories based on distinguishing attributes of the products.

*Example:* The movie "Big" is grouped in the VOD ProductCategory. The Banana Republic button-down shirt is grouped in the Retail ProductCategory.

Attributes

The ProductCategory object contains the attributes shown in Table 1-37:

| Attribute | Type | Description |
| --- | --- | --- |
| description | string | Describes the product category. |
| name | string | Contains the product category's name. Each name must be unique. |

Table 1-37 ProductCategory Attributes

Methods

You can use these methods to manage the ProductCategory object:

| Function | Description |
| --- | --- |
| addDescriptorSet | Adds a descriptor set to the product category. |
| createProductCategory | Creates a new ProductCategory object. |
| destroyProductCategory | Destroys the ProductCategory object. |
| listDescriptorSets | Returns a list of references to the descriptors for the product category. |
| removeDescriptorSet | Removes a descriptor set from the product category. |

Table 1-38 ProductCategory Methods addDescriptorSet

Adds a descriptor set to the product category.

```
boolean addDescriptorSet(in DescriptorSet dset)
``` createProductCategory

Creates a new ProductCategory object.

```
ProductCategory createProductCategory(in string name,
                                      in string description)
``` destroyProductCategory

Destroys the ProductCategory object.

```
boolean destroyProductCategory()
``` listDescriptorSets

Returns a list of references to the descriptors for the product category.

```
DescriptorSetList listDescriptorSets()
``` removeDescriptorSet

Removes a descriptor set from the product category.

```
boolean removeDescriptorSet(in DescriptorSet dset)
```

ProductCategoryManager

The ProductCategoryManager object manages lists of product category objects.

Attributes

ProductCategoryManager has no attributes.

Methods

You can use these methods to manage the ProductCategoryManager object:

| Function | Description |
|---|---|
| listProductCategories | Lists the product categories contained in the product category manager. |
| listProductCategoriesHavingDS | Lists the product categories with a particular descriptor set. |

Table 1-39 ProductCategoryManager Methods listProductCategories

Lists the product categories contained in the product category manager.

```
ProductCategoryList listProductCategories()
``` listProductCategoriesHavingDS

Lists the product categories contained in the product category manager having a descriptor set matching the dset descriptor set.

```
ProductCategoryList listProductCategoriesHavingDS(in DescriptorSet dset)
```

ProductItem

The ProductItem object represents a service provider's purchasable offering. A product item is a product that has features and feature values defined for it. See page 1-30 for more on the distinction between products and product items.

Attributes

The ProductItem object contains the attributes shown in Table 1-40:

| Attribute | Type | Description |
|---|---|---|
| description | string | Describes the product item. |
| name | string | Contains the product item's name. Each name must be unique. |

Table 1-40 ProductItem Attributes

Methods

You can use these methods to manage the ProductItem object:

| Function | Description |
|---|---|
| addAuxiliaryContent | Adds a logical content object to the object |
| addFeatureValue | Adds a feature value to the object's feature set. |
| createProductItem | Creates a product item object. |
| destroyProductItem | Destroys the product item. |
| dropAuxiliaryContent | Removes a logical content object from the object |
| dropFeatureValue | Removes a feature value from the item's feature set. |
| getPrice | Gets the price for the product from a price list. |
| listAuxiliaryContent | Lists the auxiliary content for this product item. |
| listFeatureValues | Lists the feature values for this product. |
| setPrice | Sets a price for this product and puts in a price list. |

Table 1-41 ProductItem Methods addAuxiliaryContent

Adds a logical content object to the object's list of auxiliary content. Auxiliary includes such things as previews, informational collateral, and so on.

```
void addAuxiliaryContent(in LogicalContent lcontent)
``` addFeatureValue

Adds a feature value to the object's feature set.

```
void addFeatureValue(in FeatureValue featurevalue)
``` createProductItem

Creates a product item object.

```
Product createProductItem(in string name,
                          in string itemtype,
                          in string description)
``` destroyProductItem

Destroys the product item.

```
void destroyProductItem()
``` dropAuxiliaryContent

Removes the logical content object lcontent from the object's list of auxiliary content.

```
void dropAuxiliaryContent(in LogicalContent lcontent)
``` dropFeatureValue

Removes a feature value from the product's feature set.

```
void dropFeatureValue(in FeatureValue featurevalue)
``` getPrice

Gets the correct price for the product from the price list plist.

```
float getPrice(in PriceList plist)
``` listAuxiliaryContent

Lists the auxiliary content for this product item object.

```
LContentList listAuxiliaryContent(in short NumItems,
                                  inout short Position)
``` listFeatureValues

Lists the feature values for this product.

```
FeatureValueList listFeatureValues(in short NumItems,
                                   inout short Position);
``` setPrice

Sets a price for this product and put in the price list plist.

```
float setPrice(in PriceList plist, in float price)
```

1-38

ProductItemManager

The ProductItemManager object manages lists of product item objects.

Attributes

ProductItemManager has no attributes.

Methods

You can use these methods to manage the ProductItemManager object:

| Function | Description |
| --- | --- |
| getProductItemUsingFeatureValues | Gets the product items contained in the product with particular feature values. |
| listProductItems | Lists the product items contained in the product item manager. |
| listProductItemsForProduct | Lists the product items associated with a particular contained in the product item manager. |

Table 1-42 ProductItemManager Methods getProductItemUsingFeatureValues

Gets the product items contained in the product object product that have the feature values contained in the feature value list feature.

```
ProductItem getProductItemUsingFeatureValues(in Product product,
                                             in FeatureValueList feature,
                                             in short NumItems,
                                             inout short Position)
``` listProductItems

Lists the product items contained in the product item manager.

```
ProductItemList listProductItems(in short NumItems, inout short Position)
``` listProductItemsForProduct

Lists the product items contained in the product item manager.

```
ProductItemList listProductItemsForProduct(in Product product,
                                           in short NumItems,
                                           inout short Position)
```

ProductManager

The ProductManager object manages lists of product objects.

Attributes

ProductManager has no attributes.

Methods

You can use these methods to manage the ProductManager object:

| Function | Description |
| --- | --- |
| getProductByCatNumber | Lists the products contained in a service that match a particular catalog number. |
| getProductByName | Gets a list of all products with a particular name in a single service. |
| listProducts | Lists the products contained in the product manager. |
| listProductsByCategory | Lists the products in a single service matching a particular product category. |
| listProductsByDescValues | Lists the products contained in a service that match a list of descriptor values. |
| listProductsByLabel | Lists products in a service with a particular label. |
| listProductsByType | Lists the products contained in the product manager object with a particular label. |
| listProductsForService | List the products associated with a particular service contained in the product manager. |

Table 1-43 ProductManager Methods getProductByCatNumber

Lists the products contained in service that match the catalog number catnumber.

```
Product getProductByCatNumber(in Service service,
                              in long catnumber)
``` getProductByName

Gets a product list from service for all products named name.[2]

```
ProductList getProductByName(in Service service,
                             in string name)
``` listProducts

> Lists the products contained in the product manager.
>
> ```
> ProductList listProducts()
> ``` listProductsByCategory

> Lists the products in service matching the product category pcategory.
>
> ```
> ProductList listProductsByCategory(in Service service,
>                                    in ProductCategory pcategory)
> ``` listProductsByDescValues

> Lists the products contained in service that match the descriptor values contained in dvlist.
>
> ```
> ProductList listProductsByDescValues(in Service service,
>                                      in DescriptorValueList dvlist)
> ``` listProductsByLabel

> Lists the products contained in service that are labeled label.
>
> ```
> ProductList listProductsByLabel(in Service service,
>                                 in string label)
> ``` listProductsByType

> Lists the products contained in the product manager object that have the label label.
>
> ```
> ProductList listProductsByType(in string ptype)
> ``` listProductsForService

> List the products contained in the product manager that are associated with service.
>
> ```
> ProductList listProductsForService(in Service service)
> ```

Stream

The Stream object represents a real-time delivery of a specified logical content from the Media Server to the client device.

Attributes

The Stream object contains the attributes shown in Table 1-44:

| Attribute | Type | Description |
| --- | --- | --- |
| currentposition | readonly long | Current stream position. |
| lcontent | readonly LogicalContent | Logical content object being delivered by the stream. |
| status | readonly string | Identifies the stream's state. |
| session | readonly Session | Session being served by the stream. |

Table 1-44 Stream Attributes

Methods

You can use these methods to manage the Stream object:

| Function | Description |
| --- | --- |
| createStream | Creates a stream object. |
| destroyStream | Destroys the stream object. |
| play | Plays the stream object. |

Table 1-45 Stream Methods createStream

Creates a stream object.

```
Stream createStream(in LogicalContent content,
                    in Session session)
``` destroyStream

Destroys the stream object.

```
boolean destroyStream()
``` play

Plays the stream object, starting at startposition and playing through stopposition, using the playback rate playrate.

```
boolean play(in long startposition,
             in long stopposition,
             in long playrate)
```

StreamManager

The StreamManager object manages lists of stream objects.

Attributes

StreamManager has no attributes.

Methods

You can use these methods to manage the StreamManager object:

| Function | Description |
| --- | --- |
| listStreams | List the streams contained in the stream manager object. |
| listStreamsForLogicalContent | List the streams associated with a logical content object. |

Table 1-46 StreamManager Methods listStreams

List the streams contained in the stream manager object.

```
StreamList listStreams()
``` listStreamsForLogicalContent

List the streams contained in the logical content object lcontent.

```
StreamList listStreamsForLogicalContent(in LogicalContent lcontent)
```

CHAPTER 2
Session Objects

Session objects provide the framework to:

- 
- 
- 
-

Each object is presented with a short description of what the object does and an example for the less obvious cases. The object members are also presented, separated into two member types, attributes and methods.

The objects covered in this chapter are:

| Object | Description | Page |
|---|---|---|
| Account | | 2-3 |
| AccountManagement | | 2-8 |
| AccountStatistics | | 2-9 |
| Address | | 2-12 |
| ClientDevice | | 2-13 |
| ClientDeviceManagement | | 2-15 |
| Consumer | | 2-16 |
| Control | | 2-17 |
| Coordinator | | 2-18 |
| EventChannel | | 2-21 |

Table 2-1 Session Objects Listing

Copyright © 1995, Oracle Corporation

| Object | Description | Page |
|---|---|---|
| EventChannelFactory | | 2-23 |
| LogEvent | | 2-24 |
| NamingContext | | 2-25 |
| OrderFactory | | 2-27 |
| OrderItemFactory | | 2-28 |
| PaymentDevice | | 2-29 |
| Preference | | 2-30 |
| RecoveryCoordinator | | 2-32 |
| Resource | | 2-33 |
| ResourceFactory | | 2-34 |
| Restriction | | 2-35 |
| Service | | 2-37 |
| ServiceAgent | | 2-40 |
| ServiceAgentManagement | | 2-42 |
| ServiceAgentStatistics | | 2-43 |
| ServiceManagement | | 2-45 |
| ServiceStatistics | | 2-46 |
| Session | | 2-49 |
| SessionManagement | | 2-52 |
| SessionStatistics | | 2-54 |
| Supplier | | 2-55 |
| Terminator | | 2-56 |
| TransactionFactory | | 2-57 |
| TransactionalObject | | 2-58 |
| User | | 2-59 |
| UserManagement | | 2-62 |
| UserStatistics | | 2-63 |

Table 2-1 Session Objects Listing

Account

The Account object maintains an account record, including:

- Owner's name
- Available credit and current balance
- Available payment methods
- Usage restrictions and preferences

Attributes

The Account object contains the attributes shown in Table 2-2:

| Attribute | Type | Description |
|---|---|---|
| accountStat | readonly AccountStatistics | Contains statistical information about the account; see page 2-9 |
| availableCredit | double | Specifies the amount of available credit left to the account |
| balance | double | Specifies the outstanding balance for the account |
| creditLimit | double | Specifies the account's credit limit |
| defaultPaymentDevice | PaymentDevice | Specifies the account's default method of payment |
| deviceList | readonly ClientDeviceList | Lists the client devices supported for this account |
| firstName | string | Contains the first name of the account's primary user |
| homeAddress | Address | Contains the home address to which the account is credited |
| lastName | string | Contains the last name of the account's primary user |
| middleName | string | Contains the middle name of the account's primary user |
| paymentDeviceList | readonly PaymentDeviceList | Contains a list of the account's available methods of payment |
| preferences | readonly PreferenceList | Contains a list of user preferences for the account |

Table 2-2 Account Attributes

| Attribute | Type | Description |
| --- | --- | --- |
| restrictions | readonly RestrictionList | Contains a list of restrictions for the account |
| shippingAddress | Address | Contains the address to which deliverable merchandise ordered from the account is shipped |
| subscribedServiceList | readonly ServiceList | Lists the services to which the account is currently subscribed |
| title | string | Contains a title (such as "Mr.," "Ms.," "Dr.," and so) for the account's primary user |
| userList | readonly UserList | Contains a list of valid users for the account |

Table 2-2 Account Attributes

Methods

You can use these methods to manage the Account object:

| Function | Description |
| --- | --- |
| addClientDevice | Adds a new client device to the list of client devices supported for this account |
| addPaymentDevice | Adds a new method of payment to the account |
| addPreference | Adds a preference to the account |
| addRestriction | Adds a restriction to the account |
| addUser | Adds a new user to the account |
| createAccount | Creates an Account object |
| destroyAccount | Destroys the Account object |
| dropClientDevice | Removes a client device from the list of client devices supported for this account |
| dropPaymentDevice | Removes a method of payment from the account |
| dropPreference | Drops a preference from the account |
| dropRestriction | Drops a restriction from the account |
| dropUser | Removes a user from the account |

Table 2-3 Account Methods

| Function | Description |
| --- | --- |
| getAccountOwner | Gets the name (first, middle, last, and title) of the account owner |
| getAccountStatus | Gets the status of the account |
| listClientDevices | List the client devices supported for this account |
| listSubscribedServices | Lists the services to which the account is currently subscribed |
| listUsers | Lists the valid users for the account |
| setAccountOwner | Changes the account owner |
| setAccountStatus | Sets the status of the account |
| subscribeToService | Subscribes the account to a new service |
| unSubscribeToService | Unsubscribes the account from a service |

Table 2-3 Account Methods addClientDevice

Adds a client device to the list of client devices usable on this account.

```
boolean addClientDevice(in ClientDevice clientdevice)
``` addPaymentDevice

Adds a payment device to the account's list of available payment methods.

```
boolean addPaymentDevice(in PaymentDevice paymentDevice)
``` addPreference

Adds a preference to the account's list of preferences.

```
boolean addPreference(in Preference preference)
``` addRestriction

Adds a restriction to the account's list of restrictions.

```
boolean addRestriction(in Restriction restriction)
``` addUser

Adds a user to the account's list of valid users.

```
boolean addUser(in User user)
``` createAccount[1]

Creates an account with the specified parameters. The user set with the firstName, middleName, and lastName is set as the default primary user.

```
Account createAccount(in string title,
                     in string firstName,
                     in string middleName,
                     in string lastName,
                     in double creditLimit,
                     in Address shippingAddress,
                     in Address homeAddress)
``` destroyAccount[2]

Destroys the account object.

```
boolean destroyAccount()
``` dropClientDevice

Drops a client device from the list of client devices usable on this account.

```
boolean dropClientDevice(in ClientDevice clientdevice)
``` dropPaymentDevice

Drops a payment device from the account's list of available payment methods.

```
boolean dropPaymentDevice(in PaymentDevice paymentDevice)
``` dropPreference

Drops a preference from the account's list of preferences.

```
boolean dropPreference(in Preference preference)
``` dropRestriction

Drops a restriction from the account's list of restrictions.

```
boolean dropRestriction(in Restriction restriction)
``` dropUser

Drops a user from the account's list of valid users.

```
boolean dropUser(in User user)
``` getAccountOwner

Gets the full name and title of the account's owner.

```
boolean getAccountOwner(out string title,
                       out string firstName,
                       out string middleName,
                       out string lastName)
``` getAccountStatus

Gets the status of the account and returns it as a numeric code with a corresponding string description. The values for the status code and description are implementation defined.

```
boolean getAccountStatus(out long status, out string reason)
``` listClientDevices

Lists all the client devices usable on this account.

```
ClientDeviceList listClientDevices()
``` listSubscribedServices

Lists all services to which the account is currently subscribed.

```
ServiceList listSubscribedServices()
``` listUsers

Lists the valid users for the account.

```
boolean listUsers(out UserList users)
``` setAccountOwner

Sets the name and title of the account's owner.

```
boolean setAccountOwner(in string title,
                        in string firstName,
                        in string middleName,
                        in string lastName)
``` setAccountStatus

Sets the status of the account as a numeric code with a corresponding string description.

```
boolean setAccountStatus(in long status, in string reason)
``` subscribeToService

Adds a service to the account's list of subscribed services.

```
boolean subscribeToService(in Service service)
``` unSubscribeToService

Removes a service from the account's list of subscribed services.

```
boolean unSubscribeToService(in Service service)
```

AccountManagement

The AccountManagement object manages lists of account objects.

Attributes

AccountManagement has no attributes.

Methods

You can use these methods to manage the AccountManagement object:

| Function | Description |
| --- | --- |
| getAccountUsingNumber | Returns an account object with a given account number |
| listAccounts | Lists the account objects in the account manager | getAccountUsingNumber

Returns an account object with a given account number. Note that the account number is given as a string, not as a number.

```
Account getAccountUsingNumber(in string accountNumber)
``` listAccounts

Lists the account objects in the account manager.

```
AccountList listAccounts()
```

AccountStatistics

The AccountStatistics object contains performance and service information about an account, including:

- A count of abnormal disconnects of client devices from the server
- The number of purchases made on the account
- Number of sessions currently suspended
- Total number of logins
- Total number of purchases
- Total connect time

Attributes

The AccountStatistics object contains the attributes shown in Table 2-4:

| Attribute | Type | Description |
| --- | --- | --- |
| abnormalDisconnectCount | readonly long | A count of the number of times client devices from the account have abnormally disconnected from the server (been turned off, crashed, and so on) |
| numberDetailsViewed | readonly long | A count of the number of details viewed from the account |
| numberPurchases | readonly long | A count of the number of purchases made on the account |
| suspendedSessionCount | readonly long | A count of the number of currently suspended sessions from this account |
| totalConnectTime | readonly long | Total connect time for all logins for this account in milliseconds |
| totalLogins | readonly long | A count of the total number of logins from this account |
| totalPurchases | readonly long | A count of the total number of purchases from this account |
| totalServiceConnected | readonly long | A count of the total number of services to which this account has been connected |

Table 2-4 AccountStatistics Attributes

Methods

You can use these methods to manage the AccountStatistics object:

| Function | Description |
| --- | --- |
| incrementAbnormalDisconnectCount | Add one to the count of abnormal disconnects |
| incrementNumberDetailsViewed | Add one to the count of viewed details |
| incrementNumberPurchases | Add one to the number of purchases |
| incrementSuspendedSessionCount | Add one to the number of suspended sessions |
| incrementTotalLogins | Add one to the number of logins |
| incrementTotalPurchases | Add one to the number of purchases |
| incrementTotalServiceConnected | Add one to the number of connected services |
| updateTotalConnectTime | Add the length of the current connection time to the total connection time |

Table 2-5 AccountStatistics Methods incrementAbnormalDisconnectCount

Add one to the count of abnormal disconnects. This method should be called by the methods handling abnormal disconnection exceptions.

```
boolean incrementAbnormalDisconnectCount()
``` incrementNumberDetailsViewed[3]

Add one to the count of viewed details. This method should be called by any service when a user views product details.

```
boolean incrementNumberDetailsViewed()
``` incrementNumberPurchases

Add one to the count of purchases. This method should be called by any service when a user purchases a product item.

```
boolean incrementNumberPurchases()
``` incrementSuspendedSessionCount[4]

Add one to the count of suspended sessions. This method should be called by gateway applications whenever a user suspends a logon session.[5]

```
boolean incrementSuspendedSessionCount()
``` incrementTotalLogins

Add one to the count of logins for this account. This method should be called by gateway applications whenever a user logs into the server.

```
boolean incrementTotalLogins()
``` incrementTotalPurchases

Add one to the count of purchases. This method should be called by any service when a user purchases a product item.[6]

```
boolean incrementTotalPurchases()
``` incrementTotalServiceConnected

Add one to the number of connected services. This method should be called by every service when a user from the account connects to the service.

```
boolean incrementTotalServiceConnected()
``` updateTotalConnectTime

Add the length of the current connection time to the total connection time. This method should be called by gateway applications whenever a user logs out of the server.

```
boolean updateTotalConnectTime(in string sessionTime)
```

Address

The Address object provides a standard storage mechanism for customer addresses.

Attributes

The Address object contains the attributes shown in Table 2-6:

| Attribute | Type | Description |
|---|---|---|
| address1 | string | Street number and name |
| address2 | string | City, State, and Zip |
| address3 | string | Country |
| address4 | string | Other address information |
| faxNumber | string | Contains a fax number |
| phoneNumber | string | Contains a phone number |

Table 2-6 Address Attributes

Methods

You can use these methods to manage the Address object:

| Function | Description |
|---|---|
| createAddress | Creates an address object. |
| destroyAddress | Destroys the address object. |

Table 2-7 Address Methods createAddress[7]

Creates an address object.

```
Address createAddress(in string phoneNumber,
                     in string address1,
                     in string address2,
                     in string address3,
                     in string address4)
``` destroyAddress[8]

Destroys the address object.

```
boolean destroyAddress()
```

ClientDevice

The ClientDevice object stores information about a client device, including:

- Make, model, and manufacture
- Rental fee, if any
- Network address
- Serial number This object lets the server address client devices generically through the ClientDevice object interface.

Attributes

The ClientDevice object contains the attributes shown in Table 2-8:

| Attribute | Type | Description |
|---|---|---|
| account | Account | Contains information about the account to which the client device is registered |
| manufacturer | string | Contains the device's manufacturer |
| modelName | string | Contains the device's model name |
| modelNumber | string | Contains the device's model number |
| networkAddress | string | Contains the device's network address |
| rentalFee | double | Contains the rental fee charged for the client device |
| serialNumber | string | Contains the device's serial number |

Table 2-8 ClientDevice Attributes

Methods

You can use these methods to manage the ClientDevice object:

| Function | Description |
|---|---|
| destroyClientDevice | Destroys the client device object |
| getModelInfo | Returns information about the client device |

Table 2-9 ClientDevice Methods destroyClientDevice[9]

Destroys the client device object.

```
boolean destroyClientDevice()
``` getModelInfo

Returns make, model, and manufacturer information about the client device.

```
boolean getModelInfo(out string modelName,
                     out string modelNumber,
                     out string manufacturer)
```

ClientDeviceManagement

The ClientDeviceManagement object manages lists of client device objects.

Attributes

ClientDeviceManagement has no attributes.

Methods

You can use these methods to manage the ClientDeviceManagement object:

| Function | Description |
| --- | --- |
| createClientDevice | Creates a client device object |
| getClientDeviceByNetworkAddress | Gets the client device with the specified network address |
| getClientDeviceBySerialNumber | Gets the client device with the specified serial number |
| listClientDevices | List the client device objects in the client device manager |

Table 2-10 ClientDeviceManagement Methods createClientDevice[10]

Creates a client device object.

```
ClientDevice createClientDevice(in string serialNumber,
                                in string modelName,
                                in string modelNumber,
                                in string manufacturer,
                                in string networkAddress,
                                in Account account)
``` getClientDeviceByNetworkAddress

Gets the client device with the specified network address.

```
ClientDevice getClientDeviceByNetworkAddress(in string networkAddr)
``` getClientDeviceBySerialNumber

Gets the client device with the specified serial number.

```
ClientDevice getClientDeviceBySerialNumber(in string clientDeviceSN)
``` listClientDevices

List the client device objects in the client device manager.

```
ClientDeviceList listClientDevices()
```

Consumer

The Consumer object provides the basic interface for event consumers to receive events once the consumer is connected to an event channel. This object is created by the EventChannel::connect_consumer function.

Attributes

Consumer has no attributes.

Methods

You can use these methods to manage the Consumer object:

| Function | Description |
|---|---|
| disconnect | Disconnects the event consumer from the event channel. |
| get_proxy_supplier | Connects the event consumer to a proxy event supplier. |

Table 2-11 Consumer Methods disconnect

Disconnects the consumer from the event channel.

```
void disconnect(in Key event_type)[11]
``` get_proxy_supplier

Connects the event consumer to a proxy event supplier.[12]

```
void get_proxy_supplier(in Key event_type,
                       in EStyle es,
                       in Object event_or,
                       in Object or)
```

Control

The Control object lets you control transaction resources.[13]

Attributes

The Control object contains the attributes shown in Table 2-12:

| Attribute | Type | Description |
|---|---|---|
| xid | readonly OMS_XID | |

Table 2-12 Control Attributes

```
// This is non-standard. Without it, there is no way to
// ensure that two different Resource objects in different
// processes and running over the same OracleDB instance
// use the same XID(thereby ensuring that they share locks
// within the database instance).

typedef sequence <octet,128> XidData // XID data value typedef struct oms_xid {
   long formatID // format identifier
   long gtrid_length // value from 1 through 64
   long bqual_length // value from 1 through 64
   XidData xid_data // data
} OMS_XID
```
[14]

Methods

You can use these methods to manage the Control object:

| Function | Description |
|---|---|
| get_coordinator | No idea.... |
| get_terminator | No idea.... |

Table 2-13 Control Methods get_coordinator

No idea....

```
Coordinator get_coordinator()
``` get_terminator

No idea....

```
Terminator get_terminator()
```

Coordinator

The Coordinator object manages transaction sessions.

Attributes

- Coordinator has no attributes.

Methods

You can use these methods to manage the Coordinator object:

| Function | Description |
|---|---|
| create_subtransaction | No idea... |
| get_parent_status | No idea... |
| get_status | No idea... |
| get_top_level_status | No idea... |
| get_transaction_name | No idea... |
| hash_top_level_tran | No idea... |
| hash_transaction | No idea... |
| is_ancestor_transaction | No idea... |
| is_descendant_transaction | No idea... |
| is_related_transaction | No idea... |
| is_same_transaction | No idea... |
| is_top_level_transaction | No idea... |
| register_resource | No idea... |
| rollback_only | No idea... |

Table 2-14 Coordinator Methods create_subtransaction[15]

No idea...

```
Control create_subtransaction()
``` get_parent_status

No idea...

```
Status get_parent_status()
``` get_status

No idea...

`Status get_status()` get_top_level_status

No idea...

`Status get_top_level_status()` get_transaction_name

No idea...

`string get_transaction_name()` hash_top_level_tran

No idea...

`unsigned long hash_top_level_tran()` hash_transaction

No idea...

`unsigned long hash_transaction()` is_ancestor_transaction

No idea...

`boolean is_ancestor_transaction(in Coordinator tc)` is_descendant_transaction

No idea...

`boolean is_descendant_transaction(in Coordinator tc)` is_related_transaction

No idea...

`boolean is_related_transaction(in Coordinator tc)` is_same_transaction

No idea...

`boolean is_same_transaction(in Coordinator tc)` is_top_level_transaction

No idea...

`boolean is_top_level_transaction()` register_resource

No idea...

`RecoveryCoordinator register_resource(in Resource r)` rollback_only

No idea...

```
void rollback_only()
```

EventChannel

The EventChannel object is the middle man in event transactions. As its name implies, events flow from event producers (the objects where events take place) to event consumers (the objects interested in those events) by passing through the event channel.

EventChannel provides functionality to:

- Track the number of event suppliers and consumers
- Coordinate transactions between those suppliers and consumers
- Connect new suppliers and consumers

EventChannel does not have a create function. New EventChannel objects are created using the EventChannelFactory object. See page 2-23.

Attributes

The EventChannel object contains the attributes shown in Table 2-15:

| Attribute | Type | Description |
| --- | --- | --- |
| no_of_consumers | readonly long | Number of event consumers currently connected to the event channel |
| no_of_suppliers | readonly long | Number of event suppliers currently connected to the event channel |
| total_events | readonly long | Total number of events that have passed through the event channel |

Table 2-15 EventChannel Attributes

Methods

You can use these methods to manage the EventChannel object:

| Function | Description |
| --- | --- |
| connect_consumer | Connect a new consumer to the event channel |
| connect_supplier | Connect a new supplier to the event channel |
| destroy | Destroy the event channel object |

Table 2-16 EventChannel Methods connect_consumer

Connect a new event consumer to the event channel. This returns a reference to a Consumer object. This method is called by any object that wants to consume events from the channel. Events are then supplied by the channel to the consumer through the abstraction of the Consumer object.[16]

```
Consumer connect_consumer()
``` connect_supplier

Connect a new event supplier to the event channel. This returns a reference to a Supplier object. This method is called by any object that wants to supply events to the channel. Events are then supplied to the channel through the abstraction of the Supplier object.[17]

```
Supplier connect_supplier()
``` destroy

Destroys the event channel object.

```
void destroy()
```

EventChannelFactory

The EventChannelFactory object creates new EventChannel objects.[18]

Attributes

EventChannelFactory has no attributes.

Methods

You can use these methods to manage the EventChannelFactory object:

| Function | Description |
| --- | --- |
| create | Creates a new EventChannel object |

Table 2-17 EventChannelFactory Methods create

Creates a new EventChannel object.

```
EventChannel create()
```

LogEvent

The LogEvent object provides a mechanism to send messages to a system logging utility.[19]

Attributes

LogEvent has no attributes.

Methods

You can use these methods to manage the LogEvent object:

| Function | Description |
|---|---|
| log_msg | Enters a message into the log |
| log_str | Enters a simple string into the log |
| trace_msg | Enters a trace message into the log |

Table 2-18 LogEvent Methods log_msg

Enters a message into the log.

```
void log_msg(in Object source,
             in long level,
             in long msg_id,
             in Args arg,
             in string related_msg)
``` log_str

Enters a simple string into the log.

```
void log_str(in Object source, in long level, in string message)
``` trace_msg

Enters a trace message into the log.

```
void trace_msg(in Object source,
               in long level,
               in string function,
               in string message)
```

NamingContext[20]

Attributes

- NamingContext has no attributes.

Methods

You can use these methods to manage the NamingContext object:

| Function | Description |
| --- | --- |
| bind | |
| destroy | Destroys the naming context object |
| list | |
| new_context | Creates a new naming context object |
| resolve | |
| unbind | |

Table 2-19 NamingContext Methods bind

```
void bind(in Name n, in Object obj)
``` destroy

Destroys the NamingContext object.

```
void destroy()
``` list

```
BindingPairs list()
``` new_context

Creates a new naming context object.[21]

```
NamingContext new_context()
``` resolve

```
Object resolve(in Name n)
``` unbind

```
void unbind(in Name n)
```

OrderFactory

The OrderFactory object creates new Order objects.

Attributes

- OrderFactory has no attributes.

Methods

You can use these methods to manage the OrderFactory object:

| Function | Description |
| --- | --- |
| createOrder | Creates a new Order object. |

Table 2-20 OrderFactory Methods createOrder[22]

Creates a new Order object.

```
Order createOrder(in Session session, in User user, in Service service)
```

OrderItemFactory

The OrderItemFactory object creates new OrderItem objects.

Attributes

OrderItemFactory has no attributes.

Methods

You can use these methods to manage the OrderItemFactory object:

| Function | Description |
| --- | --- |
| createOrderItem | Creates a new OrderItem object. |

Table 2-21 OrderItem Methods createOrderItem[23]

Creates a new OrderItem object.

```
OrderItem createOrderItem(in ProductItem productitem,
                         in long quantity,
                         in PriceList pricelist,
                         in Order order)
```

PaymentDevice

The PaymentDevice object contains information about any credit or debit instrument used by customers to pay for purchases.

Attributes

The PaymentDevice object contains the attributes shown in Table 2-22:

| Attribute | Type | Description |
| --- | --- | --- |
| accountNumber | string | Account number of payment device (for example, debit account number or credit card) |
| cardHolderName | string | Name on account |
| description | string | Description of account type |
| expirationDate | string | Date account expires |
| name | string | Name of the payment device type |

Table 2-22 PaymentDevice Attributes

Methods

You can use these methods to manage the PaymentDevice object:

| Function | Description |
| --- | --- |
| createPaymentDevice | Creates a new PaymentDevice object |
| destroyPaymentDevice | Destroys the PaymentDevice object |

Table 2-23 PaymentDevice Methods createPaymentDevice[24]

Creates a new PaymentDevice object.

```
PaymentDevice createPaymentDevice(in string name,
                                  in string description,
                                  in string cardHolderName,
                                  in string expirationDate,
                                  in string accountNumber)
``` destroyPaymentDevice[25]

Destroys the PaymentDevice object.

```
boolean destroyPaymentDevice()
```

Preference

The Preference object

Attributes

The Preference object contains the attributes shown in Table 2-24:

| Attribute | Type | Description |
|---|---|---|
| name | string | Name of this preference |
| service | readonly Service | Service to which the preference applies |
| type | string | Preference type (implementation defined) |
| value | string | Preference value (implementation defined) |

Table 2-24 Preference Attributes

Methods

You can use these methods to manage the Preference object:

| Function | Description |
|---|---|
| createPreference | Creates a new Preference object |
| destroyPreference | Destroys the Preference object |
| getPreference | Returns a reference to a copy of this object |
| setPreference | Sets the preferences |

Table 2-25 Preference Methods createPreference[26]

Creates a new Preference object.

```
Preference createPreference(in string name,
                            in string value,
                            in string type,
                            in Service service)
``` destroyPreference[27]

Destroys the Preference object.

```
boolean destroyPreference()
``` getPreference

Returns a reference to a new Preference object. The new object is a copy of this object.

```
Preference getPreference()
``` setPreference

Sets the Preference object to the settings in the object passed in as preference.

```
boolean setPreference(in Preference preference)
```

RecoveryCoordinator

Attributes

RecoveryCoordinator has no attributes.

Methods

You can use these methods to manage the RecoveryCoordinator object:

| Function | Description |
| --- | --- |
| replay_completion | No idea.... |

Table 2-26 RecoveryCoordinator Methods replay_completion

No idea....

```
Status replay_completion(in Resource r)
```

Resource

The Resource object

Attributes

- Resource has no attributes.

Methods

You can use these methods to manage the Resource object:[28]

| Function | Description |
|---|---|
| commit | Commit the full transaction |
| commit_one_phase | Commit the latest transaction |
| forget | Forget the latest transaction |
| prepare | Prepare transaction data for commitment |
| rollback | Roll back the full transaction |

Table 2-27 Resource Methods commit

Commit the full transaction.

```
void commit()
``` commit_one_phase

Commit the latest transaction.

```
void commit_one_phase()
``` forget

Forget the latest transaction.

```
void forget()
``` prepare

Prepare transaction data for commitment.

```
Vote prepare()
``` rollback

Roll back the full transaction.

```
void rollback()
```

ResourceFactory

The ResourceFactory object creates new Resource objects.

Attributes

- ResourceFactory has no attributes.

Methods

You can use these methods to manage the ResourceFactory object:

| Function | Description |
| --- | --- |
| oracle_db_create_resource | Creates a new Resource object. |
| oracle_db_delete_resource | Deletes a Resource object |
| oracle_db_init | Initialize the ResourceFactory object |
| oracle_db_term | Destroys a ResourceFactory object |

Table 2-28 ResourceFactory Methods oracle_db_create_resource[29]

Create a new Resource object.

```
Resource oracle_db_create_resource(in Control ctrl)
``` oracle_db_delete_resource

Deletes a Resource object.[30]

```
void oracle_db_delete_resource(in Resource resource)
``` oracle_db_init[31]

Initialize the factory object.[32]

```
void oracle_db_init(in string open_string)
``` oracle_db_term

Destroys a ResourceFactory object.[33]

```
void oracle_db_term()
```

Restriction

The Restriction object describes a user restriction, including:

- A name for the restriction
- Effective hours of the restriction
-

Attributes

The Restriction object contains the attributes shown in Table 2-29:

| Attribute | Type | Description |
|---|---|---|
| description | string | Description of the restriction |
| name | string | Name of the restriction |
| restrictedValue | string | Arbitrary value to distinguish restrictions[a] |
| type | string | Types of services effected |
| usageRestrictionBeginTime | string | Time restriction goes into effect |
| usageRestrictionEndTime | string | Time restriction is no longer in effect |

Table 2-29 Restriction Attributes

Methods

You can use these methods to manage the Restriction object:

| Function | Description |
|---|---|
| createRestriction | Creates a new restriction object |
| destroyRestriction | Destroys the restriction object |
| getRestriction | Returns a reference to a Restriction object |
| setRestriction | Sets this Restriction object to the settings of another |

Table 2-30 Restriction Methods createRestriction[34]

Creates a new Restriction object.

```
Restriction createRestriction(in string name,
                              in string restrictedValue,
```

```
                                              in string type,
                                              in string description)
``` destroyRestriction[35]

Destroys the Restriction object.

```
    boolean destroyRestriction()
``` getRestriction

Returns a reference to a Restriction object. This function is called by service objects to create a restriction for that service.[36]

```
    Restriction getRestriction()
``` setRestriction

Sets this Restriction object to the settings of the Restriction object passed in.[37]

```
    boolean setRestriction(in Restriction restriction)
```

Service

The Service object encapsulates the basic functionality required for any service, including:

- Name and type of the service
- Time and date the service was created
- Number of service instances, along with the maximum number of instances allowed
- Service status
- Allowable payment devices
- Standard preferences for the service Note that users do not directly interact with Service objects. Instead they use ServiceAgent objects. Service objects contain and manipulate information required for the service *system-wide*, while service agents contain and manipulate dynamic per-user information. See page 2-40 for more information on service agent objects.

Attributes

The Service object contains the attributes shown in Table 2-31:

| Attribute | Type | Description |
| --- | --- | --- |
| maxServiceInstances | long | Maximum number of instances of this service |
| name | string | Service name |
| paymentDeviceTypes | readonly StringList | Acceptable payment devices |
| preferenceList | readonly PreferenceList | List of standard preferences for the service[a] |
| serviceInstanceCount | readonly long | Number of instances of this service |
| startTimeAndDate | string | Time and date this service object instance was started up |
| status | string | Status of the service[b] |
| subscriptionFee | double | Cost of subscribing to the service |
| type | string | Service type (implementation defined; examples might be "retail," "video on demand," "educational," and so on) |

Table 2-31 Service Attributes

Methods

You can use these methods to manage the Service object:

| Function | Description |
| --- | --- |
| addPreference | Adds a preference to this service |
| checkAndReserveService | Checks service availability; if available, reserve a service instance |
| checkClientDeviceCompatibility | Checks that a client device is capable of running the service |
| checkInstanceCount | Check the current instance count |
| connectToService | Connect the caller to the service |
| decrementServiceInstanceCount | Decrement the service instance count |
| destroyService | Destroys the object |
| dropPreference | Drops a preference from the list of service preferences |
| getServiceStatus | Returns the status of the service |
| incrementServiceInstanceCount | Increment the service instance count |
| setServiceStatus | Set the status of the service |

Table 2-32 Service Methods addPreference

Adds a preference to the list of service preferences.

```
boolean addPreference(in Preference preference)
``` checkAndReserveService

Check service availability. If the service is available, reserve a service instance for user on clientDevice.

```
boolean checkAndReserveService(in User user, in ClientDevice clientDevice)
``` checkClientDeviceCompatibility

Checks that the client device represented by clientDevice is capable of running the service.

```
boolean checkClientDeviceCompatibility(in ClientDevice clientDevice)
``` checkInstanceCount

Checks the instance count.[38]

```
boolean checkInstanceCount()
``` connectToService

Connects the session object to this service instance.

```
ServiceAgent connectToService(in Session session)
``` decrementServiceInstanceCount

Decrement the service instance count. This function should be called whenever a connection to the service is severed.

```
boolean decrementServiceInstanceCount()
``` destroyService[39]

Destroys the Service object.

```
boolean destroyService()
``` dropPreference

Drops the preference matching the preference passed in from the list of service preferences.

```
boolean dropPreference(in Preference preference)
``` getServiceStatus

Returns the status of the service and the reason that status was set.

```
boolean getServiceStatus(out long status, out string reason)
``` incrementServiceInstanceCount

Increment the service instance count. This function should be called whenever a new connection is made to the service.

```
boolean incrementServiceInstanceCount()
``` setServiceStatus

Set the status of the service. The reason string is logged explaining the change in status of the service.

```
boolean setServiceStatus(in long status, in string reason)
```

ServiceAgent

The ServiceAgent object manages information about a service agent.

Attributes

The ServiceAgent object contains the attributes shown in Table 2-33:

| Attribute | Type | Description |
|---|---|---|
| priceList | PriceList | Contains the price list for items offered by the service |
| resumedDatesAndTimes | readonly TimeList | Contains the date and time the service was resumed |
| service | Service | Identifies the service provided by the agent |
| serviceExecutableId | string | Identifies the service executable |
| serviceStats | ServiceStatistics | Contains statistics about the service |
| session | Session | Contains the session associated with this service agent |
| status | string | Contains the status of the service |
| suspendedDatesAndTimes | readonly TimeList | Contains the date and time the service was suspended |

Table 2-33 ServiceAgent Attributes

Methods

| Function | Description |
|---|---|
| destroyServiceAgent | Destroys the service agent |
| disconnectFromService | Disconnects from the service |
| recordResumedDateAndTime | Records the time and date that the user resumed the service |
| recordSuspendedDateAndTime | Records the time and date that the user suspended the service |
| resumeService | Resumes a suspended service |
| suspendService | Suspends a service |

Table 2-34 ServiceAgent Methods destroyServiceAgent

Destroys the service agent

```
boolean destroyServiceAgent()
``` disconnectFromService

Disconnects from the service

```
boolean disconnectFromService()
``` recordResumedDateAndTime

Records the time and date that the user resumed the service

```
boolean recordResumedDateAndTime()
``` recordSuspendedDateAndTime

Record the time and date that the user suspended the service. The record is stored

```
boolean recordSuspendedDateAndTime()
``` resumeService

Resumes a suspended service

```
boolean resumeService()
``` suspendService

Suspends a service

```
boolean suspendService()
```

ServiceAgentManagement

The ServiceAgentManagement object manages the list of service agents.

Attributes

ServiceAgentManagement has no attributes.

Methods

| Function | Description |
| --- | --- |
| createServiceAgent | Create a service agent object |
| listServiceAgents | List the service agents managed by the object |

Table 2-35 ServiceAgentManagement Methods createServiceAgent

Create a service agent object

```
ServiceAgent createServiceAgent(in Service service, in Session session)
``` listServiceAgents

List the service agents managed by the object

```
ServiceAgentList listServiceAgents(in Session session)
```

ServiceAgentStatistics

The ServiceAgentStatistics object manages statistical information about a service agent.

Attributes

The ServiceAgentStatistics object contains the attributes shown in Table 2-36:

| Attribute | Type | Description |
|---|---|---|
| endDateAndTime | string | Contains the date and time the service agent was terminated |
| exitStatus | string | Contains the exit status of the service |
| numberProductsViewed | readonly long | Contains the count of products viewed by a service agent |
| numberPurchases | readonly long | Contains the count of purchases made by a service agent |
| startDateAndTime | string | Contains the date and time a service agent was started |
| totalPurchases | readonly double | Contains the dollar value of purchases by the agent |

Table 2-36 ServiceAgentStatistics Attributes

Methods

| Function | Description |
|---|---|
| incrementNumberProductsViewed | Increment the count of products viewed by |
| incrementNumberPurchases | Increment the count of products purchased |
| updateTotalPurchases | Update the total dollar value of purchases |

Table 2-37 ServiceAgentStatistics Methods incrementNumberProductsViewed

```
boolean incrementNumberProductsViewed()
``` incrementNumberPurchases

```
boolean incrementNumberPurchases()
``` updateTotalPurchases

```
boolean updateTotalPurchases(in double amount)
```

ServiceManagement

The ServiceManagement object manages the service objects.

Attributes

ServiceManagement has no attributes.

Methods

| Function | Description |
|---|---|
| createService | Create a service object |
| listServicesByName | Return a list the services by name |
| getServiceUsingName | Return the service specified by a name |

Table 2-38 ServiceManagement Methods createService

```
Service createService(in string name,
                      in string type,
                      in long maxServiceInstances)
``` listServicesByName

```
ServiceList listServicesByName(in Session session)
``` getServiceUsingName

```
ServiceList getServiceUsingName(in Session session)
```

ServiceStatistics

The ServiceStatistics object manages statistical information about a service.

Attributes

The ServiceStatistics object contains the attributes shown in Table 2-39:

| Attribute | Type | Description |
| --- | --- | --- |
| startDateAndTime | string | Contains the date and time the service was started |
| endDateAndTime | string | Contains the date and time the service was terminated |
| totalConnectTime | readonly long | Contains the total connect time |
| numberPurchases | readonly long | Contains the number of purchases made |
| totalPurchases | readonly double | Contains the total dollar value of purchases |
| numberProductsViewed | readonly long | Contains the number of products viewed |
| numberAbnormalDisconnects | readonly long | Contains the number of abnormal disconnects to the service |
| numberSuspendedConnections | readonly long | Contains the number of suspended connections to the service |
| numberConnections | readonly long | Contains the total number of conncections to the service |

Table 2-39 ServiceStatistics Attributes

Methods

| Function | Description |
|---|---|
| createServiceStatistics | Create a ServiceStatistics object |
| destroyServiceStatistics | Destroy a ServiceStatistics object |
| updateTotalConnectTime | Update the total connect time |
| incrementNumberPurchases | Increment the count of purchases |
| updateTotalPurchases | Update the dollar amount of purchases |
| incrementNumberProductsViewed | Increment the count of products viewed |
| incrementNumberAbnormalDisconnects | Increment the count of abnormal disconnects |
| incrementNumberSuspendedConnections | Increment the count of suspended connections |
| incrementNumberConnections | Increment the count of connections |

Table 2-40 ServiceStatistics Methods createServiceStatistics

```
ServiceStatistics createServiceStatistics()
``` destroyServiceStatistics

```
boolean destroyServiceStatistics()
``` updateTotalConnectTime

```
boolean updateTotalConnectTime(in string Time)
``` incrementNumberPurchases

```
boolean incrementNumberPurchases()
``` updateTotalPurchases

```
boolean updateTotalPurchases(in double amount)
``` incrementNumberProductsViewed

```
boolean incrementNumberProductsViewed()
``` incrementNumberAbnormalDisconnects

```
boolean incrementNumberAbnormalDisconnects()
``` incrementNumberSuspendedConnections

```
boolean incrementNumberSuspendedConnections()
``` incrementNumberConnections

```
boolean incrementNumberConnections()
```

Session

The Session object contains information about a login session.

Attributes

The Session object contains the attributes shown in Table 2-41:

| Attribute | Type | Description |
| --- | --- | --- |
| user | readonly User | Contains the current user |
| account | readonly Account | Contains the current user's account |
| connectedClientDevice | readonly ClientDevice | Contains the user's client device |
| currentServiceAgent | ServiceAgent | Contains the user's current application |
| suspendedServiceAgents | readonly ServiceAgentList | Contains the list of conncected service agents during the current session |
| sessionStats | readonly SessionStatistics | Contains session statistics |
| suspendedDatesAndTimes | readonly TimeList | Contains the list of dates and times of suspended sessions |
| resumedDatesAndTimes | readonly TimeList | Contains the list of dates and times of resumed sessions |

Table 2-41 Session Attributes

Methods

| Function | Description |
|---|---|
| initialize | Initialize the session object |
| destroySession | Log out from the Network Provider network |
| suspendSession | Suspend a session |
| resumeSession | Resume a session |
| connectToService | Connect to a service |
| disconnectFromService | Disconnect from a service |
| recordSuspendedDateAndTime | Record the date and time a session is suspended |
| recordResumedDateAndTime | Record the date and time a session is resumed |
| setSessionStatus | Set the status of a session |
| getSessionStatus | Get the status of a session |
| getAccount | Get the account from the user attribute |
| createSessionStatistics | Create a SessionStatistics object |

Table 2-42 Session Methods initialize

```
boolean initialize(in User user,
                   in ClientDevice clientDevice,
                   in Account account)
``` destroySession

```
boolean destroySession(in string cause)
``` suspendSession

```
boolean suspendSession(in string reason)
``` resumeSession

```
ServiceAgent resumeSession(in User user)
``` connectToService

```
boolean connectToService(in Service serviceOR
                         in boolean override,
                         in boolean suspendCurrentServiceFlag,
                         out ServiceAgent serviceAgent)
``` disconnectFromService

```
boolean disconnectFromService(in ServiceAgent serviceAgent)
``` recordSuspendedDateAndTime

```
boolean recordSuspendedDateAndTime()
``` recordResumedDateAndTime

```
boolean recordResumedDateAndTime()
``` setSessionStatus

```
boolean setSessionStatus(in string status, in string reason)
``` getSessionStatus

```
boolean getSessionStatus(out string status, out string reason)
``` getAccount

```
Account getAccount()
``` createSessionStatistics

```
SessionStatistics createSessionStatistics()
```

SessionManagement

The SessionManagement object manages a list of session objects.

Attributes

SessionManagement has no attributes.

Methods

| Function | Description |
|---|---|
| createSession | Create a session object |
| abortSession | Abort a session |
| getSuspendedSessions | Get a list of suspended sessions |
| listActiveSessions | Get a list of active sessions |
| listSuspendedSessions | Get a list of suspended sessions |
| listSessions | Get a list of sessions |

Table 2-43 SessionManagement Methods createSession

```
Session createSession(in User user,
                      in ClientDevice clientDevice,
                      in Account account)
``` abortSession

```
boolean abortSession(in string physicalNetworkAddress)
``` getSuspendedSessions

```
SessionList getSuspendedSessions(in User user)
``` listActiveSessions

```
SessionList listActiveSessions()
``` listSuspendedSessions

```
SessionList listSuspendedSessions()
```

Session Objects listSessions

```
SessionList listSessions()
```

SessionStatistics

The SessionStatistics object contains statistics for a session.

Attributes

The object contains the attributes shown in :

| Attribute | Type | Description |
|---|---|---|
| loginDateAndTime | string | Contains the date and time of session login |
| logoutDateAndTime | string | Contains the date and time of session logout |
| numberOfConnectedServices | readonly long | Contains the number of connected service for the current session |
| sessionOR | readonly Session | |

Table 2-44

Methods

| Function | Description |
|---|---|
| initialize | Initialize the SessionStatistics object |
| destroySessionStatistics | Destroy the SessionStatistics object |
| incrementNumberOfConnectedServices | Increase the count of connected services for the current session |

Table 2-45 SessionStatistics Methods initialize

```
boolean initialize(in Session session)
``` destroySessionStatistics

```
boolean destroySessionStatistics()
``` incrementNumberOfConnectedServices

```
boolean incrementNumberOfConnectedServices()
```

Supplier

The Supplier object ...

Attributes

Supplier has no attributes.

Methods

| Function | Description |
|---|---|
| disconnect | |
| get_proxy_consumer | |

Table 2-46 Supplier Methods disconnect

```
void disconnect(in Key event_type)
``` get_proxy_consumer

```
void get_proxy_consumer(in Key event_type,
                        in EStyle es,
                        out Object event_or,
                        in Object or)
```

Session Objects

Terminator

The Terminator object ..

Attributes

Terminator has no attributes.

Methods

| Function | Description |
|----------|-------------|
| commit   |             |
| rollback |             |

Table 2-47 Terminator Methods commit

```
void commit(in boolean report_heuristics)
``` rollback

```
void rollback()
```

Session Objects

TransactionFactory

The TransactionFactory object

Attributes

TransactionFactory has no attributes.

Methods

| Function | Description |
|---|---|
| create_control | |

Table 2-48 TransactionFactory Methods create_control

```
Control create_control(in unsigned long time_out)
```

TransactionalObject

The TransactionalObject object ...

Attributes

TransactionalObject has no attributes.

Methods

TransactionalObject has no methods.

User

The User object manages information about the user.

Attributes

The User object contains the attributes shown in Table 2-49:

| Attribute | Type | Description |
| --- | --- | --- |
| title | string | Contains the user's title |
| firstName | string | Contains the user's first name |
| middleName | string | Contains the user's middle name |
| lastName | string | Contains the user's last name |
| loginName | string | Contains the user's login name |
| role | string | Contains the user's role |
| servicePreferenceList | readonly PreferenceList | Contains the user's preference list |
| account | Account | Contains the user's account |
| defaultService | Service | Contains the user's default service |

Table 2-49 User Attributes

Methods

| Function | Description |
| --- | --- |
| createUser | Create a User object |
| destroyUser | Destroy a User object |
| updatePassword | Update the user's password |
| checkServiceAccessibility | Check if the user can access a given service |
| getServicePreferences | Get the user's service preferences |
| listAccessibleServices | Get a list of accessible services |
| listSubscribedServices | Get a list of the user's subscribed services |
| addPreference | Add a preference to the preference list |
| dropPreference | Remove a preference from the preference list |
| addRestriction | Add a restriction to the user's account |
| dropRestriction | Remove a restriction to the user's account |

Table 2-50 User Methods createUser

```
User createUser(in string title,
                in string firstName,
                in string middleName,
                in string lastName,
                in string loginName,
                in string role,
                in Account account,
                in Service defaultService,
                in string userPassword)
``` destroyUser

```
boolean destroyUser()
``` updatePassword

```
boolean updatePassword(in string oldPassword, in string newPassword)
``` checkServiceAccessibility

```
boolean checkServiceAccessibility(in Service service)
```

Session Objects getServicePreferences

```
PreferenceList getServicePreferences(in Service service)
``` listAccessibleServices

```
ServiceList listAccessibleServices()
``` listSubscribedServices

```
ServiceList listSubscribedServices()
``` addPreference

```
boolean addPreference(in Preference preference)
``` dropPreference

```
boolean dropPreference(in Preference preference)
``` addRestriction

```
boolean addRestriction(in Restriction restriction)
``` dropRestriction

```
boolean dropRestriction(in Restriction restriction)
```

UserManagement

The UserManagement object manages a list of User objects.

Attributes

UserManagement has no attributes.

Methods

| Function | Description |
|---|---|
| authorizeUser | Authorize a user/password combination |
| getUserLoginNameList | Return a list of user login names associates with a given client device |
| listUsers | Get a list of users managed by this object |

Table 2-51 UserManagement Methods authorizeUser

```
User authorizeUser(in string loginName,
                   in string userPassword,
                   in string accountNumber,
                   out ClientDevice clientDevice,
                   out Account account)
``` getUserLoginNameList

```
UserLoginNameList getUserLoginNameList()
``` listUsers

```
UserList listUsers()
```

UserStatistics

The UserStatistics object contains statistical information about a user.

Attributes

The UserStatistics object contains the attributes shown in Table 2-52:

| Attribute | Type | Description |
|---|---|---|
| frequencyOfLogin | readonly long | Contains the frequency of user login |
| totalLoginTime | readonly long | Contains the total login time of a user |

Table 2-52 UserStatistics Attributes

Methods

| Function | Description |
|---|---|
| createUserStatistics | Create a UserStatistics object |
| destroyUserStatistics | Destroy the UserStatistics object |
| incrementFrequencyOfLogin | Increment the frequency of login |
| updateTotalLoginTime | Update the count of total login time |

Table 2-53 UserStatistics Methods createUserStatistics

```
UserStatistics createUserStatistics()
``` destroyUserStatistics

```
boolean destroyUserStatistics()
``` incrementFrequencyOfLogin

```
boolean incrementFrequencyOfLogin()
``` updateTotalLoginTime

```
boolean updateTotalLoginTime(in string time)
```

CHAPTER

3 System Event Objects

System event objects provide the framework to:

- Name and describe system events
- Fire system events
- Create new system events
- Control the event mechanism Each object is presented with a short description of what the object does and an example for the less obvious cases. The object members are also presented, separated into two member types, attributes and methods.

The objects covered in this chapter are:

| Object | Description | Page |
|---|---|---|
| MktEvent | Allows a client application to send a marketing event. | 3-3 |
| MktEventControl | Controls the marketing events generated by particular services for particular users. | 3-4 |
| MktEventType | Defines a marketing event type. | 3-5 |
| MktEventTypeManager | Manages the various marketing event types. | 3-7 |
| OrderEvent | Logs order-related events. | 3-9 |
| ProductEvent | Logs product-related events. | 3-10 |
| ServerEvents | Logs server-related events. | 3-11 |
| ServiceEvent | Logs service-related events. | 3-12 |

Table 3-1 System Event Objects Listing

Copyright © 1995, Oracle Corporation

| Object | Description | Page |
|---|---|---|
| SessionEvent | Logs session-related events. | 3-14 |
| StreamEvent | Logs stream-related events. | 3-15 |
| SysEventControl | Controls the types of events being logged. | 3-16 |
| SystemEventType | Names and describes an event. | 3-18 |
| SystemEventTypeManager | Manages event descriptions. | 3-19 |

Table 3-1 System Event Objects Listing

MktEvent

MktEvent allows a client application to send a marketing event to be recorded by the service.

Attributes

MktEvent has no attributes.

Methods

You can use these methods to manage the MktEventType object:

| Function | Description |
| --- | --- |
| sendMktEvent | Sends marketing events. |

Table 3-2 MktEventType Methods sendMktEvent

Sends marketing events. The parameters are list types to allow batches of events to be sent to the service. StatisticList is defined to be a sequence of any data type.

```
void sendMktEvent(in MktEventList umel, in StatisticList)
```

MktEventControl

MktEventControl controls the marketing events generated by particular services for particular users.

*Example:* Suppose you want to know when particular users purchase a particular service, perhaps to monitor sales of a product in a particular area. You can use the MktEventControl object to specify the events you want logged for the users you want to monitor when they use the service in which you are interested.

Attributes

The MktEventControl object contains the attributes shown in Table 3-3:

| Attribute | Type | Description |
|---|---|---|
| servicelist | ServiceList | List of services for which particular events may be fired. |
| userlist | UserList | List of users for whom particular events may be fired. |

Table 3-3 MktEventControl Attributes

Methods

You can use these methods to manage the MktEventType object:

| Function | Description |
|---|---|
| startMktEvent | Indicates the system should begin logging certain marketing events for particular users using certain services. |
| stopMktEvent | Indicates the system should stop logging marketing events for particular users using certain services. |

Table 3-4 MktEventType Methods startMktEvent

Indicates the system should begin logging all marketing events in the umel list for the users in userlist when they are using the services in servicelist.

```
void startMktEvent(in MktEventList umel,
                   in UserList userlist,
                   in ServiceList servicelist)
``` stopMktEvent

Indicates the system should stop logging all marketing events in the umel list for the users in userlist when they are using the services in the servicelist.

```
void stopMktEvent(in MktEventList umel,
                  in UserList users,
                  in ServiceList services)
```

MktEventType

MktEventType contains user-defined marketing events to be recorded for the client application for a given service.

Attributes

The MktEventType object contains the attributes shown in Table 3-5:

| Attribute | Type | Description |
| --- | --- | --- |
| service | Service | Service with which this event is associated |
| systemeventtype | SystemEventType | System event type that defines the marketing event |
| user | User | User with which this event is associated. |

Table 3-5 MktEventType Attributes

Methods

You can use these methods to manage the MktEventType object:

| Function | Description |
| --- | --- |
| assignUserToEvent | Indicates that a given marketing event should be tracked for a given user. |
| createEventType | Creates a new user-defined event. |
| destroyEventType | Destroys the marketing event type. |

Table 3-6 MktEventType Methods assignUserToEvent

Indicates that a given marketing event should be tracked for a given user. This method is implemented via backend forms.[1]

```
boolean assignUserToEvent(in User user)
``` createEventType[2]

Creates a new user-defined event. Optionally, SystemEventType can be used to define the entire event type.[3] This method is implemented via backend forms.[4]

```
MktEventType createEventType(in SystemEventType set,
                             in Service eventService,
```

```
                            in string eventType,
                            in string eventDescription)
``` destroyEventType[5]

Destroys the marketing event type. This method is implemented via backend forms.[6]

```
boolean destroyEventType(void)
```

MktEventTypeManager

MktEventTypeManager maintains interfaces to query MktEventType objects.

Attributes

The MktEventTypeManager object contains the attributes shown in Table 3-5:

| Attribute | Type | Description |
|---|---|---|
| mkteventtype | MktEventType | System event type that defines the marketing event |
| service | Service | Service with which this event is associated |
| user | User | User with which this event is associated. |

Table 3-7 MktEventTypeManager Attributes[a]

Methods

You can use these methods to manage the MktEventType object:

| Function | Description |
|---|---|
| getEventByName | Finds an event type given an event type name. |
| getEventByNameAndService | Finds an event type given a service and an event type name. |
| getEventByService | Finds an event type given a service. |
| getEventServicesByUser | Finds a list of services assigned to an event for a given user. |
| getEventUsersByService | Finds a list of users given an event type and service. |
| listValidEvents | Gets a list of marketing events for a given user and service. |

Table 3-8 MktEventType Methods getEventByName

Finds an event type given an event type name.

```
MktEventType getEventByName(in string event_name)
``` getEventByNameAndService

Finds an event type given a service and an event type name.

```
MktEventType getEventByNameAndService(in Service service,
                                      in string event_name)
``` getEventByService

Finds an event type given a service.

```
MktEventType getEventByService(in Service service)
``` getEventServicesByUser

Finds a list of services assigned to an event for a given user.

```
ServiceList getEventServicesByUser(in MktEventType met, in User user)
``` getEventUsersByService

Finds a list of users given an event type and service.

```
UserList getEventUsersByService(in MktEventType met,
                                in Service service)
``` listValidEvents

Gets a list of marketing events for a given user and service.

```
MktEventTypeList listValidEvents(in User user, in Service service)
```

OrderEvent

OrderEvent performs logging of order-related activities.

Attributes

OrderEvent has no attributes.

Methods

You can use these methods to manage the OrderEvent object:

| Function | Description |
| --- | --- |
| orderConfirmEvent | Logs an order confirmation event. |
| orderCreatedEvent | Logs an order creation event. |

Table 3-9 OrderEvent Methods orderConfirmEvent

Logs an order confirmation event. This event is fired by the Order::ConfirmOrder method.

```
void orderConfirmEvent(in Order eventOrder)
``` orderCreatedEvent

Logs an order creation event. This event is fired by the Order::CreateOrder method.

```
void orderCreatedEvent(in Order eventOrder)
```

ProductEvent

ProductEvent performs logging of product-related activities.

Attributes

ProductEvent has no attributes.

Methods

You can use these methods to manage the ProductEvent object:

| Function | Description |
|---|---|
| productFulfillEvent | Logs product delivery events. |

Table 3-10 ProductEvent Methods productFulfillEvent

Logs product delivery events. This event is fired by the Product::markProductFulfill method.

```
void productFulfillEvent(in Product eventProduct)
```

ServerEvents

ServerEvents indicates availability of an RPC server.[7]

Attributes

ServerEvents has no attributes.

Methods

You can use these methods to manage the ServerEvents object:

| Function | Description |
| --- | --- |
| serverAvailEvent | Called by any manager when it comes up. |
| serverFailEvent | Called by a server when it detects a fatal error and needs to take itself down. |
| serverUnavailEvent | Called by a server before it takes itself down. |

Table 3-11 ServerEvents Methods serverAvailEvent

Called by any manager[8] when it comes up.

```
void serverAvailEvent(in string serverName)
``` serverFailEvent

Called by a server when it detects a fatal error and needs to take itself down. This event should be followed by a call to serverUnavailEvent.

```
void serverFailEvent(in string serverName)
``` serverUnavailEvent

Called by a server before it takes itself down.

```
void serverUnavailEvent(in string serverName)
```

ServiceEvent

ServiceEvent performs logging of service-related activities.

Attributes

- ServiceEvent has no attributes.

Methods

You can use these methods to manage the ServiceEvent object:

| Function | Description |
| --- | --- |
| serviceAuthFailEvent | Indicates that a service attempted to come online but could not be authenticated. |
| serviceAvailEvent | Indicates that the particular service is available for use. |
| serviceConnEvent | Indicates that a new service has been created. |
| serviceDisconnEvent | Indicates that an existing service has been destroyed. |
| serviceUnavailEvent | Indicates that the particular service is not available for use. |

Table 3-12 ServiceEvent Methods serviceAuthFailEvent

Indicates that a service attempted to come online but could not be auithenticated.[9] This event is fired by the ServiceManagement::createService method.

```
void serviceAuthFailEvent(in Service eventService)
``` serviceAvailEvent

Indicates that the particular service is available for use. This event is fired by the ServiceManagement::markServiceAvailable method.

```
void serviceAvailEvent(in Service eventService)
``` serviceConnEvent

Indicates that a new service has been created. This event is fired by the ServiceManagement::createService method.

```
void serviceConnEvent(in Service eventService)
``` serviceDisconnEvent

Indicates that an existing service has been destroyed. This is fired by the ServiceManagement::destroyService method.

```
void serviceDisconnEvent(in Service eventService)
``` serviceUnavailEvent

Indicates that the particular service is not available for use. This event is fired by the ServiceManagement::markServiceUnavailable method.

```
void serviceUnavailEvent(in Service eventService)
```

- 
-

SessionEvent

SessionEvent performs logging of session-related activities.

Attributes

SessionEvent has no attributes.

Methods

You can use these methods to manage the SessionEvent object:

| Function | Description |
| --- | --- |
| endSessionEvent | Indicates that a session has been started. |
| failSessionEvent | Indicates that a user attempted to log on and create or resume a session but could not be authenticated. |
| startSessionEvent | Indicates that a session has been started. |

Table 3-13 SessionEvent Methods endSessionEvent

Indicates that a session has been started. This event is fired by the SessionManagement::destroySession method upon successful destruction of a session and and by the SessionManagement::suspendSession upon successful suspension of a session.

```
void endSessionEvent(in Session eventSession)
``` failSessionEvent

Indicates that a user attempted to log on and create or resume a session but could not be authenticated. This event is fired by the SessionManagement::createSession method.

```
void failSessionEvent(in Session eventSession)
``` startSessionEvent

Indicates that a session has been started. This event is fired by the SessionManagement::createSession method upon successful creation of a new session and and by the SessionManagement::resumeSession upon successful resumption of an existing session.

```
void startSessionEvent(in Session eventSession)
```

StreamEvent

StreamEvent performs logging of stream-related activities.

Attributes

StreamEvent has no attributes.

Methods

You can use these methods to manage the StreamEvent object:

| Function | Description |
| --- | --- |
| streamFFEvent | Indicates a stream fast forward event occurred. |
| streamRewindEvent | Indicates a stream was rewound. |
| streamStartEvent | Indicates the start of delivery of a stream. |
| streamSuspendEvent | Indicates the suspension of a stream. |

Table 3-14 StreamEvent Methods streamFFEvent

Indicates a stream fast forward event occurred. This event is fired by the Stream::fastForward method.

```
void streamFFEvent(in Stream eventStream)
``` streamRewindEvent

Indicates a stream was rewound. This event is fired by the Stream::rewind method.

```
void streamRewindEvent(in Stream eventStream)
``` streamStartEvent

Indicates the start of delivery of a stream. This event is fired by the Stream::startStream method.

```
void streamStartEvent(in Stream eventStream)
``` streamSuspendEvent

Indicates the suspension of a stream. This event is fired by the Stream::suspendStream method.

```
void streamSuspendEvent(in Stream eventStream)
```

SysEventControl

SysEventControl allows the sending and receiving of control events to the event consumer.

Attributes

SysEventControl has no attributes.

Methods

You can use these methods to manage the SysEventControl object:

| Function | Description |
| --- | --- |
| startOrderLogging | Indicates the system should begin logging all order events created by a particular user. |
| startProductLogging | Indicates the system should begin logging all product events created by a particular user. |
| startServerLogging | Indicates the system should begin logging all server events. |
| startServiceLogging | Indicates the system should begin logging all service events created by a particular user. |
| startStreamLogging | Indicates the system should begin logging all stream events created by a particular user. |
| stopOrderLogging | Indicates the system should stop logging order events for a particular user. |
| stopProductLogging | Indicates the system should stop logging product events for a particular user. |
| stopServerLogging | Indicates the system should stop logging server events. |
| stopServiceLogging | Indicates the system should stop logging service events for a particular user. |
| stopStreamLogging | Indicates the system should stop logging stream events for a particular user. |

Table 3-15 SysEventControl Methods startOrderLogging

Indicates the system should begin logging all order events created by the user sysUser.

```
void startOrderLogging(in User sysUser)
``` startProductLogging

Indicates the system should begin logging all product events created by the user sysUser.

```
void startProductLogging(in User sysUser)
``` startServerLogging

Indicates the system should begin logging all server events.

```
void startServerLogging(void)
``` startServiceLogging

Indicates the system should begin logging all service events created by the user sysUser.

```
void startServiceLogging(in User sysUser)
``` startStreamLogging

Indicates the system should begin logging all stream events created by the user sysUser.

```
void startStreamLogging(in User sysUser)
``` stopOrderLogging

Indicates the system should stop logging order events for sysUser.

```
void stopOrderLogging(in User sysUser)
``` stopProductLogging

Indicates the system should stop logging product events for sysUser.

```
void stopProductLogging(in User sysUser)
``` stopServerLogging

Indicates the system should stop logging server events.

```
void stopServerLogging(void)
``` stopServiceLogging

Indicates the system should stop logging service events for sysUser.

```
void stopServiceLogging(in User sysUser)
``` stopStreamLogging

Indicates the system should stop logging stream events for sysUser.

```
void stopStreamLogging(in User sysUser)
```

SystemEventType

SystemEventType objects provide names and descriptions for actual event objects.

Attributes

The SystemEventType object contains the attributes shown in Table 3-16:

| Attribute | Type | Description |
| --- | --- | --- |
| description | readonly string | Describes the descriptor set. |
| name | readonly string | Contains the descriptor set's name. Each name must be unique. |

Table 3-16 SystemEventType Attributes

Methods

SystemEventType has no methods.

SystemEventTypeManager

SystemEventTypeManager contains all SystemEventType objects, allowing you to search for a system event type by its name.

Attributes

SystemEventTypeManager has no attributes.

Methods

You can use these methods to manage the SystemEventTypeManager object:

| Function | Description |
| --- | --- |
| getEventTypeByName | Returns the event type with a particular name. |

Table 3-17 SystemEventTypeManager Methods getEventTypeByName

Returns the SystemEventType object that has the name name.

```
SystemEventType getEventTypeByName(in string name)
```

Appendix B

Relational Database Schema Specification

```
REM
REM  This ORACLE V7 RDBMS command file was generated by CASE Dictionary
REM                        on   18-APR-95      Copyright © 1995, Oracle Corporation
REM
REM  For application SDK version 1 database SDK
REM
REM  TABLE
REM        ACCOUNTS
REM        ACCOUNT_ADDRESSES
REM        ACCOUNT_CLIENT_DEVICES
REM        ACCOUNT_PAYMENT_DEVICES
REM        ACCOUNT_PREFERENCES
REM        ACCOUNT_RESTRICTIONS
REM        ACCOUNT_STATISTICS
REM        CLIENT_DEVICE_MODELS
REM        CONTENT
REM        CONTENT_LISTS
REM        CONTENT_PROVIDERS
REM        DELIVERIES
REM        DESCRIPTOR_SETS
REM        DESCRIPTOR_VALUES
REM        FEATURE_SETS
REM        FEATURE_VALUES
REM        INHERITANCE_MAP
REM        LOGICAL_CONTENT
REM        MARKETING_EVENTS
REM        MARKETING_EVENT_TYPES
REM        MKT_EVENT_ASSIGNMENTS
REM        OBJECT_REFERENCE_DEFS
REM        ORDERS
REM        ORDER_ITEMS
REM        PREFERENCES
REM        PRICE_LISTS
REM        PRICE_LIST_ACCOUNTS
REM        PRODUCTS
REM        PRODUCT_CATEGORIES
REM        PRODUCT_DESCRIPTOR_VALUES
REM        PRODUCT_ITEMS
REM        PRODUCT_ITEM_FTR_VALUES
REM        PRODUCT_ITEM_LCONTENT
REM        PRODUCT_ITEM_PRICE_LISTS
REM        PRODUCT_LCONTENT
REM        PRODUCT_PRICE_LISTS
REM        SERVICES
REM        SERVICE_AGENTS
REM        SERVICE_AGENT_STATES
REM        SERVICE_AGENT_STATISTICS
REM        SERVICE_AGENT_STATUS_HISTORIES
REM        SERVICE_AVAILABILITIES
REM        SERVICE_PAYMENT_DEVICES
REM        SERVICE_STATISTICS
REM        SERVICE_SUBSCRIPTIONS
REM        SESSIONS
REM        SESSION_STATISTICS
REM        SESSION_STATUS_HISTORIES
REM        STREAMS
REM        SYSTEM_EVENTS
REM        SYSTEM_EVENT_TYPES
REM        SYSTEM_MESSAGES
REM        USERS
REM        USER_PREFERENCES
REM        USER_RESTRICTIONS
REM        USER_STATISTICS
REM        VALID_PRODUCT_DESCRIPTOR_SETS
REM        VALID_PRODUCT_FEATURE_SETS
REM        VIDEO_PRODUCT_DELIVERIES
```

```
REM
REM     Created from Entity ACCOUNT by CASE on 03-MAR-95
REM
PROMPT
PROMPT Creating Table ACCOUNTS
CREATE TABLE accounts(
  id                        NUMBER(9,0)         NOT NULL,
  creation_datetime         DATE                NOT NULL,
  object_reference          VARCHAR2(120)       NOT NULL,
  account_number            VARCHAR2(30)        NOT NULL,
  available_credit          NUMBER(9,2)         NULL,
  balance                   NUMBER(9,2)         NULL,
  credit_limit              NUMBER(9,2)         NULL,
  first_name                VARCHAR2(20)        NULL,
  last_name                 VARCHAR2(30)        NULL,
  middle_name               VARCHAR2(20)        NULL,
  status                    VARCHAR2(10)        NULL,
  status_reason             VARCHAR2(80)        NULL,
  title                     VARCHAR2(10)        NULL
)
;

COMMENT ON TABLE accounts
    IS 'Created from Entity ACCOUNT by CASE on 03-MAR-95';

REM
REM     Created from Entity ADDRESS by CASE on 03-MAR-95
REM
PROMPT
PROMPT Creating Table ACCOUNT_ADDRESSES
CREATE TABLE account_addresses(
  id                        NUMBER(9,0)         NOT NULL,
  creation_datetime         DATE                NOT NULL,
  object_reference          VARCHAR2(120)       NOT NULL,
  account_id                NUMBER(9,0)         NOT NULL,
  account_or                VARCHAR2(120)       NOT NULL,
  address_type              VARCHAR2(15)        NOT NULL,
  address1                  VARCHAR2(80)        NOT NULL,
  address2                  VARCHAR2(80)        NOT NULL,
  address3                  VARCHAR2(80)        NULL,
  address4                  VARCHAR2(80)        NULL,
  fax_number                VARCHAR2(20)        NULL,
  phone_number              VARCHAR2(20)        NULL
)
;

COMMENT ON TABLE account_addresses
    IS 'Created from Entity ADDRESS by CASE on 03-MAR-95';

REM
REM     Created from Entity CLIENT DEVICE by CASE on 03-MAR-95
REM
PROMPT
PROMPT Creating Table ACCOUNT_CLIENT_DEVICES
CREATE TABLE account_client_devices(
  id                        NUMBER(9,0)         NOT NULL,
  creation_datetime         DATE                NOT NULL,
  object_reference          VARCHAR2(120)       NOT NULL,
  account_id                NUMBER(9,0)         NOT NULL,
  account_or                VARCHAR2(120)       NOT NULL,
  client_device_model_id    NUMBER(9)           NOT NULL,
  client_device_model_or    VARCHAR2(120)       NOT NULL,
  physical_network_address  VARCHAR2(80)        NOT NULL,
  serial_number             VARCHAR2(20)        NULL,
  rental_fee                NUMBER(9,2)         NULL
```

```
)
;

COMMENT ON TABLE account_client_devices
    IS 'Created from Entity CLIENT DEVICE by CASE on 03-MAR-95';

REM
REM     Created from Entity ACCOUNT PAYMENT DEVICE by CASE on 03-MAR-95
REM
PROMPT
PROMPT Creating Table ACCOUNT_PAYMENT_DEVICES
CREATE TABLE account_payment_devices(
  id                      NUMBER(9,0)             NOT NULL,
  creation_datetime       DATE                    NOT NULL,
  object_reference        VARCHAR2(120)           NOT NULL,
  account_id              NUMBER(9,0)             NOT NULL,
  account_or              VARCHAR2(120)           NOT NULL,
  payment_device_type     VARCHAR2(10)            NOT NULL,
  card_acct_number        VARCHAR2(30)            NOT NULL,
  default_flag            VARCHAR2(1)             NOT NULL,
  cardholder_name         VARCHAR2(60)            NULL,
  expiration_date         VARCHAR2(4)             NULL,
  card_name               VARCHAR2(30)            NULL
)
;

COMMENT ON TABLE account_payment_devices
    IS 'Created from Entity ACCOUNT PAYMENT DEVICE by CASE on 03-MAR-95';

REM
REM     Created from Entity ACCOUNT PREFERENCE by CASE on 03-MAR-95
REM
PROMPT
PROMPT Creating Table ACCOUNT_PREFERENCES
CREATE TABLE account_preferences(
  id                      NUMBER(9,0)             NOT NULL,
  creation_datetime       DATE                    NOT NULL,
  account_id              NUMBER(9,0)             NOT NULL,
  account_or              VARCHAR2(120)           NOT NULL,
  preference_id           NUMBER(9,0)             NOT NULL,
  preference_or           VARCHAR2(120)           NOT NULL,
  value                   VARCHAR2(80)            NULL
)
;

COMMENT ON TABLE account_preferences
    IS 'Created from Entity ACCOUNT PREFERENCE by CASE on 03-MAR-95';

REM
REM     Created from Entity ACCOUNT RESTRICTION by CASE on 03-MAR-95
REM
PROMPT
PROMPT Creating Table ACCOUNT_RESTRICTIONS
CREATE TABLE account_restrictions(
  id                      NUMBER(9,0)             NOT NULL,
  creation_datetime       DATE                    NOT NULL,
  account_id              NUMBER(9,0)             NOT NULL,
  account_or              VARCHAR2(120)           NOT NULL,
  restriction_type        VARCHAR2(10)            NOT NULL,
  object_type             VARCHAR2(10)            NOT NULL,
  object_id               NUMBER(9)               NOT NULL,
  object_or               VARCHAR2(120)           NOT NULL,
  begin_time              VARCHAR2(5)             NULL,
  display_flag            VARCHAR2(1)             NOT NULL,
  service_id              NUMBER(9)               NOT NULL,
  service_or              VARCHAR2(120)           NOT NULL,
```

```
    create_user_id             NUMBER(9)            NOT NULL,
    create_user_or             VARCHAR2(120)        NOT NULL,
    budget_amount              NUMBER(6,2)          NULL,
    budget_used                NUMBER(6,2)          NULL,
    end_time                   VARCHAR2(8)          NULL
)
;

COMMENT ON TABLE account_restrictions
    IS 'Created from Entity ACCOUNT RESTRICTION by CASE on 03-MAR-95';

REM
REM     Created from Entity ACCOUNT STATISTIC by CASE on 03-MAR-95
REM
PROMPT
PROMPT Creating Table ACCOUNT_STATISTICS
CREATE TABLE account_statistics(
    id                         NUMBER(9,0)          NOT NULL,
    creation_datetime          DATE                 NOT NULL,
    object_reference           VARCHAR2(120)        NOT NULL,
    account_id                 NUMBER(9,0)          NOT NULL,
    account_or                 VARCHAR2(120)        NOT NULL,
    abnormal_disc_cnt          NUMBER(9,0)          NULL,
    num_details_viewed         NUMBER(9,0)          NULL,
    num_purchases              NUMBER(9,0)          NULL,
    suspended_sess_count       NUMBER(9,0)          NULL,
    total_connect_time         NUMBER(9,0)          NULL,
    total_logins               NUMBER(9,0)          NULL,
    total_purchases            NUMBER(9,2)          NULL,
    total_services_connected   NUMBER(9,0)          NULL
)
;

COMMENT ON TABLE account_statistics
    IS 'Created from Entity ACCOUNT STATISTIC by CASE on 03-MAR-95';

REM
REM     Created from Entity CLIENT DEVICE MODEL by CASE on 03-MAR-95
REM
PROMPT
PROMPT Creating Table CLIENT_DEVICE_MODELS
CREATE TABLE client_device_models(
    id                         NUMBER(9,0)          NOT NULL,
    creation_datetime          DATE                 NOT NULL,
    object_reference           VARCHAR2(120)        NOT NULL,
    manufacturer               VARCHAR2(40)         NOT NULL,
    model_name                 VARCHAR2(40)         NOT NULL,
    model_number               VARCHAR2(40)         NOT NULL,
    default_rental_fee         NUMBER(5,2)          NULL
)
;

COMMENT ON TABLE client_device_models
    IS 'Created from Entity CLIENT DEVICE MODEL by CASE on 03-MAR-95';

REM
REM     Created from Entity CONTENT by CASE on 03-MAR-95
REM
PROMPT
PROMPT Creating Table CONTENT
CREATE TABLE content(
    id                         NUMBER(9,0)          NOT NULL,
    creation_datetime          DATE                 NOT NULL,
    object_reference           VARCHAR2(120)        NOT NULL,
    name                       VARCHAR2(30)         NOT NULL,
    content_type               VARCHAR2(10)         NULL,
```

```
  content_provider_id        NUMBER(9,0)         NULL,
  content_provider_or        VARCHAR2(120)       NULL,
  description                VARCHAR2(80)        NULL,
  encoding_format            VARCHAR2(10)        NULL,
  file_length                NUMBER(9,0)         NULL,
  file_name                  VARCHAR2(120)       NULL,
  run_length                 NUMBER(9,0)         NULL
)
;

COMMENT ON TABLE content
    IS 'Created from Entity CONTENT by CASE on 03-MAR-95';

REM
REM     Created from Entity CONTENT LIST by CASE on 03-MAR-95
REM
PROMPT
PROMPT Creating Table CONTENT_LISTS
CREATE TABLE content_lists(
  id                         NUMBER(9,0)         NOT NULL,
  creation_datetime          DATE                NOT NULL,
  logical_content_id         NUMBER(9,0)         NOT NULL,
  logical_content_or         VARCHAR2(120)       NOT NULL,
  content_id                 NUMBER(9,0)         NOT NULL,
  content_or                 VARCHAR2(120)       NOT NULL,
  ff_flag                    VARCHAR2(1)         NOT NULL,
  pause_flag                 VARCHAR2(1)         NOT NULL,
  rw_flag                    VARCHAR2(1)         NOT NULL,
  sequence_num               NUMBER(3,0)         NULL,
  start_position             NUMBER(9,0)         NULL,
  stop_position              NUMBER(9,0)         NULL
)
;

COMMENT ON TABLE content_lists
    IS 'Created from Entity CONTENT LIST by CASE on 03-MAR-95';

REM
REM     Created from Entity CONTENT PROVIDER by CASE on 03-MAR-95
REM
PROMPT
PROMPT Creating Table CONTENT_PROVIDERS
CREATE TABLE content_providers(
  id                         NUMBER(9,0)         NOT NULL,
  creation_datetime          DATE                NOT NULL,
  object_reference           VARCHAR2(120)       NOT NULL,
  name                       VARCHAR2(80)        NOT NULL,
  description                VARCHAR2(2000)      NULL
)
;

COMMENT ON TABLE content_providers
    IS 'Created from Entity CONTENT PROVIDER by CASE on 03-MAR-95';

REM
REM
REM
PROMPT
PROMPT Creating Table DELIVERIES
CREATE TABLE deliveries(
  id                         NUMBER(9)           NOT NULL,
  creation_datetime          DATE                NOT NULL,
  object_reference           VARCHAR2(120)       NOT NULL,
  delivery_object_type       VARCHAR2(10)        NOT NULL,
  delivery_object_id         NUMBER(9)           NULL,
  delivery_object_or         VARCHAR2(120)       NULL
```

```
)
;

REM
REM     Created from Entity DESCRIPTOR SET by CASE on 03-MAR-95
REM
PROMPT
PROMPT Creating Table DESCRIPTOR_SETS
CREATE TABLE descriptor_sets(
  id                        NUMBER(9,0)          NOT NULL,
  creation_datetime         DATE                 NOT NULL,
  object_reference          VARCHAR2(120)        NOT NULL,
  name                      VARCHAR2(30)         NOT NULL,
  service_id                NUMBER(9)            NOT NULL,
  service_or                VARCHAR2(120)        NOT NULL,
  description               VARCHAR2(80)         NULL,
  label                     VARCHAR2(30)         NULL
)
;

COMMENT ON TABLE descriptor_sets
    IS 'Created from Entity DESCRIPTOR SET by CASE on 03-MAR-95';

REM
REM     Created from Entity DESCRIPTOR VALUE by CASE on 03-MAR-95
REM
PROMPT
PROMPT Creating Table DESCRIPTOR_VALUES
CREATE TABLE descriptor_values(
  id                        NUMBER(9,0)          NOT NULL,
  creation_datetime         DATE                 NOT NULL,
  object_reference          VARCHAR2(120)        NOT NULL,
  descriptor_set_id         NUMBER(9,0)          NOT NULL,
  descriptor_set_or         VARCHAR2(120)        NOT NULL,
  value                     VARCHAR2(30)         NOT NULL,
  description               VARCHAR2(80)         NULL
)
;

COMMENT ON TABLE descriptor_values
    IS 'Created from Entity DESCRIPTOR VALUE by CASE on 03-MAR-95';

REM
REM     Created from Entity FEATURE SET by CASE on 03-MAR-95
REM
PROMPT
PROMPT Creating Table FEATURE_SETS
CREATE TABLE feature_sets(
  id                        NUMBER(9,0)          NOT NULL,
  creation_datetime         DATE                 NOT NULL,
  object_reference          VARCHAR2(120)        NOT NULL,
  name                      VARCHAR2(30)         NOT NULL,
  description               VARCHAR2(80)         NULL,
  label                     VARCHAR2(30)         NULL
)
;

COMMENT ON TABLE feature_sets
    IS 'Created from Entity FEATURE SET by CASE on 03-MAR-95';

REM
REM     Created from Entity FEATURE VALUE by CASE on 03-MAR-95
REM
PROMPT
PROMPT Creating Table FEATURE_VALUES
CREATE TABLE feature_values(
```

```
  id                           NUMBER(9,0)              NOT NULL,
  creation_datetime            DATE                     NOT NULL,
  object_reference             VARCHAR2(120)            NOT NULL,
  feature_set_id               NUMBER(9,0)              NOT NULL,
  feature_set_or               VARCHAR2(120)            NOT NULL,
  value                        VARCHAR2(30)             NOT NULL,
  description                  VARCHAR2(80)             NULL
)
;

COMMENT ON TABLE feature_values
    IS 'Created from Entity FEATURE VALUE by CASE on 03-MAR-95';

REM
REM
REM
PROMPT
PROMPT Creating Table INHERITANCE_MAP
CREATE TABLE inheritance_map(
  interface_name               VARCHAR2(100)            NOT NULL,
  object_id                    NUMBER(9)                NOT NULL,
  parent_interface_name        VARCHAR2(100)            NOT NULL,
  parent_object_reference      VARCHAR2(120)            NULL
)
;

REM
REM     Created from Entity LOGICAL CONTENT by CASE on 03-MAR-95
REM
PROMPT
PROMPT Creating Table LOGICAL_CONTENT
CREATE TABLE logical_content(
  id                           NUMBER(9,0)              NOT NULL,
  creation_datetime            DATE                     NOT NULL,
  object_reference             VARCHAR2(120)            NOT NULL,
  name                         VARCHAR2(30)             NOT NULL,
  usage_type                   VARCHAR2(10)             NOT NULL,
  description                  VARCHAR2(80)             NULL
)
;

COMMENT ON TABLE logical_content
    IS 'Created from Entity LOGICAL CONTENT by CASE on 03-MAR-95';

REM
REM     Created from Entity MARKETING EVENT by CASE on 03-MAR-95
REM
PROMPT
PROMPT Creating Table MARKETING_EVENTS
CREATE TABLE marketing_events(
  id                           NUMBER(9,0)              NOT NULL,
  creation_datetime            DATE                     NOT NULL,
  marketing_event_type_id      NUMBER(9)                NOT NULL,
  marketing_event_type_or      VARCHAR2(120)            NOT NULL,
  statistic                    VARCHAR2(80)             NULL,
  timestamp                    DATE                     NULL,
  user_or                      VARCHAR2(120)            NULL,
  user_id                      NUMBER(9)                NULL
)
;

COMMENT ON TABLE marketing_events
    IS 'Created from Entity MARKETING EVENT by CASE on 03-MAR-95';

REM
REM     Created from Entity MARKETING EVENT TYPE by CASE on 03-MAR-95
```

```
REM
PROMPT
PROMPT Creating Table MARKETING_EVENT_TYPES
CREATE TABLE marketing_event_types(
  id                      NUMBER(9,0)      NOT NULL,
  creation_datetime       DATE             NOT NULL,
  object_reference        VARCHAR2(120)    NOT NULL,
  service_id              NUMBER(9,0)      NOT NULL,
  service_or              VARCHAR2(120)    NOT NULL,
  name                    VARCHAR2(80)     NOT NULL,
  description             VARCHAR2(255)    NULL,
  system_event_type_id    NUMBER(9,0)      NULL,
  system_event_type_or    VARCHAR2(120)    NULL
)
;

COMMENT ON TABLE marketing_event_types
    IS 'Created from Entity MARKETING EVENT TYPE by CASE on 03-MAR-95';

REM
REM     Created from Entity MARKETING EVENT ASSIGNMENT by CASE on 03-MAR-95
REM
PROMPT
PROMPT Creating Table MKT_EVENT_ASSIGNMENTS
CREATE TABLE mkt_event_assignments(
  id                        NUMBER(9,0)      NOT NULL,
  creation_datetime         DATE             NOT NULL,
  marketing_event_type_id   NUMBER(9,0)      NOT NULL,
  marketing_event_type_or   VARCHAR2(120)    NOT NULL,
  user_id                   NUMBER(9,0)      NOT NULL,
  user_or                   VARCHAR2(120)    NOT NULL
)
;

COMMENT ON TABLE mkt_event_assignments
    IS 'Created from Entity MARKETING EVENT ASSIGNMENT by CASE on 03-MAR-95';

REM
REM
REM
PROMPT
PROMPT Creating Table OBJECT_REFERENCE_DEFS
CREATE TABLE object_reference_defs(
  server_name       VARCHAR2(30)     NOT NULL,
  object_name       VARCHAR2(30)     NOT NULL,
  table_name        VARCHAR2(30)     NOT NULL
)
;

REM
REM     Created from Entity ORDER by CASE on 03-MAR-95
REM
PROMPT
PROMPT Creating Table ORDERS
CREATE TABLE orders(
  id                           NUMBER(9,0)      NOT NULL,
  creation_datetime            DATE             NOT NULL,
  object_reference             VARCHAR2(120)    NOT NULL,
  account_payment_device_id    NUMBER(9,0)      NULL,
  account_payment_device_or    VARCHAR2(120)    NULL,
  cancellation_reason          VARCHAR2(120)    NULL,
  confirmation_datetime        DATE             NULL,
  order_status                 VARCHAR2(15)     NULL,
  user_id                      NUMBER(9)        NULL,
  user_or                      VARCHAR2(120)    NULL,
  service_id                   NUMBER(9)        NULL,
```

```
    service_or                  VARCHAR2(120)            NULL,
    session_id                  NUMBER(9,0)              NULL,
    session_or                  VARCHAR2(120)            NULL
)
;

COMMENT ON TABLE orders
    IS 'Created from Entity ORDER by CASE on 03-MAR-95';

REM
REM     Created from Entity ORDER ITEM by CASE on 03-MAR-95
REM
PROMPT
PROMPT Creating Table ORDER_ITEMS
CREATE TABLE order_items(
    id                          NUMBER(9,0)              NOT NULL,
    creation_datetime           DATE                     NOT NULL,
    object_reference            VARCHAR2(120)            NOT NULL,
    order_id                    NUMBER(9,0)              NOT NULL,
    order_or                    VARCHAR2(120)            NOT NULL,
    item_sequence               NUMBER(3,0)              NOT NULL,
    amount                      NUMBER(9,2)              NOT NULL,
    product_item_id             NUMBER(9)                NOT NULL,
    product_item_or             VARCHAR2(120)            NOT NULL,
    quantity                    NUMBER(3,0)              NOT NULL
)
;

COMMENT ON TABLE order_items
    IS 'Created from Entity ORDER ITEM by CASE on 03-MAR-95';

REM
REM     Created from Entity PREFERENCE by CASE on 03-MAR-95
REM
PROMPT
PROMPT Creating Table PREFERENCES
CREATE TABLE preferences(
    id                          NUMBER(9,0)              NOT NULL,
    creation_datetime           DATE                     NOT NULL,
    object_reference            VARCHAR2(120)            NOT NULL,
    service_id                  NUMBER(9,0)              NOT NULL,
    service_or                  VARCHAR2(120)            NOT NULL,
    name                        VARCHAR2(40)             NOT NULL,
    validation_type             VARCHAR2(30)             NOT NULL,
    preference_type             VARCHAR2(10)             NULL
)
;

COMMENT ON TABLE preferences
    IS 'Created from Entity PREFERENCE by CASE on 03-MAR-95';

REM
REM     Created from Entity PRICE LIST by CASE on 03-MAR-95
REM
PROMPT
PROMPT Creating Table PRICE_LISTS
CREATE TABLE price_lists(
    id                          NUMBER(9,0)              NOT NULL,
    creation_datetime           DATE                     NOT NULL,
    object_reference            VARCHAR2(120)            NOT NULL,
    service_id                  NUMBER(9,0)              NOT NULL,
    service_or                  VARCHAR2(120)            NOT NULL,
    name                        VARCHAR2(30)             NOT NULL,
    description                 VARCHAR2(80)             NULL
)
;
```

```
COMMENT ON TABLE price_lists
    IS 'Created from Entity PRICE LIST by CASE on 03-MAR-95';

REM
REM     Created from Entity PRICE LIST ACCOUNT by CASE on 03-MAR-95
REM
PROMPT
PROMPT Creating Table PRICE_LIST_ACCOUNTS
CREATE TABLE price_list_accounts(
  id                       NUMBER(9,0)              NOT NULL,
  creation_datetime        DATE                     NOT NULL,
  price_list_id            NUMBER(9,0)              NOT NULL,
  price_list_or            VARCHAR2(120)            NOT NULL,
  account_id               NUMBER(9,0)              NOT NULL,
  account_or               VARCHAR2(120)            NOT NULL
)
;

COMMENT ON TABLE price_list_accounts
    IS 'Created from Entity PRICE LIST ACCOUNT by CASE on 03-MAR-95';

REM
REM     Created from Entity PRODUCT by CASE on 03-MAR-95
REM
PROMPT
PROMPT Creating Table PRODUCTS
CREATE TABLE products(
  id                       NUMBER(9,0)              NOT NULL,
  creation_datetime        DATE                     NOT NULL,
  object_reference         VARCHAR2(120)            NOT NULL,
  service_id               NUMBER(9)                NOT NULL,
  service_or               VARCHAR2(120)            NOT NULL,
  name                     VARCHAR2(30)             NOT NULL,
  catalog_number           VARCHAR2(15)             NOT NULL,
  product_category_id      NUMBER(9)                NOT NULL,
  product_category_or      VARCHAR2(120)            NOT NULL,
  description              VARCHAR2(80)             NULL,
  label                    VARCHAR2(15)             NULL,
  product_type             VARCHAR2(15)             NULL
)
;

COMMENT ON TABLE products
    IS 'Created from Entity PRODUCT by CASE on 03-MAR-95';

REM
REM     Created from Entity PRODUCT CATEGORY by CASE on 03-MAR-95
REM
PROMPT
PROMPT Creating Table PRODUCT_CATEGORIES
CREATE TABLE product_categories(
  id                       NUMBER(9,0)              NOT NULL,
  creation_datetime        DATE                     NOT NULL,
  object_reference         VARCHAR2(120)            NOT NULL,
  name                     VARCHAR2(30)             NOT NULL,
  description              VARCHAR2(80)             NULL
)
;

COMMENT ON TABLE product_categories
    IS 'Created from Entity PRODUCT CATEGORY by CASE on 03-MAR-95';

REM
REM     Created from Entity PRODUCT DESCRIPTOR VALUE by CASE on 03-MAR-95
REM
```

```
PROMPT
PROMPT Creating Table PRODUCT_DESCRIPTOR_VALUES
CREATE TABLE product_descriptor_values(
 id                         NUMBER(9,0)         NOT NULL,
 creation_datetime          DATE                NOT NULL,
 product_id                 NUMBER(9,0)         NOT NULL,
 product_or                 VARCHAR2(120)       NOT NULL,
 descriptor_value_id        NUMBER(9,0)         NOT NULL,
 descriptor_value_or        VARCHAR2(120)       NOT NULL
)
;

COMMENT ON TABLE product_descriptor_values
    IS 'Created from Entity PRODUCT DESCRIPTOR VALUE by CASE on 03-MAR-95';

REM
REM     Created from Entity PRODUCT ITEM by CASE on 03-MAR-95
REM
PROMPT
PROMPT Creating Table PRODUCT_ITEMS
CREATE TABLE product_items(
 id                         NUMBER(9,0)         NOT NULL,
 creation_datetime          DATE                NOT NULL,
 object_reference           VARCHAR2(120)       NOT NULL,
 name                       VARCHAR2(30)        NOT NULL,
 product_id                 NUMBER(9,0)         NOT NULL,
 product_or                 VARCHAR2(120)       NOT NULL,
 description                VARCHAR2(80)        NULL
)
;

COMMENT ON TABLE product_items
    IS 'Created from Entity PRODUCT ITEM by CASE on 03-MAR-95';

REM
REM     Created from Entity PRODUCT ITEM FEATURE VALUE by CASE on 03-MAR-95
REM
PROMPT
PROMPT Creating Table PRODUCT_ITEM_FTR_VALUES
CREATE TABLE product_item_ftr_values(
 id                         NUMBER(9,0)         NOT NULL,
 creation_datetime          DATE                NOT NULL,
 product_item_id            NUMBER(9,0)         NOT NULL,
 product_item_or            VARCHAR2(120)       NOT NULL,
 feature_value_id           NUMBER(9,0)         NOT NULL,
 feature_value_or           VARCHAR2(120)       NOT NULL
)
;

COMMENT ON TABLE product_item_ftr_values
    IS 'Created from Entity PRODUCT ITEM FEATURE VALUE by CASE on 03-MAR-95';

REM
REM
REM
PROMPT
PROMPT Creating Table PRODUCT_ITEM_LCONTENT
CREATE TABLE product_item_lcontent(
 product_item_id            NUMBER(9)           NOT NULL,
 product_item_or            VARCHAR2(120)       NOT NULL,
 logical_content_id         NUMBER(9)           NOT NULL,
 logical_content_or         VARCHAR2(120)       NOT NULL,
 creation_datetime          DATE                NOT NULL
)
;
```

```
REM
REM     Created from Entity PRODUCT ITEM PRICE LIST by CASE on 03-MAR-95
REM
PROMPT
PROMPT Creating Table PRODUCT_ITEM_PRICE_LISTS
CREATE TABLE product_item_price_lists(
  id                         NUMBER(9,0)        NOT NULL,
  creation_datetime          DATE               NOT NULL,
  product_item_id            NUMBER(9,0)        NOT NULL,
  product_item_or            VARCHAR2(120)      NOT NULL,
  price_list_id              NUMBER(9,0)        NOT NULL,
  price_list_or              VARCHAR2(120)      NOT NULL,
  price                      NUMBER(9,2)        NULL
)
;

COMMENT ON TABLE product_item_price_lists
    IS 'Created from Entity PRODUCT ITEM PRICE LIST by CASE on 03-MAR-95';

REM
REM
REM
PROMPT
PROMPT Creating Table PRODUCT_LCONTENT
CREATE TABLE product_lcontent(
  product_id                 NUMBER(9)          NOT NULL,
  product_or                 VARCHAR2(120)      NOT NULL,
  logical_content_id         NUMBER(9)          NOT NULL,
  logical_content_or         VARCHAR2(120)      NOT NULL,
  creation_datetime          DATE               NOT NULL
)
;

REM
REM     Created from Entity PRODUCT PRICE LIST by CASE on 03-MAR-95
REM
PROMPT
PROMPT Creating Table PRODUCT_PRICE_LISTS
CREATE TABLE product_price_lists(
  id                         NUMBER(9,0)        NOT NULL,
  creation_datetime          DATE               NOT NULL,
  price_list_id              NUMBER(9,0)        NOT NULL,
  price_list_or              VARCHAR2(120)      NOT NULL,
  product_id                 NUMBER(9,0)        NOT NULL,
  product_or                 VARCHAR2(120)      NOT NULL,
  price                      NUMBER(9,2)        NULL
)
;

COMMENT ON TABLE product_price_lists
    IS 'Created from Entity PRODUCT PRICE LIST by CASE on 03-MAR-95';

REM
REM     Created from Entity SERVICE by CASE on 03-MAR-95
REM
PROMPT
PROMPT Creating Table SERVICES
CREATE TABLE services(
  id                         NUMBER(9,0)        NOT NULL,
  creation_datetime          DATE               NOT NULL,
  object_reference           VARCHAR2(120)      NOT NULL,
  name                       VARCHAR2(40)       NOT NULL,
  gateway_flag               VARCHAR2(1)        DEFAULT 'N'  NOT NULL,
  service_instance_count     NUMBER(9,0)        DEFAULT 0    NOT NULL,
  max_service_instances      NUMBER(9,0)        NULL,
```

```
  service_uptime                    DATE                    NULL,
  subscription_fee                  NUMBER(9,2)             NULL
)
;

COMMENT ON TABLE services
    IS 'Created from Entity SERVICE by CASE on 03-MAR-95';

REM
REM     Created from Entity SERVICE AGENT by CASE on 03-MAR-95
REM
PROMPT
PROMPT Creating Table SERVICE_AGENTS
CREATE TABLE service_agents(
  id                                NUMBER(9,0)             NOT NULL,
  creation_datetime                 DATE                    NOT NULL,
  object_reference                  VARCHAR2(120)           NOT NULL,
  service_id                        NUMBER(9,0)             NOT NULL,
  service_or                        VARCHAR2(120)           NOT NULL,
  session_id                        NUMBER(9,0)             NOT NULL,
  session_or                        VARCHAR2(120)           NOT NULL,
  price_list_id                     NUMBER(9,0)             NULL,
  price_list_or                     VARCHAR2(120)           NULL,
  status                            VARCHAR2(10)            NULL
)
;

COMMENT ON TABLE service_agents
    IS 'Created from Entity SERVICE AGENT by CASE on 03-MAR-95';

REM
REM
REM
PROMPT
PROMPT Creating Table SERVICE_AGENT_STATES
CREATE TABLE service_agent_states(
  service_agent_id                  NUMBER(9)               NOT NULL,
  state                             LONG                    NULL
)
;

REM
REM     Created from Entity SERVICE STATISTIC by CASE on 03-MAR-95
REM
PROMPT
PROMPT Creating Table SERVICE_AGENT_STATISTICS
CREATE TABLE service_agent_statistics(
  id                                NUMBER(9,0)             NOT NULL,
  creation_datetime                 DATE                    NOT NULL,
  object_reference                  VARCHAR2(120)           NOT NULL,
  service_agent_id                  NUMBER(9,0)             NOT NULL,
  service_agent_or                  VARCHAR2(120)           NOT NULL,
  begin_date                        DATE                    NULL,
  end_date                          DATE                    NULL,
  number_products_viewed            NUMBER(9,0)             NULL,
  number_purchases                  NUMBER(9,0)             NULL,
  total_purchases                   NUMBER(9,2)             NULL
)
;

COMMENT ON TABLE service_agent_statistics
    IS 'Created from Entity SERVICE STATISTIC by CASE on 03-MAR-95';

REM
REM     Created from Entity SERVICE AGENT STATUS by CASE on 03-MAR-95
REM
```

```
PROMPT
PROMPT Creating Table SERVICE_AGENT_STATUS_HISTORIES
CREATE TABLE service_agent_status_histories(
  id                         NUMBER(9,0)         NOT NULL,
  creation_datetime          DATE                NOT NULL,
  service_agent_id           NUMBER(9,0)         NOT NULL,
  service_agent_or           VARCHAR2(120)       NOT NULL,
  status                     VARCHAR2(10)        NOT NULL,
  status_reason              VARCHAR2(80)        NULL
)
;

COMMENT ON TABLE service_agent_status_histories
    IS 'Created from Entity SERVICE AGENT STATUS by CASE on 03-MAR-95';

REM
REM     Created from Entity SERVICE AVAILABILITY by CASE on 03-MAR-95
REM
PROMPT
PROMPT Creating Table SERVICE_AVAILABILITIES
CREATE TABLE service_availabilities(
  id                         NUMBER(9,0)         NOT NULL,
  creation_datetime          DATE                NOT NULL,
  service_id                 NUMBER(9,0)         NOT NULL,
  service_or                 VARCHAR2(120)       NOT NULL,
  client_device_model_id     NUMBER(9,0)         NOT NULL,
  client_device_model_or     VARCHAR2(120)       NOT NULL,
  service_executable         VARCHAR2(255)       NULL
)
;

COMMENT ON TABLE service_availabilities
    IS 'Created from Entity SERVICE AVAILABILITY by CASE on 03-MAR-95';

REM
REM     Created from Entity SERVICE PAYMENT DEVICE by CASE on 03-MAR-95
REM
PROMPT
PROMPT Creating Table SERVICE_PAYMENT_DEVICES
CREATE TABLE service_payment_devices(
  id                         NUMBER(9,0)         NOT NULL,
  creation_datetime          DATE                NOT NULL,
  payment_device_type        VARCHAR2(10)        NOT NULL,
  service_id                 NUMBER(9,0)         NOT NULL,
  service_or                 VARCHAR2(120)       NOT NULL,
  description                VARCHAR2(80)        NULL
)
;

COMMENT ON TABLE service_payment_devices
    IS 'Created from Entity SERVICE PAYMENT DEVICE by CASE on 03-MAR-95';

REM
REM
REM
PROMPT
PROMPT Creating Table SERVICE_STATISTICS
CREATE TABLE service_statistics(
  id                         NUMBER(9)           NOT NULL,
  creation_datetime          DATE                NOT NULL,
  object_reference           VARCHAR2(120)       NOT NULL,
  service_id                 NUMBER(9)           NOT NULL,
  service_or                 VARCHAR2(120)       NOT NULL,
  begin_date                 DATE                NULL,
  end_date                   DATE                NULL,
  number_abnormal_disconnects NUMBER(9)          NULL,
```

```
  number_connects                NUMBER(9)           NULL,
  number_products_viewed         NUMBER(9)           NULL,
  number_suspended_connections   NUMBER(9)           NULL,
  number_purchases               NUMBER(9)           NULL,
  total_connection_time          NUMBER(9)           NULL,
  total_purchases                NUMBER(9)           NULL
)
;

REM
REM     Created from Entity SERVICE SUBSCRIPTION by CASE on 03-MAR-95
REM
PROMPT
PROMPT Creating Table SERVICE_SUBSCRIPTIONS
CREATE TABLE service_subscriptions(
  id                   NUMBER(9,0)        NOT NULL,
  creation_datetime    DATE               NOT NULL,
  account_id           NUMBER(9,0)        NOT NULL,
  account_or           VARCHAR2(120)      NOT NULL,
  service_id           NUMBER(9,0)        NOT NULL,
  service_or           VARCHAR2(120)      NOT NULL
)
;

COMMENT ON TABLE service_subscriptions
    IS 'Created from Entity SERVICE SUBSCRIPTION by CASE on 03-MAR-95';

REM
REM     Created from Entity SESSION by CASE on 03-MAR-95
REM
PROMPT
PROMPT Creating Table SESSIONS
CREATE TABLE sessions(
  id                   NUMBER(9,0)        NOT NULL,
  creation_datetime    DATE               NOT NULL,
  object_reference     VARCHAR2(120)      NOT NULL,
  account_id           NUMBER(9)          NULL,
  account_or           VARCHAR2(120)      NULL,
  client_device_id     NUMBER(9,0)        NULL,
  client_device_or     VARCHAR2(120)      NULL,
  service_agent_id     NUMBER(9,0)        NULL,
  service_agent_or     VARCHAR2(120)      NULL,
  user_id              NUMBER(9,0)        NULL,
  user_or              VARCHAR2(120)      NULL,
  status               VARCHAR2(10)       NULL
)
;

COMMENT ON TABLE sessions
    IS 'Created from Entity SESSION by CASE on 03-MAR-95';

REM
REM     Created from Entity SESSION STATISTIC by CASE on 03-MAR-95
REM
PROMPT
PROMPT Creating Table SESSION_STATISTICS
CREATE TABLE session_statistics(
  id                         NUMBER(9,0)        NOT NULL,
  creation_datetime          DATE               NOT NULL,
  object_reference           VARCHAR2(120)      NOT NULL,
  session_id                 NUMBER(9,0)        NOT NULL,
  session_or                 VARCHAR2(120)      NOT NULL,
  login_date                 DATE               NULL,
  logout_date                DATE               NULL,
  number_connected_services  NUMBER(9,0)        NULL
)
```

```
COMMENT ON TABLE session_statistics
    IS 'Created from Entity SESSION STATISTIC by CASE on 03-MAR-95';

REM
REM     Created from Entity SESSION_STATUS_HISTORY by CASE on 03-MAR-95
REM
PROMPT
PROMPT Creating Table SESSION_STATUS_HISTORIES
CREATE TABLE session_status_histories(
  id                     NUMBER(9,0)         NOT NULL,
  creation_datetime      DATE                NOT NULL,
  session_id             NUMBER(9,0)         NOT NULL,
  session_or             VARCHAR2(120)       NOT NULL,
  status                 VARCHAR2(10)        NOT NULL,
  status_reason          VARCHAR2(80)        NULL
)
;

COMMENT ON TABLE session_status_histories
    IS 'Created from Entity SESSION_STATUS_HISTORY by CASE on 03-MAR-95';

REM
REM     Created from Entity STREAM by CASE on 03-MAR-95
REM
PROMPT
PROMPT Creating Table STREAMS
CREATE TABLE streams(
  id                     NUMBER(9,0)         NOT NULL,
  creation_datetime      DATE                NOT NULL,
  object_reference       VARCHAR2(120)       NOT NULL,
  logical_content_id     NUMBER(9,0)         NOT NULL,
  logical_content_or     VARCHAR2(120)       NOT NULL,
  session_id             NUMBER(9,0)         NOT NULL,
  session_or             VARCHAR2(120)       NOT NULL,
  stream_state           VARCHAR2(10)        NULL
)
;

COMMENT ON TABLE streams
    IS 'Created from Entity STREAM by CASE on 03-MAR-95';

REM
REM     Created from Entity SYSTEM EVENT by CASE on 03-MAR-95
REM
PROMPT
PROMPT Creating Table SYSTEM_EVENTS
CREATE TABLE system_events(
  id                     NUMBER(9,0)         NOT NULL,
  creation_datetime      DATE                NOT NULL,
  system_event_type_id   NUMBER(9,0)         NOT NULL,
  system_event_type_or   VARCHAR2(120)       NOT NULL,
  order_id               NUMBER(9,0)         NULL,
  order_or               VARCHAR2(120)       NULL,
  product_id             NUMBER(9,0)         NULL,
  product_or             VARCHAR2(120)       NULL,
  service_id             NUMBER(9,0)         NULL,
  service_or             VARCHAR2(120)       NULL,
  session_id             NUMBER(9,0)         NULL,
  session_or             VARCHAR2(120)       NULL,
  stream_id              NUMBER(9,0)         NULL,
  stream_or              VARCHAR2(120)       NULL,
  user_id                NUMBER(9,0)         NULL,
  user_or                VARCHAR2(120)       NULL,
  server_name            VARCHAR2(40)        NULL,
```

```
  timestamp                       DATE                            NULL
)
;

COMMENT ON TABLE system_events
    IS 'Created from Entity SYSTEM EVENT by CASE on 03-MAR-95';

REM
REM     Created from Entity SYSTEM EVENT TYPE by CASE on 03-MAR-95
REM
PROMPT
PROMPT Creating Table SYSTEM_EVENT_TYPES
CREATE TABLE system_event_types(
  id                              NUMBER(9,0)                     NOT NULL,
  creation_datetime               DATE                            NOT NULL,
  object_reference                VARCHAR2(120)                   NOT NULL,
  name                            VARCHAR2(80)                    NOT NULL,
  description                     VARCHAR2(255)                   NULL
)
;

COMMENT ON TABLE system_event_types
    IS 'Created from Entity SYSTEM EVENT TYPE by CASE on 03-MAR-95';

REM
REM     Created from Entity SYSTEM MESSAGE by CASE on 03-MAR-95
REM
PROMPT
PROMPT Creating Table SYSTEM_MESSAGES
CREATE TABLE system_messages(
  id                              NUMBER(9,0)                     NOT NULL,
  creation_date                   DATE                            NOT NULL,
  object_reference                VARCHAR2(120)                   NOT NULL,
  service_id                      NUMBER(9,0)                     NOT NULL,
  service_or                      VARCHAR2(120)                   NOT NULL,
  begin_date                      DATE                            NOT NULL,
  end_date                        DATE                            NULL,
  message                         VARCHAR2(255)                   NULL
)
;

COMMENT ON TABLE system_messages
    IS 'Created from Entity SYSTEM MESSAGE by CASE on 03-MAR-95';

REM
REM     Created from Entity USER by CASE on 03-MAR-95
REM
PROMPT
PROMPT Creating Table USERS
CREATE TABLE users(
  id                              NUMBER(9,0)                     NOT NULL,
  creation_datetime               DATE                            NOT NULL,
  object_reference                VARCHAR2(120)                   NOT NULL,
  account_id                      NUMBER(9,0)                     NOT NULL,
  account_or                      VARCHAR2(120)                   NOT NULL,
  login_name                      VARCHAR2(40)                    NOT NULL,
  role                            VARCHAR2(20)                    NOT NULL,
  first_name                      VARCHAR2(40)                    NULL,
  last_name                       VARCHAR2(40)                    NULL,
  middle_name                     VARCHAR2(40)                    NULL,
  password                        VARCHAR2(10)                    NULL,
  title                           VARCHAR2(10)                    NULL
)
;

COMMENT ON TABLE users
```

```
        IS 'Created from  tity USER by CASE o  03-M/  95';
REM
REM     Created from Entity USER PREFERENCE by CASE on 03-MAR-95
REM
PROMPT
PROMPT Creating Table USER_PREFERENCES
CREATE TABLE user_preferences(
  id                    NUMBER(9,0)             NOT NULL,
  creation_datetime     DATE                    NOT NULL,
  user_id               NUMBER(9,0)             NOT NULL,
  user_or               VARCHAR2(120)           NOT NULL,
  preference_id         NUMBER(9,0)             NOT NULL,
  preference_or         VARCHAR2(120)           NOT NULL,
  value                 VARCHAR2(80)            NOT NULL
)
;

COMMENT ON TABLE user_preferences
    IS 'Created from Entity USER PREFERENCE by CASE on 03-MAR-95';

REM
REM     Created from Entity USER RESTRICTION by CASE on 03-MAR-95
REM
PROMPT
PROMPT Creating Table USER_RESTRICTIONS
CREATE TABLE user_restrictions(
  id                    NUMBER(9,0)             NOT NULL,
  creation_datetime     DATE                    NOT NULL,
  user_id               NUMBER(9,0)             NOT NULL,
  user_or               VARCHAR2(120)           NOT NULL,
  restriction_type      VARCHAR2(10)            NOT NULL,
  object_type           VARCHAR2(10)            NOT NULL,
  object_id             NUMBER(9,0)             NOT NULL,
  object_or             VARCHAR2(120)           NOT NULL,
  begin_time            VARCHAR2(5)             NULL,
  display_flag          VARCHAR2(1)             NOT NULL,
  service_id            NUMBER(9)               NOT NULL,
  service_or            VARCHAR2(120)           NOT NULL,
  create_user_id        NUMBER(9)               NOT NULL,
  create_user_or        VARCHAR2(120)           NOT NULL,
  budget_amount         NUMBER(6,2)             NULL,
  budget_used           NUMBER(6,2)             NULL,
  end_time              VARCHAR2(5)             NULL
)
;

COMMENT ON TABLE user_restrictions
    IS 'Created from Entity USER RESTRICTION by CASE on 03-MAR-95';

REM
REM     Created from Entity USER STATISTIC by CASE on 03-MAR-95
REM
PROMPT
PROMPT Creating Table USER_STATISTICS
CREATE TABLE user_statistics(
  id                    NUMBER(9,0)             NOT NULL,
  creation_date         DATE                    NOT NULL,
  object_reference      VARCHAR2(120)           NOT NULL,
  user_id               NUMBER(9,0)             NOT NULL,
  user_or               VARCHAR2(120)           NOT NULL,
  login_count           NUMBER(9,0)             NULL,
  total_login_time      NUMBER(9,0)             NULL
)
;
```

COMMENT ON TABLE user_statistics
    IS 'Created from Entity USER STATISTIC by CASE on 03-MAR-95';

REM
REM     Created from Entity VALID PRODUCT DESCRIPTOR SET by CASE on 03-MAR-95
REM
PROMPT
PROMPT Creating Table VALID_PRODUCT_DESCRIPTOR_SETS
CREATE TABLE valid_product_descriptor_sets(
  id                      NUMBER(9,0)         NOT NULL,
  creation_datetime       DATE                NOT NULL,
  descriptor_set_id       NUMBER(9,0)         NOT NULL,
  descriptor_set_or       VARCHAR2(120)       NOT NULL,
  product_category_id     NUMBER(9,0)         NOT NULL,
  product_category_or     VARCHAR2(120)       NOT NULL
)
;

COMMENT ON TABLE valid_product_descriptor_sets
    IS 'Created from Entity VALID PRODUCT DESCRIPTOR SET by CASE on 03-MAR-95';

REM
REM     Created from Entity VALID PRODUCT FEATURE SET by CASE on 03-MAR-95
REM
PROMPT
PROMPT Creating Table VALID_PRODUCT_FEATURE_SETS
CREATE TABLE valid_product_feature_sets(
  id                      NUMBER(9,0)         NOT NULL,
  creation_datetime       DATE                NOT NULL,
  product_id              NUMBER(9,0)         NOT NULL,
  product_or              VARCHAR2(120)       NOT NULL,
  feature_set_id          NUMBER(9,0)         NOT NULL,
  feature_set_or          VARCHAR2(120)       NOT NULL
)
;

COMMENT ON TABLE valid_product_feature_sets
    IS 'Created from Entity VALID PRODUCT FEATURE SET by CASE on 03-MAR-95';

REM
REM     Created from Entity DELIVERY ITEM by CASE on 03-MAR-95
REM
PROMPT
PROMPT Creating Table VIDEO_PRODUCT_DELIVERIES
CREATE TABLE video_product_deliveries(
  id                      NUMBER(9,0)         NOT NULL,
  creation_datetime       DATE                NOT NULL,
  object_reference        VARCHAR2(120)       NOT NULL,
  order_item_id           NUMBER(9,0)         NOT NULL,
  order_item_or           VARCHAR2(120)       NOT NULL,
  delivery_start_datetime DATE                NOT NULL,
  delivery_end_datetime   DATE                NULL,
  product_item_id         NUMBER(9,0)         NULL,
  product_item_or         VARCHAR2(120)       NULL,
  stop_event              VARCHAR2(10)        NULL,
  stop_stream_position    VARCHAR2(8)         NULL,
  stop_stream_seq         NUMBER(9,0)         NULL,
  stream_id               NUMBER(9)           NULL,
  stream_or               VARCHAR2(120)       NULL
)
;

COMMENT ON TABLE video_product_deliveries
    IS 'Created from Entity DELIVERY ITEM by CASE on 03-MAR-95';

```
REM
REM This ORACLE V7 RDL   command file was generat   by CASE Dictionary
REM                       on   17-APR-95
REM
REM For application SDK version 1 database SDK
REM
REM CONSTRAINT PROMPT Adding PRIMARY Constraint To ACCOUNTS Table ALTER TABLE ACCOUNTS ADD (
      CONSTRAINT ACCOUNTS_PK
      PRIMARY KEY (ID)
USING INDEX
PCTFREE  10
)
/

PROMPT Adding PRIMARY Constraint To ACCOUNT_ADDRESSES Table

ALTER TABLE ACCOUNT_ADDRESSES ADD (
      CONSTRAINT ACCOUNT_ADDRESSES_PK
      PRIMARY KEY (ID)
USING INDEX
PCTFREE  10
)
/

PROMPT Adding PRIMARY Constraint To ACCOUNT_CLIENT_DEVICES Table

ALTER TABLE ACCOUNT_CLIENT_DEVICES ADD (
      CONSTRAINT ACCT_CLIENT_DEVICES_PK
      PRIMARY KEY (ID)
USING INDEX
PCTFREE  10
)
/

PROMPT Adding PRIMARY Constraint To ACCOUNT_PAYMENT_DEVICES Table

ALTER TABLE ACCOUNT_PAYMENT_DEVICES ADD (
      CONSTRAINT ACCT_PMT_DEVICES_PK
      PRIMARY KEY (ID)
USING INDEX
PCTFREE  10
)
/

PROMPT Adding PRIMARY Constraint To ACCOUNT_PREFERENCES Table

ALTER TABLE ACCOUNT_PREFERENCES ADD (
      CONSTRAINT ACCOUNT_PREFERENCES_PK
      PRIMARY KEY (ID)
USING INDEX
PCTFREE  10
)
/

PROMPT Adding PRIMARY Constraint To ACCOUNT_RESTRICTIONS Table

ALTER TABLE ACCOUNT_RESTRICTIONS ADD (
      CONSTRAINT ACCT_RESTRICTIONS_PK
      PRIMARY KEY (ID)
USING INDEX
PCTFREE  10
)
```

```
PROMPT Adding PRIMARY Constraint To ACCOUNT_STATISTICS Table

ALTER TABLE ACCOUNT_STATISTICS ADD (
      CONSTRAINT ACCOUNT_STATISTICS_PK
      PRIMARY KEY (ID)
USING INDEX
PCTFREE  10
)
/

PROMPT Adding PRIMARY Constraint To CLIENT_DEVICE_MODELS Table

ALTER TABLE CLIENT_DEVICE_MODELS ADD (
      CONSTRAINT CLIENT_DVC_MODELS_PK
      PRIMARY KEY (ID)
USING INDEX
PCTFREE  10
)
/

PROMPT Adding PRIMARY Constraint To CONTENT Table

ALTER TABLE CONTENT ADD (
      CONSTRAINT CONTENT_PK
      PRIMARY KEY (ID)
USING INDEX
PCTFREE  10
)
/

PROMPT Adding PRIMARY Constraint To CONTENT_LISTS Table

ALTER TABLE CONTENT_LISTS ADD (
      CONSTRAINT CONTENT_LISTS_PK
      PRIMARY KEY (ID)
USING INDEX
PCTFREE  10
)
/

PROMPT Adding PRIMARY Constraint To CONTENT_PROVIDERS Table

ALTER TABLE CONTENT_PROVIDERS ADD (
      CONSTRAINT CONTENT_PROVIDERS_PK
      PRIMARY KEY (ID)
USING INDEX
PCTFREE  10
)
/

PROMPT Adding PRIMARY Constraint To DELIVERIES Table

ALTER TABLE DELIVERIES ADD (
      CONSTRAINT DELIVERIES_PK
      PRIMARY KEY (ID)
USING INDEX
PCTFREE  10
)
/

PROMPT Adding PRIMARY Constraint To DESCRIPTOR_SETS Table

ALTER TABLE DESCRIPTOR_SETS ADD (
      CONSTRAINT DESCRIPTOR_SETS_PK
```

```
      PRIMARY KEY (ID)
USING INDEX
PCTFREE  10
)
/

PROMPT Adding PRIMARY Constraint To DESCRIPTOR_VALUES Table

ALTER TABLE DESCRIPTOR_VALUES ADD (
      CONSTRAINT DESCRIPTOR_VALUES_PK
      PRIMARY KEY (ID)
USING INDEX
PCTFREE  10
)
/

PROMPT Adding PRIMARY Constraint To FEATURE_SETS Table

ALTER TABLE FEATURE_SETS ADD (
      CONSTRAINT FEATURE_SETS_PK
      PRIMARY KEY (ID)
USING INDEX
PCTFREE  10
)
/

PROMPT Adding PRIMARY Constraint To FEATURE_VALUES Table

ALTER TABLE FEATURE_VALUES ADD (
      CONSTRAINT FEATURE_VALUES_PK
      PRIMARY KEY (ID)
USING INDEX
PCTFREE  10
)
/

PROMPT Adding PRIMARY Constraint To INHERITANCE_MAP Table

ALTER TABLE INHERITANCE_MAP ADD (
      CONSTRAINT INHERITANCE_MAP_PK
      PRIMARY KEY (INTERFACE_NAME,
                   OBJECT_ID,
                   PARENT_INTERFACE_NAME)
USING INDEX
PCTFREE  10
)
/

PROMPT Adding PRIMARY Constraint To LOGICAL_CONTENT Table

ALTER TABLE LOGICAL_CONTENT ADD (
      CONSTRAINT LOGICAL_CONTENT
      PRIMARY KEY (ID)
USING INDEX
PCTFREE  10
)
/

PROMPT Adding PRIMARY Constraint To MARKETING_EVENTS Table

ALTER TABLE MARKETING_EVENTS ADD (
      CONSTRAINT MARKETING_EVENTS_PK
      PRIMARY KEY (ID)
USING INDEX
PCTFREE  10
)
```

```
PROMPT Adding PRIMARY Constraint To MARKETING_EVENT_TYPES Table

ALTER TABLE MARKETING_EVENT_TYPES ADD (
      CONSTRAINT MARKETING_EVENT_TYPES_PK
      PRIMARY KEY (ID)
USING INDEX
PCTFREE  10
)
/
PROMPT Adding PRIMARY Constraint To MKT_EVENT_ASSIGNMENTS Table ALTER TABLE MKT_EVENT_ASSIGNMENTS ADD (
      CONSTRAINT MKT_EVENT_ASSIGNMENTS_PK
      PRIMARY KEY (ID)
USING INDEX
PCTFREE  10
)
/
PROMPT Adding PRIMARY Constraint To OBJECT_REFERENCE_DEFS Table ALTER TABLE OBJECT_REFERENCE_DEFS ADD (
      CONSTRAINT OBJECT_REFERENCE_DEFS_PK
      PRIMARY KEY (TABLE_NAME)
USING INDEX
PCTFREE  10
)
/
PROMPT Adding PRIMARY Constraint To ORDERS Table ALTER TABLE ORDERS ADD (
      CONSTRAINT ORDERS_PK
      PRIMARY KEY (ID)
USING INDEX
PCTFREE  10
)
/
PROMPT Adding PRIMARY Constraint To ORDER_ITEMS Table ALTER TABLE ORDER_ITEMS ADD (
      CONSTRAINT ORDER_ITEMS_PK
      PRIMARY KEY (ID)
USING INDEX
PCTFREE  10
)
/
PROMPT Adding PRIMARY Constraint To PREFERENCES Table ALTER TABLE PREFERENCES ADD (
      CONSTRAINT PREFERENCES_PK
      PRIMARY KEY (ID)
USING INDEX
PCTFREE  10
)
/
PROMPT Adding PRIMARY Constraint To PRICE_LISTS Table

ALTER TABLE PRICE_LISTS ADD (
      CONSTRAINT PRICE_LISTS_PK
```

```
        PRIMARY KEY (ID)
USING INDEX
PCTFREE  10
)
/
PROMPT Adding PRIMARY Constraint To PRICE_LIST_ACCOUNTS Table ALTER TABLE PRICE_LIST_ACCOUNTS ADD (
       CONSTRAINT PRICE_LIST_ACCOUNTS_PK
       PRIMARY KEY (ID)
USING INDEX
PCTFREE  10
)
/

PROMPT Adding PRIMARY Constraint To PRODUCTS Table

ALTER TABLE PRODUCTS ADD (
       CONSTRAINT PRODUCTS_PK
       PRIMARY KEY (ID)
USING INDEX
PCTFREE  10
)
/

PROMPT Adding PRIMARY Constraint To PRODUCT_CATEGORIES Table

ALTER TABLE PRODUCT_CATEGORIES ADD (
       CONSTRAINT PRODUCT_CATEGORIES_PK
       PRIMARY KEY (ID)
USING INDEX
PCTFREE  10
)
/

PROMPT Adding PRIMARY Constraint To PRODUCT_DESCRIPTOR_VALUES Table

ALTER TABLE PRODUCT_DESCRIPTOR_VALUES ADD (
       CONSTRAINT PRDCT_DSCRPTR_VAL_PK
       PRIMARY KEY (ID)
USING INDEX
PCTFREE  10
)
/

PROMPT Adding PRIMARY Constraint To PRODUCT_ITEMS Table

ALTER TABLE PRODUCT_ITEMS ADD (
       CONSTRAINT PRODUCT_ITEMS_PK
       PRIMARY KEY (ID)
USING INDEX
PCTFREE  10
)
/

PROMPT Adding PRIMARY Constraint To PRODUCT_ITEM_FTR_VALUES Table

ALTER TABLE PRODUCT_ITEM_FTR_VALUES ADD (
       CONSTRAINT PRDCT_ITM_FTR_VAL_PK
       PRIMARY KEY (ID)
USING INDEX
PCTFREE  10
)
/
```

```
PROMPT Adding PRIMARY Constraint To PRODUCT_ITEM_LCONTENT Table

ALTER TABLE PRODUCT_ITEM_LCONTENT ADD (
      CONSTRAINT PROD_ITEM_LCONTENT_PK
      PRIMARY KEY (PRODUCT_ITEM_ID,
                   LOGICAL_CONTENT_ID)
USING INDEX
PCTFREE  10
)
/

PROMPT Adding PRIMARY Constraint To PRODUCT_ITEM_PRICE_LISTS Table

ALTER TABLE PRODUCT_ITEM_PRICE_LISTS ADD (
      CONSTRAINT PRDCT_ITM_PRC_LST_PK
      PRIMARY KEY (ID)
USING INDEX
PCTFREE  10
)
/

PROMPT Adding PRIMARY Constraint To PRODUCT_LCONTENT Table

ALTER TABLE PRODUCT_LCONTENT ADD (
      CONSTRAINT PRODUCT_LCONENT_PK
      PRIMARY KEY (PRODUCT_ID,
                   LOGICAL_CONTENT_ID)
USING INDEX
PCTFREE  10
)
/

PROMPT Adding PRIMARY Constraint To PRODUCT_PRICE_LISTS Table

ALTER TABLE PRODUCT_PRICE_LISTS ADD (
      CONSTRAINT PRODUCT_PRICE_LISTS_PK
      PRIMARY KEY (ID)
USING INDEX
PCTFREE  10
)
/

PROMPT Adding PRIMARY Constraint To SERVICES Table

ALTER TABLE SERVICES ADD (
      CONSTRAINT SERVICES_PK
      PRIMARY KEY (ID)
USING INDEX
PCTFREE  10
)
/

PROMPT Adding PRIMARY Constraint To SERVICE_AGENTS Table

ALTER TABLE SERVICE_AGENTS ADD (
      CONSTRAINT SERVICE_AGENT_PK
      PRIMARY KEY (ID)
USING INDEX
PCTFREE  10
)
/

PROMPT Adding PRIMARY Constraint To SERVICE_AGENT_STATES Table

ALTER TABLE SERVICE_AGENT_STATES ADD (
      CONSTRAINT SERVICE_AGENT_STATES_PK
```

```
        PRIMARY KEY (SERVICE_AGENT_ID)
USING INDEX
PCTFREE  10
)
/

PROMPT Adding PRIMARY Constraint To SERVICE_AGENT_STATISTICS Table

ALTER TABLE SERVICE_AGENT_STATISTICS ADD (
      CONSTRAINT SERVICE_AGT_STATS_PK
      PRIMARY KEY (ID)
USING INDEX
PCTFREE  10
)
/

PROMPT Adding PRIMARY Constraint To SERVICE_AGENT_STATUS_HISTORIES Table

ALTER TABLE SERVICE_AGENT_STATUS_HISTORIES ADD (
      CONSTRAINT SVC_AGENT_STATUS_HISTORY_PK
      PRIMARY KEY (ID)
USING INDEX
PCTFREE  10
)
/

PROMPT Adding PRIMARY Constraint To SERVICE_AVAILABILITIES Table

ALTER TABLE SERVICE_AVAILABILITIES ADD (
      CONSTRAINT SERVICE_AVAIL_PK
      PRIMARY KEY (ID)
USING INDEX
PCTFREE  10
)
/

PROMPT Adding PRIMARY Constraint To SERVICE_PAYMENT_DEVICES Table

ALTER TABLE SERVICE_PAYMENT_DEVICES ADD (
      CONSTRAINT SERVICE_PAYMENT_DVC_PK
      PRIMARY KEY (ID)
USING INDEX
PCTFREE  10
)
/

PROMPT Adding PRIMARY Constraint To SERVICE_STATISTICS Table

ALTER TABLE SERVICE_STATISTICS ADD (
      CONSTRAINT SERVICE_STATISTICS_PK
      PRIMARY KEY (ID)
USING INDEX
PCTFREE  10
)
/

PROMPT Adding PRIMARY Constraint To SERVICE_SUBSCRIPTIONS Table

ALTER TABLE SERVICE_SUBSCRIPTIONS ADD (
      CONSTRAINT SVC_SUBSCRIPTIONS_PK
      PRIMARY KEY (ID)
USING INDEX
PCTFREE  10
)
/
```

```
PROMPT Adding PRIMARY Constraint To SESSIONS Table

ALTER TABLE SESSIONS ADD (
      CONSTRAINT SESSIONS_PK
      PRIMARY KEY (ID)
USING INDEX
PCTFREE  10
)
/

PROMPT Adding PRIMARY Constraint To SESSION_STATISTICS Table

ALTER TABLE SESSION_STATISTICS ADD (
      CONSTRAINT SESSION_STATISTICS_PK
      PRIMARY KEY (ID)
USING INDEX
PCTFREE  10
)
/

PROMPT Adding PRIMARY Constraint To SESSION_STATUS_HISTORIES Table

ALTER TABLE SESSION_STATUS_HISTORIES ADD (
      CONSTRAINT SESSION_STATUS_HISTORIES_PK
      PRIMARY KEY (ID)
USING INDEX
PCTFREE  10
)
/

PROMPT Adding PRIMARY Constraint To STREAMS Table

ALTER TABLE STREAMS ADD (
      CONSTRAINT STREAMS_PK
      PRIMARY KEY (ID)
USING INDEX
PCTFREE  10
)
/

PROMPT Adding PRIMARY Constraint To SYSTEM_EVENTS Table

ALTER TABLE SYSTEM_EVENTS ADD (
      CONSTRAINT SYSTEM_EVENTS_PK
      PRIMARY KEY (ID)
USING INDEX
PCTFREE  10
)
/

PROMPT Adding PRIMARY Constraint To SYSTEM_EVENT_TYPES Table

ALTER TABLE SYSTEM_EVENT_TYPES ADD (
      CONSTRAINT SYSTEM_EVENT_TYPES_PK
      PRIMARY KEY (ID)
USING INDEX
PCTFREE  10
)
/

PROMPT Adding PRIMARY Constraint To SYSTEM_MESSAGES Table

ALTER TABLE SYSTEM_MESSAGES ADD (
      CONSTRAINT SYSTEM_MESSAGES_PK
      PRIMARY KEY (ID)
USING INDEX
```

```
PCTFREE  10
)
/

PROMPT Adding PRIMARY Constraint To USERS Table

ALTER TABLE USERS ADD (
      CONSTRAINT USERS_PK
      PRIMARY KEY (ID)
USING INDEX
PCTFREE  10
)
/

PROMPT Adding PRIMARY Constraint To USER_PREFERENCES Table

ALTER TABLE USER_PREFERENCES ADD (
      CONSTRAINT USER_PREFERENCES_PK
      PRIMARY KEY (ID)
USING INDEX
PCTFREE  10
)
/

PROMPT Adding PRIMARY Constraint To USER_RESTRICTIONS Table

ALTER TABLE USER_RESTRICTIONS ADD (
      CONSTRAINT USER_RESTRICTIONS_PK
      PRIMARY KEY (ID)
USING INDEX
PCTFREE  10
)
/

PROMPT Adding PRIMARY Constraint To USER_STATISTICS Table

ALTER TABLE USER_STATISTICS ADD (
      CONSTRAINT USER_STATISTICS_PK
      PRIMARY KEY (ID)
USING INDEX
PCTFREE  10
)
/

PROMPT Adding PRIMARY Constraint To VALID_PRODUCT_DESCRIPTOR_SETS Table

ALTER TABLE VALID_PRODUCT_DESCRIPTOR_SETS ADD (
      CONSTRAINT VAL_PRDCT_DSC_SET_PK
      PRIMARY KEY (ID)
USING INDEX
PCTFREE  10
)
/

PROMPT Adding PRIMARY Constraint To VALID_PRODUCT_FEATURE_SETS Table

ALTER TABLE VALID_PRODUCT_FEATURE_SETS ADD (
      CONSTRAINT VAL_PROD_FTR_SETS_PK
      PRIMARY KEY (ID)
USING INDEX
PCTFREE  10
)
/

PROMPT Adding PRIMARY Constraint To VIDEO_PRODUCT_DELIVERIES Table
```

```
ALTER TABLE VIDEO_PROD  CT_DELIVERIES ADD (
      CONSTRAINT VPROD  CT_DELIVERIES_PK
      PRIMARY KEY (ID)
USING INDEX
PCTFREE  10
)
/

PROMPT Adding UNIQUE Constraint To ACCOUNTS Table

ALTER TABLE ACCOUNTS ADD (
      CONSTRAINT ACCOUNTS_UK
      UNIQUE     (ACCOUNT_NUMBER)
USING INDEX
PCTFREE  10
)
/

PROMPT Adding UNIQUE Constraint To ACCOUNT_ADDRESSES Table

ALTER TABLE ACCOUNT_ADDRESSES ADD (
      CONSTRAINT ACCOUNT_ADDRESSES_UK
      UNIQUE     (ACCOUNT_ID,
                  ADDRESS1,
                  ADDRESS2)
USING INDEX
PCTFREE  10
)
/

PROMPT Adding UNIQUE Constraint To ACCOUNT_CLIENT_DEVICES Table

ALTER TABLE ACCOUNT_CLIENT_DEVICES ADD (
      CONSTRAINT ACCT_CLIENT_DEVICES_UK
      UNIQUE     (ACCOUNT_ID,
                  CLIENT_DEVICE_MODEL_ID)
USING INDEX
PCTFREE  10
)
/

PROMPT Adding UNIQUE Constraint To ACCOUNT_CLIENT_DEVICES Table

ALTER TABLE ACCOUNT_CLIENT_DEVICES ADD (
      CONSTRAINT ACCOUNT_CLIENT_DEVICES_UK2
      UNIQUE     (PHYSICAL_NETWORK_ADDRESS)
USING INDEX
PCTFREE  10
)
/

PROMPT Adding UNIQUE Constraint To ACCOUNT_PAYMENT_DEVICES Table

ALTER TABLE ACCOUNT_PAYMENT_DEVICES ADD (
      CONSTRAINT ACCT_PMT_DEVICES_UK
      UNIQUE     (ACCOUNT_ID,
                  PAYMENT_DEVICE_TYPE,
                  CARD_ACCT_NUMBER)
USING INDEX
PCTFREE  10
)
/

PROMPT Adding UNIQUE Constraint To ACCOUNT_PREFERENCES Table

ALTER TABLE ACCOUNT_PREFERENCES ADD (
```

```
        CONSTRAINT ACCOU__PREFERENCES_UK
        UNIQUE      (PREFERENCE_ID,
                    ACCOUNT_ID)
USING INDEX
PCTFREE  10
)
/

PROMPT Adding UNIQUE Constraint To ACCOUNT_RESTRICTIONS Table

ALTER TABLE ACCOUNT_RESTRICTIONS ADD (
        CONSTRAINT ACCT_RESTRICTIONS_UK
        UNIQUE      (ACCOUNT_ID,
                    RESTRICTION_TYPE,
                    OBJECT_TYPE,
                    OBJECT_ID,
                    BEGIN_TIME)
USING INDEX
PCTFREE  10
)
/

PROMPT Adding UNIQUE Constraint To CLIENT_DEVICE_MODELS Table

ALTER TABLE CLIENT_DEVICE_MODELS ADD (
        CONSTRAINT CLIENT_DVC_MODELS_UK
        UNIQUE      (MANUFACTURER,
                    MODEL_NAME,
                    MODEL_NUMBER)
USING INDEX
PCTFREE  10
)
/

PROMPT Adding UNIQUE Constraint To CONTENT Table

ALTER TABLE CONTENT ADD (
        CONSTRAINT CONTENT_UK
        UNIQUE      (NAME)
USING INDEX
PCTFREE  10
)
/

PROMPT Adding UNIQUE Constraint To CONTENT_LISTS Table

ALTER TABLE CONTENT_LISTS ADD (
        CONSTRAINT CONTENT_LISTS_UK
        UNIQUE      (LOGICAL_CONTENT_ID,
                    CONTENT_ID)
USING INDEX
PCTFREE  10
)
/

PROMPT Adding UNIQUE Constraint To CONTENT_PROVIDERS Table

ALTER TABLE CONTENT_PROVIDERS ADD (
        CONSTRAINT CONTENT_PROVIDERS_UK
        UNIQUE      (NAME)
USING INDEX
PCTFREE  10
)
/

PROMPT Adding UNIQUE Constraint To DESCRIPTOR_SETS Table
```

```
ALTER TABLE DESCRIPTOR_SETS ADD (
      CONSTRAINT DESCRIPTOR_SETS_UK
      UNIQUE     (NAME)
USING INDEX
PCTFREE  10
)
/

PROMPT Adding UNIQUE Constraint To DESCRIPTOR_VALUES Table

ALTER TABLE DESCRIPTOR_VALUES ADD (
      CONSTRAINT DESCRIPTOR_VALUES_UK
      UNIQUE     (DESCRIPTOR_SET_ID,
                  VALUE)
USING INDEX
PCTFREE  10
)
/

PROMPT Adding UNIQUE Constraint To FEATURE_SETS Table

ALTER TABLE FEATURE_SETS ADD (
      CONSTRAINT FEATURE_SETS_UK
      UNIQUE     (NAME)
USING INDEX
PCTFREE  10
)
/

PROMPT Adding UNIQUE Constraint To FEATURE_VALUES Table

ALTER TABLE FEATURE_VALUES ADD (
      CONSTRAINT FEATURE_VALUES_UK
      UNIQUE     (FEATURE_SET_ID,
                  VALUE)
USING INDEX
PCTFREE  10
)
/

PROMPT Adding UNIQUE Constraint To LOGICAL_CONTENT Table

ALTER TABLE LOGICAL_CONTENT ADD (
      CONSTRAINT LOGICAL_CONTENT_UK
      UNIQUE     (NAME)
USING INDEX
PCTFREE  10
)
/

PROMPT Adding UNIQUE Constraint To MARKETING_EVENT_TYPES Table

ALTER TABLE MARKETING_EVENT_TYPES ADD (
      CONSTRAINT MARKETING_EVENT_TYPES_UK
      UNIQUE     (SERVICE_ID,
                  NAME)
USING INDEX
PCTFREE  10
)
/

PROMPT Adding UNIQUE Constraint To MKT_EVENT_ASSIGNMENTS Table

ALTER TABLE MKT_EVENT_ASSIGNMENTS ADD (
      CONSTRAINT MKT_EVENT_ASSIGNMENTS_UK
```

```
        UNIQUE      (MARKETING_EVENT_TYPE_ID,
                    USER_ID)
USING INDEX
PCTFREE  10
)
/

PROMPT Adding UNIQUE Constraint To ORDER_ITEMS Table

ALTER TABLE ORDER_ITEMS ADD (
      CONSTRAINT ORDER_ITEMS_UK
      UNIQUE      (ORDER_ID,
                   ITEM_SEQUENCE)
USING INDEX
PCTFREE  10
)
/

PROMPT Adding UNIQUE Constraint To PREFERENCES Table

ALTER TABLE PREFERENCES ADD (
      CONSTRAINT PREFERENCES_UK
      UNIQUE      (SERVICE_ID,
                   NAME)
USING INDEX
PCTFREE  10
)
/

PROMPT Adding UNIQUE Constraint To PRICE_LISTS Table

ALTER TABLE PRICE_LISTS ADD (
      CONSTRAINT PRICE_LISTS_UK
      UNIQUE      (SERVICE_ID,
                   NAME)
USING INDEX
PCTFREE  10
)
/

PROMPT Adding UNIQUE Constraint To PRICE_LIST_ACCOUNTS Table

ALTER TABLE PRICE_LIST_ACCOUNTS ADD (
      CONSTRAINT PRICE_LIST_ACCOUNTS_UK
      UNIQUE      (PRICE_LIST_ID,
                   ACCOUNT_ID)
USING INDEX
PCTFREE  10
)
/

PROMPT Adding UNIQUE Constraint To PRODUCTS Table

ALTER TABLE PRODUCTS ADD (
      CONSTRAINT PRODUCTS_UK1
      UNIQUE      (SERVICE_ID,
                   NAME)
USING INDEX
PCTFREE  10
)
/

PROMPT Adding UNIQUE Constraint To PRODUCTS Table

ALTER TABLE PRODUCTS ADD (
      CONSTRAINT PRODUCTS_UK2
```

```
        UNIQUE     (SERVICE_ID,
                    CATALOG_NUMBER)
USING INDEX
PCTFREE  10
)
/

PROMPT Adding UNIQUE Constraint To PRODUCT_CATEGORIES Table

ALTER TABLE PRODUCT_CATEGORIES ADD (
      CONSTRAINT PRODUCT_CATEGORIES_UK
      UNIQUE     (NAME)
USING INDEX
PCTFREE  10
)
/

PROMPT Adding UNIQUE Constraint To PRODUCT_DESCRIPTOR_VALUES Table

ALTER TABLE PRODUCT_DESCRIPTOR_VALUES ADD (
      CONSTRAINT PRDCT_DSCRPTR_VAL_UK
      UNIQUE     (PRODUCT_ID,
                  DESCRIPTOR_VALUE_ID)
USING INDEX
PCTFREE  10
)
/

PROMPT Adding UNIQUE Constraint To PRODUCT_ITEMS Table

ALTER TABLE PRODUCT_ITEMS ADD (
      CONSTRAINT PRODUCT_ITEMS_UK
      UNIQUE     (NAME)
USING INDEX
PCTFREE  10
)
/

PROMPT Adding UNIQUE Constraint To PRODUCT_ITEM_FTR_VALUES Table

ALTER TABLE PRODUCT_ITEM_FTR_VALUES ADD (
      CONSTRAINT PRDCT_ITM_FTR_VAL_UK
      UNIQUE     (PRODUCT_ITEM_ID,
                  FEATURE_VALUE_ID)
USING INDEX
PCTFREE  10
)
/

PROMPT Adding UNIQUE Constraint To PRODUCT_ITEM_PRICE_LISTS Table

ALTER TABLE PRODUCT_ITEM_PRICE_LISTS ADD (
      CONSTRAINT PRDCT_ITM_PRC_LST_UK1
      UNIQUE     (PRODUCT_ITEM_ID,
                  PRICE_LIST_ID)
USING INDEX
PCTFREE  10
)
/

PROMPT Adding UNIQUE Constraint To PRODUCT_PRICE_LISTS Table

ALTER TABLE PRODUCT_PRICE_LISTS ADD (
      CONSTRAINT PRODUCT_PRICE_LISTS_UK
      UNIQUE     (PRODUCT_ID,
                  PRICE_LIST_ID)
```

```
USING INDEX
PCTFREE  10
)
/

PROMPT Adding UNIQUE Constraint To SERVICES Table

ALTER TABLE SERVICES ADD (
      CONSTRAINT SERVICES_UK
      UNIQUE      (NAME)
USING INDEX
PCTFREE  10
)
/

PROMPT Adding UNIQUE Constraint To SERVICE_AGENTS Table

ALTER TABLE SERVICE_AGENTS ADD (
      CONSTRAINT SERVICE_AGENTS_UK
      UNIQUE      (SERVICE_ID,
                  SESSION_ID)
USING INDEX
PCTFREE  10
)
/

PROMPT Adding UNIQUE Constraint To SERVICE_AVAILABILITIES Table

ALTER TABLE SERVICE_AVAILABILITIES ADD (
      CONSTRAINT SERVICE_AVAIL_UK1
      UNIQUE      (SERVICE_ID,
                  CLIENT_DEVICE_MODEL_ID)
USING INDEX
PCTFREE  10
)
/

PROMPT Adding UNIQUE Constraint To SERVICE_PAYMENT_DEVICES Table

ALTER TABLE SERVICE_PAYMENT_DEVICES ADD (
      CONSTRAINT SERVICE_PAYMENT_DVC_UK
      UNIQUE      (SERVICE_ID,
                  PAYMENT_DEVICE_TYPE)
USING INDEX
PCTFREE  10
)
/

PROMPT Adding UNIQUE Constraint To SERVICE_SUBSCRIPTIONS Table

ALTER TABLE SERVICE_SUBSCRIPTIONS ADD (
      CONSTRAINT SVC_SUBSCRIPTIONS_UK
      UNIQUE      (SERVICE_ID,
                  ACCOUNT_ID)
USING INDEX
PCTFREE  10
)
/

PROMPT Adding UNIQUE Constraint To SYSTEM_EVENT_TYPES Table

ALTER TABLE SYSTEM_EVENT_TYPES ADD (
      CONSTRAINT SYSTEM_EVENT_TYPES_UK
      UNIQUE      (NAME)
USING INDEX
PCTFREE  10
```

PROMPT Adding UNIQUE Constraint To SYSTEM_MESSAGES Table

```
ALTER TABLE SYSTEM_MESSAGES ADD (
      CONSTRAINT SYSTEM_MESSAGES_UK
      UNIQUE      (SERVICE_ID,
                   BEGIN_DATE)
USING INDEX
PCTFREE  10
)
/
```

PROMPT Adding UNIQUE Constraint To USERS Table

```
ALTER TABLE USERS ADD (
      CONSTRAINT USERS_UK
      UNIQUE      (ACCOUNT_ID,
                   LOGIN_NAME)
USING INDEX
PCTFREE  10
)
/
```

PROMPT Adding UNIQUE Constraint To USER_PREFERENCES Table

```
ALTER TABLE USER_PREFERENCES ADD (
      CONSTRAINT USER_PREFERENCES_UK
      UNIQUE      (USER_ID,
                   PREFERENCE_ID)
USING INDEX
PCTFREE  10
)
/
```

PROMPT Adding UNIQUE Constraint To USER_RESTRICTIONS Table

```
ALTER TABLE USER_RESTRICTIONS ADD (
      CONSTRAINT USER_RESTRICTIONS_UK1
      UNIQUE      (USER_ID,
                   RESTRICTION_TYPE,
                   OBJECT_TYPE,
                   OBJECT_ID,
                   BEGIN_TIME)
USING INDEX
PCTFREE  10
)
/
```

PROMPT Adding UNIQUE Constraint To VALID_PRODUCT_DESCRIPTOR_SETS Table

```
ALTER TABLE VALID_PRODUCT_DESCRIPTOR_SETS ADD (
      CONSTRAINT VAL_PRDCT_DSC_SET_UK1
      UNIQUE      (PRODUCT_CATEGORY_ID,
                   DESCRIPTOR_SET_ID)
USING INDEX
PCTFREE  10
)
/
```

PROMPT Adding UNIQUE Constraint To VALID_PRODUCT_FEATURE_SETS Table

```
ALTER TABLE VALID_PRODUCT_FEATURE_SETS ADD (
      CONSTRAINT VAL_PROD_FTR_SETS_UK
      UNIQUE      (PRODUCT_ID,
```

```
                    FEATURE_SET_ID)
USING INDEX
PCTFREE  10
)
/

PROMPT Adding UNIQUE Constraint To VIDEO_PRODUCT_DELIVERIES Table

ALTER TABLE VIDEO_PRODUCT_DELIVERIES ADD (
      CONSTRAINT VPRODUCT_DELIVERIES_UK
      UNIQUE      (ORDER_ITEM_ID,
                   DELIVERY_START_DATETIME)
USING INDEX
PCTFREE  10
)
/

PROMPT Adding FOREIGN Constraint To ACCOUNT_ADDRESSES Table

ALTER TABLE ACCOUNT_ADDRESSES ADD (
      CONSTRAINT ACCOUNT_ADDRESSES_FK1
      FOREIGN KEY (ACCOUNT_ID)
      REFERENCES  ACCOUNTS (
                  ID)
)
/

PROMPT Adding FOREIGN Constraint To ACCOUNT_CLIENT_DEVICES Table

ALTER TABLE ACCOUNT_CLIENT_DEVICES ADD (
      CONSTRAINT ACCT_CLIENT_DEVICES_FK1
      FOREIGN KEY (ACCOUNT_ID)
      REFERENCES  ACCOUNTS (
                  ID)
)
/

PROMPT Adding FOREIGN Constraint To ACCOUNT_CLIENT_DEVICES Table

ALTER TABLE ACCOUNT_CLIENT_DEVICES ADD (
      CONSTRAINT ACCT_CLIENT_DEVICES
      FOREIGN KEY (CLIENT_DEVICE_MODEL_ID)
      REFERENCES  CLIENT_DEVICE_MODELS (
                  ID)
)
/

PROMPT Adding FOREIGN Constraint To ACCOUNT_PAYMENT_DEVICES Table

ALTER TABLE ACCOUNT_PAYMENT_DEVICES ADD (
      CONSTRAINT ACCT_PMT_DEVICES_FK1
      FOREIGN KEY (ACCOUNT_ID)
      REFERENCES  ACCOUNTS (
                  ID)
)
/

PROMPT Adding FOREIGN Constraint To ACCOUNT_PREFERENCES Table

ALTER TABLE ACCOUNT_PREFERENCES ADD (
      CONSTRAINT ACCOUNT_PREFERENCES_FK1
      FOREIGN KEY (PREFERENCE_ID)
      REFERENCES  PREFERENCES (
                  ID)
)
/
```

```
PROMPT Adding FOREIGN Constraint To ACCOUNT_PREFERENCES Table

ALTER TABLE ACCOUNT_PREFERENCES ADD (
      CONSTRAINT ACCOUNT_PREFERENCES_FK2
      FOREIGN KEY (ACCOUNT_ID)
      REFERENCES  ACCOUNTS (
                  ID)
)
/

PROMPT Adding FOREIGN Constraint To ACCOUNT_RESTRICTIONS Table

ALTER TABLE ACCOUNT_RESTRICTIONS ADD (
      CONSTRAINT ACCT_RESTRICTIONS_FK1
      FOREIGN KEY (ACCOUNT_ID)
      REFERENCES  ACCOUNTS (
                  ID)
)
/

PROMPT Adding FOREIGN Constraint To ACCOUNT_RESTRICTIONS Table

ALTER TABLE ACCOUNT_RESTRICTIONS ADD (
      CONSTRAINT ACCOUNT_RESTRICTIONS_FK2
      FOREIGN KEY (SERVICE_ID)
      REFERENCES  SERVICES (
                  ID)
)
/

PROMPT Adding FOREIGN Constraint To ACCOUNT_RESTRICTIONS Table

ALTER TABLE ACCOUNT_RESTRICTIONS ADD (
      CONSTRAINT ACCOUNT_RESTRICTIONS_FK4
      FOREIGN KEY (CREATE_USER_ID)
      REFERENCES  USERS (
                  ID)
)
/

PROMPT Adding FOREIGN Constraint To ACCOUNT_STATISTICS Table

ALTER TABLE ACCOUNT_STATISTICS ADD (
      CONSTRAINT ACCOUNT_STATISTICS_FK1
      FOREIGN KEY (ACCOUNT_ID)
      REFERENCES  ACCOUNTS (
                  ID)
)
/

PROMPT Adding FOREIGN Constraint To CONTENT Table

ALTER TABLE CONTENT ADD (
      CONSTRAINT CONTENT_FK1
      FOREIGN KEY (CONTENT_PROVIDER_ID)
      REFERENCES  CONTENT_PROVIDERS (
                  ID)
)
/

PROMPT Adding FOREIGN Constraint To CONTENT_LISTS Table

ALTER TABLE CONTENT_LISTS ADD (
      CONSTRAINT CONTENT_LISTS_FK1
      FOREIGN KEY (LOGICAL_CONTENT_ID)
```

```
        REFERENCES   LOGICAL_CONTENT (
                ID)
)
/

PROMPT Adding FOREIGN Constraint To CONTENT_LISTS Table

ALTER TABLE CONTENT_LISTS ADD (
      CONSTRAINT CONTENT_LISTS_FK2
      FOREIGN KEY (CONTENT_ID)
      REFERENCES   CONTENT (
                ID)
)
/

PROMPT Adding FOREIGN Constraint To DESCRIPTOR_SETS Table

ALTER TABLE DESCRIPTOR_SETS ADD (
      CONSTRAINT DESCRIPTOR_SETS_FK1
      FOREIGN KEY (SERVICE_ID)
      REFERENCES   SERVICES (
                ID)
)
/

PROMPT Adding FOREIGN Constraint To DESCRIPTOR_VALUES Table

ALTER TABLE DESCRIPTOR_VALUES ADD (
      CONSTRAINT DESCRIPTOR_VALUES_FK1
      FOREIGN KEY (DESCRIPTOR_SET_ID)
      REFERENCES   DESCRIPTOR_SETS (
                ID)
)
/

PROMPT Adding FOREIGN Constraint To FEATURE_VALUES Table

ALTER TABLE FEATURE_VALUES ADD (
      CONSTRAINT FEATURE_VALUES_FK1
      FOREIGN KEY (FEATURE_SET_ID)
      REFERENCES   FEATURE_SETS (
                ID)
)
/

PROMPT Adding FOREIGN Constraint To MARKETING_EVENTS Table

ALTER TABLE MARKETING_EVENTS ADD (
      CONSTRAINT MARKETING_EVENTS_FK1
      FOREIGN KEY (MARKETING_EVENT_TYPE_ID)
      REFERENCES   MARKETING_EVENT_TYPES (
                ID)
)
/

PROMPT Adding FOREIGN Constraint To MARKETING_EVENTS Table

ALTER TABLE MARKETING_EVENTS ADD (
      CONSTRAINT MARKETING_EVENTS_FK2
      FOREIGN KEY (USER_ID)
      REFERENCES   USERS (
                ID)
)
/

PROMPT Adding FOREIGN Constraint To MARKETING_EVENT_TYPES Table
```

```
ALTER TABLE MARKETING_EVENT_TYPES ADD (
      CONSTRAINT MARKETING_EVENT_TYPES_FK1
      FOREIGN KEY (SERVICE_ID)
      REFERENCES  SERVICES (
                 ID)
)
/

PROMPT Adding FOREIGN Constraint To MARKETING_EVENT_TYPES Table

ALTER TABLE MARKETING_EVENT_TYPES ADD (
      CONSTRAINT MARKETING_EVENT_TYPES_FK2
      FOREIGN KEY (SYSTEM_EVENT_TYPE_ID)
      REFERENCES  SYSTEM_EVENT_TYPES (
                 ID)
)
/

PROMPT Adding FOREIGN Constraint To MKT_EVENT_ASSIGNMENTS Table

ALTER TABLE MKT_EVENT_ASSIGNMENTS ADD (
      CONSTRAINT MKT_EVENT_ASSIGNEMENTS_FK1
      FOREIGN KEY (USER_ID)
      REFERENCES  USERS (
                 ID)
)
/

PROMPT Adding FOREIGN Constraint To MKT_EVENT_ASSIGNMENTS Table

ALTER TABLE MKT_EVENT_ASSIGNMENTS ADD (
      CONSTRAINT MKT_EVENT_ASSIGNMENTS_FK2
      FOREIGN KEY (MARKETING_EVENT_TYPE_ID)
      REFERENCES  MARKETING_EVENT_TYPES (
                 ID)
)
/

PROMPT Adding FOREIGN Constraint To ORDERS Table

ALTER TABLE ORDERS ADD (
      CONSTRAINT ORDERS_FK1
      FOREIGN KEY (SESSION_ID)
      REFERENCES  SESSIONS (
                 ID)
)
/

PROMPT Adding FOREIGN Constraint To ORDERS Table

ALTER TABLE ORDERS ADD (
      CONSTRAINT ORDERS_FK2
      FOREIGN KEY (ACCOUNT_PAYMENT_DEVICE_ID)
      REFERENCES  ACCOUNT_PAYMENT_DEVICES (
                 ID)
)
/

PROMPT Adding FOREIGN Constraint To ORDERS Table

ALTER TABLE ORDERS ADD (
      CONSTRAINT ORDERS_FK3
      FOREIGN KEY (USER_ID)
      REFERENCES  USERS (
                 ID)
```

)
/

PROMPT Adding FOREIGN Constraint To ORDERS Table

ALTER TABLE ORDERS ADD (
      CONSTRAINT ORDERS_FK4
      FOREIGN KEY (SERVICE_ID)
      REFERENCES  SERVICES (
                  ID)
)
/

PROMPT Adding FOREIGN Constraint To ORDER_ITEMS Table

ALTER TABLE ORDER_ITEMS ADD (
      CONSTRAINT ORDER_ITEMS_FK1
      FOREIGN KEY (ORDER_ID)
      REFERENCES  ORDERS (
                  ID)
)
/

PROMPT Adding FOREIGN Constraint To ORDER_ITEMS Table

ALTER TABLE ORDER_ITEMS ADD (
      CONSTRAINT ORDER_ITEMS_FK2
      FOREIGN KEY (PRODUCT_ITEM_ID)
      REFERENCES  PRODUCT_ITEMS (
                  ID)
)
/

PROMPT Adding FOREIGN Constraint To PREFERENCES Table

ALTER TABLE PREFERENCES ADD (
      CONSTRAINT PREFERENCES_FK
      FOREIGN KEY (SERVICE_ID)
      REFERENCES  SERVICES (
                  ID)
)
/

PROMPT Adding FOREIGN Constraint To PRICE_LISTS Table

ALTER TABLE PRICE_LISTS ADD (
      CONSTRAINT PRICE_LISTS_FK1
      FOREIGN KEY (SERVICE_ID)
      REFERENCES  SERVICES (
                  ID)
)
/

PROMPT Adding FOREIGN Constraint To PRICE_LIST_ACCOUNTS Table

ALTER TABLE PRICE_LIST_ACCOUNTS ADD (
      CONSTRAINT PRICE_LIST_ACCOUNTS_FK1
      FOREIGN KEY (ACCOUNT_ID)
      REFERENCES  ACCOUNTS (
                  ID)
)
/

PROMPT Adding FOREIGN Constraint To PRICE_LIST_ACCOUNTS Table

ALTER TABLE PRICE_LIST_ACCOUNTS ADD (

```
        CONSTRAINT PRICE_LIST_ACCOUNTS_FK2
        FOREIGN KEY (PRI_LIST_ID)
        REFERENCES  PRICE_LISTS (
                    ID)
)
/

PROMPT Adding FOREIGN Constraint To PRODUCTS Table

ALTER TABLE PRODUCTS ADD (
        CONSTRAINT PRODUCTS_FK1
        FOREIGN KEY (PRODUCT_CATEGORY_ID)
        REFERENCES  PRODUCT_CATEGORIES (
                    ID)
)
/

PROMPT Adding FOREIGN Constraint To PRODUCTS Table

ALTER TABLE PRODUCTS ADD (
        CONSTRAINT PRODUCTS_FK2
        FOREIGN KEY (SERVICE_ID)
        REFERENCES  SERVICES (
                    ID)
)
/

PROMPT Adding FOREIGN Constraint To PRODUCT_DESCRIPTOR_VALUES Table

ALTER TABLE PRODUCT_DESCRIPTOR_VALUES ADD (
        CONSTRAINT PRDCT_DSCRPTR_VAL_FK1
        FOREIGN KEY (PRODUCT_ID)
        REFERENCES  PRODUCTS (
                    ID)
)
/

PROMPT Adding FOREIGN Constraint To PRODUCT_DESCRIPTOR_VALUES Table

ALTER TABLE PRODUCT_DESCRIPTOR_VALUES ADD (
        CONSTRAINT PRDCT_DSCRPTR_VAL_FK2
        FOREIGN KEY (DESCRIPTOR_VALUE_ID)
        REFERENCES  DESCRIPTOR_VALUES (
                    ID)
)
/

PROMPT Adding FOREIGN Constraint To PRODUCT_ITEMS Table

ALTER TABLE PRODUCT_ITEMS ADD (
        CONSTRAINT PRODUCT_ITEMS_FK1
        FOREIGN KEY (PRODUCT_ID)
        REFERENCES  PRODUCTS (
                    ID)
)
/

PROMPT Adding FOREIGN Constraint To PRODUCT_ITEM_FTR_VALUES Table

ALTER TABLE PRODUCT_ITEM_FTR_VALUES ADD (
        CONSTRAINT PRDCT_ITM_FTR_VAL_FK1
        FOREIGN KEY (PRODUCT_ITEM_ID)
        REFERENCES  PRODUCT_ITEMS (
                    ID)
)
/
```

PROMPT Adding FOREIGN Constraint To PRODUCT_ITEM_FTR_VALUES Table

ALTER TABLE PRODUCT_ITEM_FTR_VALUES ADD (
      CONSTRAINT PRDCT_ITM_FTR_VAL_FK2
      FOREIGN KEY (FEATURE_VALUE_ID)
      REFERENCES  FEATURE_VALUES (
                  ID)
)
/

PROMPT Adding FOREIGN Constraint To PRODUCT_ITEM_LCONTENT Table

ALTER TABLE PRODUCT_ITEM_LCONTENT ADD (
      CONSTRAINT PROD_ITEM_LCONTENT_FK1
      FOREIGN KEY (PRODUCT_ITEM_ID)
      REFERENCES  PRODUCT_ITEMS (
                  ID)
)
/

PROMPT Adding FOREIGN Constraint To PRODUCT_ITEM_LCONTENT Table

ALTER TABLE PRODUCT_ITEM_LCONTENT ADD (
      CONSTRAINT PROD_ITEM_LCONTENT_FK2
      FOREIGN KEY (LOGICAL_CONTENT_ID)
      REFERENCES  LOGICAL_CONTENT (
                  ID)
)
/

PROMPT Adding FOREIGN Constraint To PRODUCT_ITEM_PRICE_LISTS Table

ALTER TABLE PRODUCT_ITEM_PRICE_LISTS ADD (
      CONSTRAINT PRDCT_ITM_PRC_LST_FK1
      FOREIGN KEY (PRODUCT_ITEM_ID)
      REFERENCES  PRODUCT_ITEMS (
                  ID)
)
/

PROMPT Adding FOREIGN Constraint To PRODUCT_ITEM_PRICE_LISTS Table

ALTER TABLE PRODUCT_ITEM_PRICE_LISTS ADD (
      CONSTRAINT PRDCT_ITM_PRC_LST_FK2
      FOREIGN KEY (PRICE_LIST_ID)
      REFERENCES  PRICE_LISTS (
                  ID)
)
/

PROMPT Adding FOREIGN Constraint To PRODUCT_LCONTENT Table

ALTER TABLE PRODUCT_LCONTENT ADD (
      CONSTRAINT PRODUCT_LCONTENT_FK1
      FOREIGN KEY (PRODUCT_ID)
      REFERENCES  PRODUCTS (
                  ID)
)
/

PROMPT Adding FOREIGN Constraint To PRODUCT_LCONTENT Table

ALTER TABLE PRODUCT_LCONTENT ADD (
      CONSTRAINT PRODUCT_LCONTENT_FK2
      FOREIGN KEY (LOGICAL_CONTENT_ID)

```
        REFERENCES  LOGICAL_CONTENT (
                    ID)
)
/

PROMPT Adding FOREIGN Constraint To PRODUCT_PRICE_LISTS Table

ALTER TABLE PRODUCT_PRICE_LISTS ADD (
      CONSTRAINT PRODUCT_PRICE_LISTS_FK1
      FOREIGN KEY (PRICE_LIST_ID)
      REFERENCES  PRICE_LISTS (
                  ID)
)
/

PROMPT Adding FOREIGN Constraint To PRODUCT_PRICE_LISTS Table

ALTER TABLE PRODUCT_PRICE_LISTS ADD (
      CONSTRAINT PRODUCT_PRICE_LISTS_FK2
      FOREIGN KEY (PRODUCT_ID)
      REFERENCES  PRODUCTS (
                  ID)
)
/

PROMPT Adding FOREIGN Constraint To SERVICE_AGENTS Table

ALTER TABLE SERVICE_AGENTS ADD (
      CONSTRAINT SERVICE_AGENTS_FK1
      FOREIGN KEY (SESSION_ID)
      REFERENCES  SESSIONS (
                  ID)
)
/

PROMPT Adding FOREIGN Constraint To SERVICE_AGENTS Table

ALTER TABLE SERVICE_AGENTS ADD (
      CONSTRAINT SERVICE_AGENTS_FK2
      FOREIGN KEY (SERVICE_ID)
      REFERENCES  SERVICES (
                  ID)
)
/

PROMPT Adding FOREIGN Constraint To SERVICE_AGENTS Table

ALTER TABLE SERVICE_AGENTS ADD (
      CONSTRAINT SERVICE_AGENTS_FK3
      FOREIGN KEY (PRICE_LIST_ID)
      REFERENCES  PRICE_LISTS (
                  ID)
)
/

PROMPT Adding FOREIGN Constraint To SERVICE_AGENT_STATES Table

ALTER TABLE SERVICE_AGENT_STATES ADD (
      CONSTRAINT SERVCIE_AGENT_STATES_FK1
      FOREIGN KEY (SERVICE_AGENT_ID)
      REFERENCES  SERVICE_AGENTS (
                  ID)
)
/

PROMPT Adding FOREIGN Constraint To SERVICE_AGENT_STATISTICS Table
```

```
ALTER TABLE SERVICE_AGENT_STATISTICS ADD (
     CONSTRAINT SERVICE_AGT_STATS_FK1
     FOREIGN KEY (SERVICE_AGENT_ID)
     REFERENCES  SERVICE_AGENTS (
                 ID)
)
/

PROMPT Adding FOREIGN Constraint To SERVICE_AGENT_STATUS_HISTORIES Table

ALTER TABLE SERVICE_AGENT_STATUS_HISTORIES ADD (
     CONSTRAINT SVC_AGENT_STATUS_HISTORIES_FK1
     FOREIGN KEY (SERVICE_AGENT_ID)
     REFERENCES  SERVICE_AGENTS (
                 ID)
)
/

PROMPT Adding FOREIGN Constraint To SERVICE_AVAILABILITIES Table

ALTER TABLE SERVICE_AVAILABILITIES ADD (
     CONSTRAINT SERVICE_AVAIL_FK2
     FOREIGN KEY (CLIENT_DEVICE_MODEL_ID)
     REFERENCES  CLIENT_DEVICE_MODELS (
                 ID)
)
/

PROMPT Adding FOREIGN Constraint To SERVICE_AVAILABILITIES Table

ALTER TABLE SERVICE_AVAILABILITIES ADD (
     CONSTRAINT SERVICE_AVAIL_FK1
     FOREIGN KEY (SERVICE_ID)
     REFERENCES  SERVICES (
                 ID)
)
/

PROMPT Adding FOREIGN Constraint To SERVICE_PAYMENT_DEVICES Table

ALTER TABLE SERVICE_PAYMENT_DEVICES ADD (
     CONSTRAINT SERVICE_PAYEMENT_DVC_FK1
     FOREIGN KEY (SERVICE_ID)
     REFERENCES  SERVICES (
                 ID)
)
/

PROMPT Adding FOREIGN Constraint To SERVICE_SUBSCRIPTIONS Table

ALTER TABLE SERVICE_SUBSCRIPTIONS ADD (
     CONSTRAINT SVC_SUBSCRIPTIONS_FK1
     FOREIGN KEY (SERVICE_ID)
     REFERENCES  SERVICES (
                 ID)
)
/

PROMPT Adding FOREIGN Constraint To SERVICE_SUBSCRIPTIONS Table

ALTER TABLE SERVICE_SUBSCRIPTIONS ADD (
     CONSTRAINT SVC_SUBSCRIPTIONS_FK2
     FOREIGN KEY (ACCOUNT_ID)
     REFERENCES  ACCOUNTS (
                 ID)
```

```
)
/

PROMPT Adding FOREIGN Constraint To SESSIONS Table

ALTER TABLE SESSIONS ADD (
      CONSTRAINT SESSIONS_FK2
      FOREIGN KEY (USER_ID)
      REFERENCES  USERS (
                  ID)
)
/

PROMPT Adding FOREIGN Constraint To SESSIONS Table

ALTER TABLE SESSIONS ADD (
      CONSTRAINT SESSIONS_FK3
      FOREIGN KEY (CLIENT_DEVICE_ID)
      REFERENCES  ACCOUNT_CLIENT_DEVICES (
                  ID)
)
/

PROMPT Adding FOREIGN Constraint To SESSIONS Table

ALTER TABLE SESSIONS ADD (
      CONSTRAINT SESSIONS_FK1
      FOREIGN KEY (SERVICE_AGENT_ID)
      REFERENCES  SERVICE_AGENTS (
                  ID)
)
/

PROMPT Adding FOREIGN Constraint To SESSIONS Table

ALTER TABLE SESSIONS ADD (
      CONSTRAINT SESSIONS_FK4
      FOREIGN KEY (ACCOUNT_ID)
      REFERENCES  ACCOUNTS (
                  ID)
)
/

PROMPT Adding FOREIGN Constraint To SESSION_STATISTICS Table

ALTER TABLE SESSION_STATISTICS ADD (
      CONSTRAINT SESSION_STATISTICS_FK1
      FOREIGN KEY (SESSION_ID)
      REFERENCES  SESSIONS (
                  ID)
)
/

PROMPT Adding FOREIGN Constraint To SESSION_STATUS_HISTORIES Table

ALTER TABLE SESSION_STATUS_HISTORIES ADD (
      CONSTRAINT SESSION_STATUS_HISTORIES_FK1
      FOREIGN KEY (SESSION_ID)
      REFERENCES  SESSIONS (
                  ID)
)
/

PROMPT Adding FOREIGN Constraint To STREAMS Table

ALTER TABLE STREAMS ADD (
```

```
      CONSTRAINT STREAMS_FK1
      FOREIGN KEY (LOGICAL_CONTENT_ID)
      REFERENCES   LOGICAL_CONTENT (
                   ID)
)
/

PROMPT Adding FOREIGN Constraint To STREAMS Table

ALTER TABLE STREAMS ADD (
      CONSTRAINT STREAMS_FK2
      FOREIGN KEY (SESSION_ID)
      REFERENCES   SESSIONS (
                   ID)
)
/

PROMPT Adding FOREIGN Constraint To SYSTEM_EVENTS Table

ALTER TABLE SYSTEM_EVENTS ADD (
      CONSTRAINT SYSTEM_EVENTS_FK1
      FOREIGN KEY (USER_ID)
      REFERENCES   USERS (
                   ID)
)
/

PROMPT Adding FOREIGN Constraint To SYSTEM_EVENTS Table

ALTER TABLE SYSTEM_EVENTS ADD (
      CONSTRAINT SYSTEM_EVENTS_FK2
      FOREIGN KEY (STREAM_ID)
      REFERENCES   STREAMS (
                   ID)
)
/

PROMPT Adding FOREIGN Constraint To SYSTEM_EVENTS Table

ALTER TABLE SYSTEM_EVENTS ADD (
      CONSTRAINT SYSTEM_EVENTS_FK3
      FOREIGN KEY (ORDER_ID)
      REFERENCES   ORDERS (
                   ID)
)
/

PROMPT Adding FOREIGN Constraint To SYSTEM_EVENTS Table

ALTER TABLE SYSTEM_EVENTS ADD (
      CONSTRAINT SYSTEM_EVENTS_FK4
      FOREIGN KEY (PRODUCT_ID)
      REFERENCES   PRODUCTS (
                   ID)
)
/

PROMPT Adding FOREIGN Constraint To SYSTEM_EVENTS Table

ALTER TABLE SYSTEM_EVENTS ADD (
      CONSTRAINT SYSTEM_EVENTS_FK5
      FOREIGN KEY (SERVICE_ID)
      REFERENCES   SERVICES (
                   ID)
)
/
```

```
PROMPT Adding FOREIGN Constraint To SYSTEM_EVENTS Table

ALTER TABLE SYSTEM_EVENTS ADD (
      CONSTRAINT SYSTEM_EVENTS_FK6
      FOREIGN KEY (SESSION_ID)
      REFERENCES   SESSIONS (
                 ID)
)
/

PROMPT Adding FOREIGN Constraint To SYSTEM_EVENTS Table

ALTER TABLE SYSTEM_EVENTS ADD (
      CONSTRAINT SYSTEM_EVENTS_FK7
      FOREIGN KEY (SYSTEM_EVENT_TYPE_ID)
      REFERENCES   SYSTEM_EVENT_TYPES (
                 ID)
)
/

PROMPT Adding FOREIGN Constraint To SYSTEM_MESSAGES Table

ALTER TABLE SYSTEM_MESSAGES ADD (
      CONSTRAINT SYSTEM_MESSAGES_FK1
      FOREIGN KEY (SERVICE_ID)
      REFERENCES   SERVICES (
                 ID)
)
/

PROMPT Adding FOREIGN Constraint To USERS Table

ALTER TABLE USERS ADD (
      CONSTRAINT USERS_FK1
      FOREIGN KEY (ACCOUNT_ID)
      REFERENCES   ACCOUNTS (
                 ID)
)
/

PROMPT Adding FOREIGN Constraint To USER_PREFERENCES Table

ALTER TABLE USER_PREFERENCES ADD (
      CONSTRAINT USER_PREFERENCES_FK1
      FOREIGN KEY (USER_ID)
      REFERENCES   USERS (
                 ID)
)
/

PROMPT Adding FOREIGN Constraint To USER_PREFERENCES Table

ALTER TABLE USER_PREFERENCES ADD (
      CONSTRAINT USER_PREFERENCES_FK2
      FOREIGN KEY (PREFERENCE_ID)
      REFERENCES   PREFERENCES (
                 ID)
)
/

PROMPT Adding FOREIGN Constraint To USER_RESTRICTIONS Table

ALTER TABLE USER_RESTRICTIONS ADD (
      CONSTRAINT USER_RESTRICTIONS_FK1
      FOREIGN KEY (USER_ID)
```

```
      REFERENCES    USER (
                ID)
)
/

PROMPT Adding FOREIGN Constraint To USER_RESTRICTIONS Table

ALTER TABLE USER_RESTRICTIONS ADD (
      CONSTRAINT USER_RESTRICTIONS_FK2
      FOREIGN KEY (SERVICE_ID)
      REFERENCES   SERVICES (
                ID)
)
/

PROMPT Adding FOREIGN Constraint To USER_RESTRICTIONS Table

ALTER TABLE USER_RESTRICTIONS ADD (
      CONSTRAINT USER_RESTRICTIONS_FK3
      FOREIGN KEY (CREATE_USER_ID)
      REFERENCES   USERS (
                ID)
)
/

PROMPT Adding FOREIGN Constraint To USER_STATISTICS Table

ALTER TABLE USER_STATISTICS ADD (
      CONSTRAINT USER_STATISTICS_FK1
      FOREIGN KEY (USER_ID)
      REFERENCES   USERS (
                ID)
)
/

PROMPT Adding FOREIGN Constraint To VALID_PRODUCT_DESCRIPTOR_SETS Table

ALTER TABLE VALID_PRODUCT_DESCRIPTOR_SETS ADD (
      CONSTRAINT VALID_PRDCT_DESC_SET_FK1
      FOREIGN KEY (PRODUCT_CATEGORY_ID)
      REFERENCES   PRODUCT_CATEGORIES (
                ID)
)
/

PROMPT Adding FOREIGN Constraint To VALID_PRODUCT_DESCRIPTOR_SETS Table

ALTER TABLE VALID_PRODUCT_DESCRIPTOR_SETS ADD (
      CONSTRAINT VALID_PRDCT_DESC_SET_FK2
      FOREIGN KEY (DESCRIPTOR_SET_ID)
      REFERENCES   DESCRIPTOR_SETS (
                ID)
)
/

PROMPT Adding FOREIGN Constraint To VALID_PRODUCT_FEATURE_SETS Table

ALTER TABLE VALID_PRODUCT_FEATURE_SETS ADD (
      CONSTRAINT VAL_PROD_FTR_SETS_FK1
      FOREIGN KEY (PRODUCT_ID)
      REFERENCES   PRODUCTS (
                ID)
)
/

PROMPT Adding FOREIGN Constraint To VALID_PRODUCT_FEATURE_SETS Table
```

```
ALTER TABLE VALID_PRODUCT_FEATURE_SETS ADD (
      CONSTRAINT VAL_PROD_FTR_SETS_FK2
      FOREIGN KEY (FEATURE_SET_ID)
      REFERENCES  FEATURE_SETS (
                  ID)
)
/

PROMPT Adding FOREIGN Constraint To VIDEO_PRODUCT_DELIVERIES Table

ALTER TABLE VIDEO_PRODUCT_DELIVERIES ADD (
      CONSTRAINT VPROD_DELIVERIES_FK1
      FOREIGN KEY (PRODUCT_ITEM_ID)
      REFERENCES  PRODUCT_ITEMS (
                  ID)
)
/

PROMPT Adding FOREIGN Constraint To VIDEO_PRODUCT_DELIVERIES Table

ALTER TABLE VIDEO_PRODUCT_DELIVERIES ADD (
      CONSTRAINT VPROD_DELIVERIES_FK2
      FOREIGN KEY (ORDER_ITEM_ID)
      REFERENCES  ORDER_ITEMS (
                  ID)
)
/
```

```
REM
REM This ORACLE V7 RDBMS command file was generated by CASE Dictionary
REM                    on   12-APR-95
REM
REM For application SDK version 1 database SDK
REM
REM SEQUENCE
REM       ACCOUNTS_SEQ1
REM       ACCOUNT_ADDRESSES_SEQ1
REM       ACCOUNT_CLIENT_DEVICES_SEQ1
REM       ACCOUNT_PAYMENT_DEVICES_SEQ1
REM       ACCOUNT_PREFERENCES_SEQ1
REM       ACCOUNT_RESTRICTIONS_SEQ1
REM       ACCOUNT_STATISTICS_SEQ1
REM       CLIENT_DEVICE_MODELS_SEQ1
REM       CONTENT_LISTS_SEQ1
REM       CONTENT_PROVIDERS_SEQ1
REM       CONTENT_SEQ1
REM       DELIVERIES_SEQ1
REM       DESCRIPTOR_SETS_SEQ1
REM       DESCRIPTOR_VALUES_SEQ1
REM       FEATURE_SETS_SEQ1
REM       FEATURE_VALUES_SEQ1
REM       LOGICAL_CONTENT_SEQ1
REM       MARKETING_EVENTS_SEQ1
REM       MARKETING_EVENT_TYPES_SEQ1
REM       MKT_EVENT_ASSIGNMENTS_SEQ1
REM       ORDERS_SEQ1
REM       ORDER_ITEMS_SEQ1
REM       PREFERENCES_SEQ1
REM       PRICE_LISTS_SEQ1
REM       PRICE_LIST_ACCOUNTS_SEQ1
REM       PRODUCTS_SEQ1
REM       PRODUCT_CATEGORIES_SEQ1
REM       PRODUCT_DSCRPTR_VALUES_SEQ1
REM       PRODUCT_ITEMS_SEQ1
REM       PRODUCT_ITEM_FTR_VALUES_SEQ1
REM       PRODUCT_ITEM_PRICE_LISTS_SEQ1
REM       PRODUCT_PRICE_LISTS_SEQ1
REM       SERVICES_SEQ1
REM       SERVICE_AGENTS_SEQ1
REM       SERVICE_AGT_STATISTICS_SEQ1
REM       SERVICE_AVAILABILITIES_SEQ1
REM       SERVICE_PAYMENT_DEVICES_SEQ1
REM       SERVICE_STATISTICS_SEQ1
REM       SERVICE_SUBSCRIPTIONS_SEQ1
REM       SESSIONS_SEQ1
REM       SESSION_STATISTICS_SEQ1
REM       SESSION_STATUS_HISTORIES_SEQ1
REM       SRVCE_AGNT_STAT_HISTORIES_SEQ1
REM       STREAMS_SEQ1
REM       SYSTEM_EVENTS_SEQ1
REM       SYSTEM_EVENT_TYPES_SEQ1
REM       SYSTEM_MESSAGES_SEQ1
REM       USERS_SEQ1
REM       USER_PREFERENCES_SEQ1
REM       USER_RESTRICTIONS_SEQ1
REM       USER_STATISTICS_SEQ1
REM       VALID_PRDCT_DSCRPTR_SETS_SEQ1
REM       VALID_PRODUCT_FTR_SETS_SEQ1
REM       VPRODUCT_DELIVERIES_SEQ1

REM
REM System generated primary key.
REM
```

```
PROMPT
PROMPT Creating Sequence ACCOUNTS_SEQ1
CREATE SEQUENCE accounts_seq1
 INCREMENT BY 1
 START WITH 100
 NOMINVALUE
 NOMAXVALUE
 NOCYCLE
 CACHE 20
 NOORDER
;

REM
REM System generated unique id
REM
PROMPT
PROMPT Creating Sequence ACCOUNT_ADDRESSES_SEQ1
CREATE SEQUENCE account_addresses_seq1
 INCREMENT BY 1
 START WITH 100
 NOMINVALUE
 NOMAXVALUE
 NOCYCLE
 CACHE 20
 NOORDER
;

REM
REM System generated primary key.
REM
PROMPT
PROMPT Creating Sequence ACCOUNT_CLIENT_DEVICES_SEQ1
CREATE SEQUENCE account_client_devices_seq1
 INCREMENT BY 1
 START WITH 100
 NOMINVALUE
 NOMAXVALUE
 NOCYCLE
 CACHE 20
 NOORDER
;

REM
REM System generated primary key.
REM
PROMPT
PROMPT Creating Sequence ACCOUNT_PAYMENT_DEVICES_SEQ1
CREATE SEQUENCE account_payment_devices_seq1
 INCREMENT BY 1
 START WITH 100
 NOMINVALUE
 NOMAXVALUE
 NOCYCLE
 CACHE 20
 NOORDER
;

REM
REM System generated primary key.
REM
PROMPT
PROMPT Creating Sequence ACCOUNT_PREFERENCES_SEQ1
```

```
CREATE SEQUENCE account_preferences_seq1
  INCREMENT BY 1
  START WITH 100
  NOMINVALUE
  NOMAXVALUE
  NOCYCLE
  CACHE 20
  NOORDER
;

REM
REM System generated primary key.
REM
PROMPT
PROMPT Creating Sequence ACCOUNT_RESTRICTIONS_SEQ1
CREATE SEQUENCE account_restrictions_seq1
  INCREMENT BY 1
  START WITH 100
  NOMINVALUE
  NOMAXVALUE
  NOCYCLE
  CACHE 20
  NOORDER
;

REM
REM System generated primary key.
REM
PROMPT
PROMPT Creating Sequence ACCOUNT_STATISTICS_SEQ1
CREATE SEQUENCE account_statistics_seq1
  INCREMENT BY 1
  START WITH 100
  NOMINVALUE
  NOMAXVALUE
  NOCYCLE
  CACHE 20
  NOORDER
;

REM
REM System generated primary key.
REM
PROMPT
PROMPT Creating Sequence CLIENT_DEVICE_MODELS_SEQ1
CREATE SEQUENCE client_device_models_seq1
  INCREMENT BY 1
  START WITH 100
  NOMINVALUE
  NOMAXVALUE
  NOCYCLE
  CACHE 20
  NOORDER
;

REM
REM System generated primary key.
REM
PROMPT
PROMPT Creating Sequence CONTENT_LISTS_SEQ1
CREATE SEQUENCE content_lists_seq1
  INCREMENT BY 1
```

```
  START WITH 100
  NOMINVALUE
  NOMAXVALUE
  NOCYCLE
  CACHE 20
  NOORDER
;

REM
REM System generated primary key.
REM
PROMPT
PROMPT Creating Sequence CONTENT_PROVIDERS_SEQ1
CREATE SEQUENCE content_providers_seq1
  INCREMENT BY 1
  START WITH 100
  NOMINVALUE
  NOMAXVALUE
  NOCYCLE
  CACHE 20
  NOORDER
;

REM
REM System generated primary key.
REM
PROMPT
PROMPT Creating Sequence CONTENT_SEQ1
CREATE SEQUENCE content_seq1
  INCREMENT BY 1
  START WITH 100
  NOMINVALUE
  NOMAXVALUE
  NOCYCLE
  CACHE 20
  NOORDER
;

REM
REM
REM
PROMPT
PROMPT Creating Sequence DELIVERIES_SEQ1
CREATE SEQUENCE deliveries_seq1
  INCREMENT BY 1
  START WITH 100
  NOMINVALUE
  NOMAXVALUE
  NOCYCLE
  CACHE 20
  NOORDER
;

REM
REM System generated primary key.
REM
PROMPT
PROMPT Creating Sequence DESCRIPTOR_SETS_SEQ1
CREATE SEQUENCE descriptor_sets_seq1
  INCREMENT BY 1
  START WITH 100
  NOMINVALUE
```

```
    NOMAXVALUE
    NOCYCLE
    CACHE 20
    NOORDER
;

REM
REM System generated primary key.
REM
PROMPT
PROMPT Creating Sequence DESCRIPTOR_VALUES_SEQ1
CREATE SEQUENCE descriptor_values_seq1
    INCREMENT BY 1
    START WITH 100
    NOMINVALUE
    NOMAXVALUE
    NOCYCLE
    CACHE 20
    NOORDER
;

REM
REM System generated primary key.
REM
PROMPT
PROMPT Creating Sequence FEATURE_SETS_SEQ1
CREATE SEQUENCE feature_sets_seq1
    INCREMENT BY 1
    START WITH 100
    NOMINVALUE
    NOMAXVALUE
    NOCYCLE
    CACHE 20
    NOORDER
;

REM
REM System generated primary key.
REM
PROMPT
PROMPT Creating Sequence FEATURE_VALUES_SEQ1
CREATE SEQUENCE feature_values_seq1
    INCREMENT BY 1
    START WITH 100
    NOMINVALUE
    NOMAXVALUE
    NOCYCLE
    CACHE 20
    NOORDER
;

REM
REM System generated primary key.
REM
PROMPT
PROMPT Creating Sequence LOGICAL_CONTENT_SEQ1
CREATE SEQUENCE logical_content_seq1
    INCREMENT BY 1
    START WITH 100
    NOMINVALUE
    NOMAXVALUE
    NOCYCLE
```

```
  CACHE 20
  NOORDER
;

REM
REM System generated unique id
REM
PROMPT
PROMPT Creating Sequence MARKETING_EVENTS_SEQ1
CREATE SEQUENCE marketing_events_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence MARKETING_EVENT_TYPES_SEQ1
CREATE SEQUENCE marketing_event_types_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence MKT_EVENT_ASSIGNMENTS_SEQ1
CREATE SEQUENCE mkt_event_assignments_seq1
  INCREMENT BY 1
  START WITH 100
  NOMINVALUE
  NOMAXVALUE
  NOCYCLE
  CACHE 20
  NOORDER
;

REM
REM System generated primary key.
REM
PROMPT
PROMPT Creating Sequence ORDERS_SEQ1
CREATE SEQUENCE orders_seq1
  INCREMENT BY 1
  START WITH 100
  NOMINVALUE
  NOMAXVALUE
  NOCYCLE
  CACHE 20
  NOORDER
```

```
REM
REM System generated primary key.
REM
PROMPT
PROMPT Creating Sequence ORDER_ITEMS_SEQ1
CREATE SEQUENCE order_items_seq1
 INCREMENT BY 1
 START WITH 100
 NOMINVALUE
 NOMAXVALUE
 NOCYCLE
 CACHE 20
 NOORDER
;

REM
REM System generated primary key.
REM
PROMPT
PROMPT Creating Sequence PREFERENCES_SEQ1
CREATE SEQUENCE preferences_seq1
 INCREMENT BY 1
 START WITH 100
 NOMINVALUE
 NOMAXVALUE
 NOCYCLE
 CACHE 20
 NOORDER
;

REM
REM System generated primary key.
REM
PROMPT
PROMPT Creating Sequence PRICE_LISTS_SEQ1
CREATE SEQUENCE price_lists_seq1
 INCREMENT BY 1
 START WITH 100
 NOMINVALUE
 NOMAXVALUE
 NOCYCLE
 CACHE 20
 NOORDER
;

REM
REM System generated primary key.
REM
PROMPT
PROMPT Creating Sequence PRICE_LIST_ACCOUNTS_SEQ1
CREATE SEQUENCE price_list_accounts_seq1
 INCREMENT BY 1
 START WITH 100
 NOMINVALUE
 NOMAXVALUE
 NOCYCLE
 CACHE 20
 NOORDER
;
```

```
REM
REM System generated primary key.
REM
PROMPT
PROMPT Creating Sequence PRODUCTS_SEQ1
CREATE SEQUENCE products_seq1
 INCREMENT BY 1
 START WITH 100
 NOMINVALUE
 NOMAXVALUE
 NOCYCLE
 CACHE 20
 NOORDER
;

REM
REM System generated primary key
REM
PROMPT
PROMPT Creating Sequence PRODUCT_CATEGORIES_SEQ1
CREATE SEQUENCE product_categories_seq1
 INCREMENT BY 1
 START WITH 100
 NOMINVALUE
 NOMAXVALUE
 NOCYCLE
 CACHE 20
 NOORDER
;

REM
REM System generated primary key
REM
PROMPT
PROMPT Creating Sequence PRODUCT_DSCRPTR_VALUES_SEQ1
CREATE SEQUENCE product_dscrptr_values_seq1
 INCREMENT BY 1
 START WITH 100
 NOMINVALUE
 NOMAXVALUE
 NOCYCLE
 CACHE 20
 NOORDER
;

REM
REM System generated primary key
REM
PROMPT
PROMPT Creating Sequence PRODUCT_ITEMS_SEQ1
CREATE SEQUENCE product_items_seq1
 INCREMENT BY 1
 START WITH 100
 NOMINVALUE
 NOMAXVALUE
 NOCYCLE
 CACHE 20
 NOORDER
;

REM
```

```
REM System generated primary key
REM
PROMPT
PROMPT Creating Sequence PRODUCT_ITEM_FTR_VALUES_SEQ1
CREATE SEQUENCE product_item_ftr_values_seq1
 INCREMENT BY 1
 START WITH 100
 NOMINVALUE
 NOMAXVALUE
 NOCYCLE
 CACHE 20
 NOORDER
;

REM
REM System generated primary key
REM
PROMPT
PROMPT Creating Sequence PRODUCT_ITEM_PRICE_LISTS_SEQ1
CREATE SEQUENCE product_item_price_lists_seq1
 INCREMENT BY 1
 START WITH 100
 NOMINVALUE
 NOMAXVALUE
 NOCYCLE
 CACHE 20
 NOORDER
;

REM
REM System generated primary key
REM
PROMPT
PROMPT Creating Sequence PRODUCT_PRICE_LISTS_SEQ1
CREATE SEQUENCE product_price_lists_seq1
 INCREMENT BY 1
 START WITH 100
 NOMINVALUE
 NOMAXVALUE
 NOCYCLE
 CACHE 20
 NOORDER
;

REM
REM System generated numeric ID which uniquely identifies each row in Services
REM - table.
REM
PROMPT
PROMPT Creating Sequence SERVICES_SEQ1
CREATE SEQUENCE services_seq1
 INCREMENT BY 1
 START WITH 100
 NOMINVALUE
 NOMAXVALUE
 NOCYCLE
 CACHE 20
 NOORDER
;

REM
REM System generated primary key
```

```
REM
PROMPT
PROMPT Creating Sequence SERVICE_AGENTS_SEQ1
CREATE SEQUENCE service_agents_seq1
 INCREMENT BY 1
 START WITH 100
 NOMINVALUE
 NOMAXVALUE
 NOCYCLE
 CACHE 20
 NOORDER
;

REM
REM
REM
PROMPT
PROMPT Creating Sequence SERVICE_AGT_STATISTICS_SEQ1
CREATE SEQUENCE service_agt_statistics_seq1
 INCREMENT BY 1
 START WITH 100
 NOMINVALUE
 NOMAXVALUE
 NOCYCLE
 CACHE 20
 NOORDER
;

REM
REM System generated unique id
REM
PROMPT
PROMPT Creating Sequence SERVICE_AVAILABILITIES_SEQ1
CREATE SEQUENCE service_availabilities_seq1
 INCREMENT BY 1
 START WITH 100
 NOMINVALUE
 NOMAXVALUE
 NOCYCLE
 CACHE 20
 NOORDER
;

REM
REM System generated unique id
REM
PROMPT
PROMPT Creating Sequence SERVICE_PAYMENT_DEVICES_SEQ1
CREATE SEQUENCE service_payment_devices_seq1
 INCREMENT BY 1
 START WITH 100
 NOMINVALUE
 NOMAXVALUE
 NOCYCLE
 CACHE 20
 NOORDER
;

REM
REM System generated unique id
REM
PROMPT
```

```
PROMPT Creating Sequence SERVICE_STATISTICS_SEQ1
CREATE SEQUENCE service_statistics_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence SERVICE_SUBSCRIPTIONS_SEQ1
CREATE SEQUENCE service_subscriptions_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence SESSIONS_SEQ1
CREATE SEQUENCE sessions_seq1
  INCREMENT BY 1
  START WITH 100
  NOMINVALUE
  NOMAXVALUE
  NOCYCLE
  CACHE 20
  NOORDER
;

REM
REM System generated numeric ID used to uniquely identify each row in the Sessi
REM - on Statistics table.
REM
PROMPT
PROMPT Creating Sequence SESSION_STATISTICS_SEQ1
CREATE SEQUENCE session_statistics_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence SESSION_STATUS_HISTORIES_SEQ1
```

```
CREATE SEQUENCE sessi  _status_histories_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence SRVCE_AGNT_STAT_HISTORIES_SEQ1
CREATE SEQUENCE srvce_agnt_stat_histories_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence STREAMS_SEQ1
CREATE SEQUENCE streams_seq1
  INCREMENT BY 1
  START WITH 100
  NOMINVALUE
  NOMAXVALUE
  NOCYCLE
  CACHE 20
  NOORDER
;

REM
REM System generated numeric ID which uniquely identifies each row in System_Ev
REM - ents table.
REM
PROMPT
PROMPT Creating Sequence SYSTEM_EVENTS_SEQ1
CREATE SEQUENCE system_events_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence SYSTEM_EVENT_TYPES_SEQ1
CREATE SEQUENCE system_event_types_seq1
```

```
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence SYSTEM_MESSAGES_SEQ1
CREATE SEQUENCE system_messages_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence USERS_SEQ1
CREATE SEQUENCE users_seq1
  INCREMENT BY 1
  START WITH 100
  NOMINVALUE
  NOMAXVALUE
  NOCYCLE
  CACHE 20
  NOORDER
;

REM
REM System generated unique ID which uniquely identifies each row in User_Prefe
REM - rences table.
REM
PROMPT
PROMPT Creating Sequence USER_PREFERENCES_SEQ1
CREATE SEQUENCE user_preferences_seq1
  INCREMENT BY 1
  START WITH 100
  NOMINVALUE
  NOMAXVALUE
  NOCYCLE
  CACHE 20
  NOORDER
;

REM
REM System generated unique id
REM
PROMPT
PROMPT Creating Sequence USER_RESTRICTIONS_SEQ1
CREATE SEQUENCE user_restrictions_seq1
  INCREMENT BY 1
```

```
 START WITH 100
 NOMINVALUE
 NOMAXVALUE
 NOCYCLE
 CACHE 20
 NOORDER
;

REM
REM System generated unique id
REM
PROMPT
PROMPT Creating Sequence USER_STATISTICS_SEQ1
CREATE SEQUENCE user_statistics_seq1
 INCREMENT BY 1
 START WITH 100
 NOMINVALUE
 NOMAXVALUE
 NOCYCLE
 CACHE 20
 NOORDER
;

REM
REM System generated unique id
REM
PROMPT
PROMPT Creating Sequence VALID_PRDCT_DSCRPTR_SETS_SEQ1
CREATE SEQUENCE valid_prdct_dscrptr_sets_seq1
 INCREMENT BY 1
 START WITH 100
 NOMINVALUE
 NOMAXVALUE
 NOCYCLE
 CACHE 20
 NOORDER
;

REM
REM System generated unique id
REM
PROMPT
PROMPT Creating Sequence VALID_PRODUCT_FTR_SETS_SEQ1
CREATE SEQUENCE valid_product_ftr_sets_seq1
 INCREMENT BY 1
 START WITH 100
 NOMINVALUE
 NOMAXVALUE
 NOCYCLE
 CACHE 20
 NOORDER
;

REM
REM System generated primary key.
REM
PROMPT
PROMPT Creating Sequence VPRODUCT_DELIVERIES_SEQ1
CREATE SEQUENCE vproduct_deliveries_seq1
 INCREMENT BY 1
 START WITH 100
 NOMINVALUE
```

```
NOMAXVALUE
NOCYCLE
CACHE 20
NOORDER
;
```

We claim:

1. In a networked computer system having a client device coupled to a server over a network, said client device including a client application executing therein, said client application generating requests for service, an object oriented interactive application interface comprising:
   - a client interface for sending and receiving messages related to said client application requests via said network;
   - a client interactive application module interposed between said client application and said client interface that provides at least one object for use by said application;
   - a server interface for facilitating communication between said server and said client application via said network;
   - a database interface for storing and querying information related to said client application requests;
   - an on-line service interface for interacting with a particular network accessible service having a specific service protocol, said service having resources necessary to respond to said client application requests;
   - a server interactive application module that integrates said database interface and said on-line service interface in processing said client application requests through a Common Object Request Broker (CORBA) component, said server interactive application module containing objects accessible by said client interactive application module via said client interface; and
   - a session object including a resume session method, said session object supporting transactions during a user log-on time.

2. The object oriented interactive application interface as claimed in claim 1 further including a restriction object, wherein said restriction object further includes a means for restricting access to a specified object.

3. The object oriented interactive application interface as claimed in claim 1 further including a restriction object, wherein said restriction object further includes a means for restricting access to a specified object while allowing a user to view an identifier of said specified object.

4. The object oriented real-time interactive application interface as claimed in claim 3 wherein said means for restricting access further includes means for restricting access on a time basis.

5. The object oriented real-time interactive application interface as claimed in claim 3 wherein said means for restricting access further includes means for restricting access on a budget basis.

* * * * *